US012789393B2

(12) United States Patent
Cochrane

(10) Patent No.: US 12,789,393 B2
(45) **Date of Patent: *Nov. 10, 2026**

(54) NUT PLATE GRIPPERS AND RELATED METHODS

(71) Applicant: The Boeing Company, Arlington, VA (US)

(72) Inventor: Jason Cochrane, Melbourne (AU)

(73) Assignee: The Boeing Company, Arlington, VA (US)

( * ) Notice: Subject to any disclaimer, the term of this patent is extended or adjusted under 35 U.S.C. 154(b) by 912 days.

This patent is subject to a terminal disclaimer.

(21) Appl. No.: 18/183,059

(22) Filed: Mar. 13, 2023

(65) Prior Publication Data

US 2024/0308089 A1 Sep. 19, 2024

(51) Int. Cl.
*B25J 15/00* (2006.01)

(52) U.S. Cl.
CPC .................................. *B25J 15/009* (2013.01)

(58) Field of Classification Search
CPC ..... F16B 37/004; F16B 37/044; B25J 15/009; B23P 19/007
See application file for complete search history.

(56) References Cited

U.S. PATENT DOCUMENTS 2,689,491 A 9/1954 Bredesen
2,835,150 A 5/1958 Marcoux
3,711,006 A 1/1973 Conner
4,736,519 A 4/1988 Roberts
5,054,836 A 10/1991 Schulz
5,214,837 A 6/1993 Stafford
6,428,452 B1 8/2002 Dahlstrom et al.
6,769,595 B2 8/2004 Stol et al.
(Continued)

FOREIGN PATENT DOCUMENTS

DE 3822435 A1 1/1990
JP H05084685 A 4/1993
(Continued)

OTHER PUBLICATIONS

Machine-generated English language translation of KR20150079289A, Jul. 8, 2015.
(Continued)

*Primary Examiner* — Gilbert Y Lee
(74) *Attorney, Agent, or Firm* — Kolitch Romano Dascenzo Gates LLP

(57) ABSTRACT

Nut plate grippers and related methods are disclosed herein. The nut plate grippers are configured to grip a nut plate along an engagement axis. The nut plate includes a base plate and a nut that is operatively attached to the base plate and defines a threaded central opening. The nut plate grippers include an attachment region, which is configured to facilitate attachment of the nut plate gripper to an end effector, an elongate resilient retention structure, which extends from the attachment region along the engagement axis and is sized for an interference fit within the threaded central opening, and a pair of orienting structures positioned on opposed sides of the elongate resilient retention structure and configured to operatively engage the base plate when the nut plate gripper grips the nut plate to precisely orient the base plate relative to the nut plate gripper along an orienting axis.

20 Claims, 21 Drawing Sheets

(56) References Cited

U.S. PATENT DOCUMENTS

| | | | | |
|---|---|---|---|---|
| 10,899,083 | B1 | 1/2021 | Rice et al. | |
| 11,027,326 | B2 | 6/2021 | Eusterwiemann | |
| 11,148,175 | B2 | 10/2021 | Coffey et al. | |
| 11,255,371 | B2 | 2/2022 | Dubberly et al. | |
| 2006/0218780 | A1 | 10/2006 | Lewis et al. | |
| 2008/0054143 | A1* | 3/2008 | Collins | F16L 3/02<br>248/227.2 |
| 2018/0250734 | A1 | 9/2018 | Savoy et al. | |
| 2019/0070657 | A1 | 3/2019 | Skolaude | |
| 2020/0391330 | A1 | 12/2020 | Hughes | |
| 2021/0172191 | A1 | 6/2021 | Rauma | |

FOREIGN PATENT DOCUMENTS

| | | | |
|---|---|---|---|
| JP | H09266613 | A | 10/1997 |
| JP | 2008183637 | A | 8/2008 |
| KR | 20150079289 | A | 7/2015 |

OTHER PUBLICATIONS

European Patent Office, Extended European Search Report in related App. No. EP24162325.5, Aug. 29, 2024.

* cited by examiner

NUT PLATE GRIPPERS AND RELATED METHODS

FIELD

The present disclosure relates generally to nut plate grippers, to end effectors that include nut plate grippers, to robots that include end effectors, to installation systems that include robots, and/or to related methods.

BACKGROUND

Nut plates may be utilized within a structure to secure two components of the structure to one another. Nut plates historically have been manually installed while held in place during an assembly process in which the two components are secured to one another. While effective, this process is labor-intensive. The overall shape of the nut plates makes it difficult to reliably and reproducibly position the nut plates at a desired location during the assembly process. Thus, there exists a need for nut plate grippers, for end effectors that include the nut plate grippers, for robots that include the end effectors, for installation systems that include the robots, and/or for related methods.

SUMMARY

Nut plate grippers and related methods are disclosed herein. The nut plate grippers are configured to grip a nut plate along an engagement axis. The nut plate includes a base plate that defines a pair of opposed plate flanges and a nut that is operatively attached to the base plate and defines a threaded central opening. The nut plate grippers include an attachment region, an elongate resilient retention structure, and a pair of orienting structures. The attachment region is configured to facilitate attachment of the nut plate gripper to an end effector. The elongate resilient retention structure extends from the attachment region along the engagement axis and is sized for an interference fit within the threaded central opening of the nut. The pair of orienting structures is positioned on opposed sides of the elongate resilient retention structure and is configured to operatively engage the base plate when the nut plate gripper grips the nut plate to precisely orient the base plate relative to the nut plate gripper along an orienting axis.

The methods include aligning the nut plate gripper with the nut plate. The aligning includes aligning a longitudinal axis of an elongate resilient retention structure of the nut plate gripper with a threaded central opening of a nut of the nut plate and concurrently aligning a pair of orienting structures of the nut plate gripper with a base plate of the nut plate. The methods also include gripping the nut plate with the nut plate gripper by moving the nut plate gripper and the nut plate toward one another along an engagement axis such that the elongate resilient retention structure extends within, and defines an interference fit with, the threaded central opening and also such that the pair of orienting structures operatively engages the base plate to precisely orient the base plate relative to the nut plate gripper along an orienting axis.

DESCRIPTION

Figure 1:
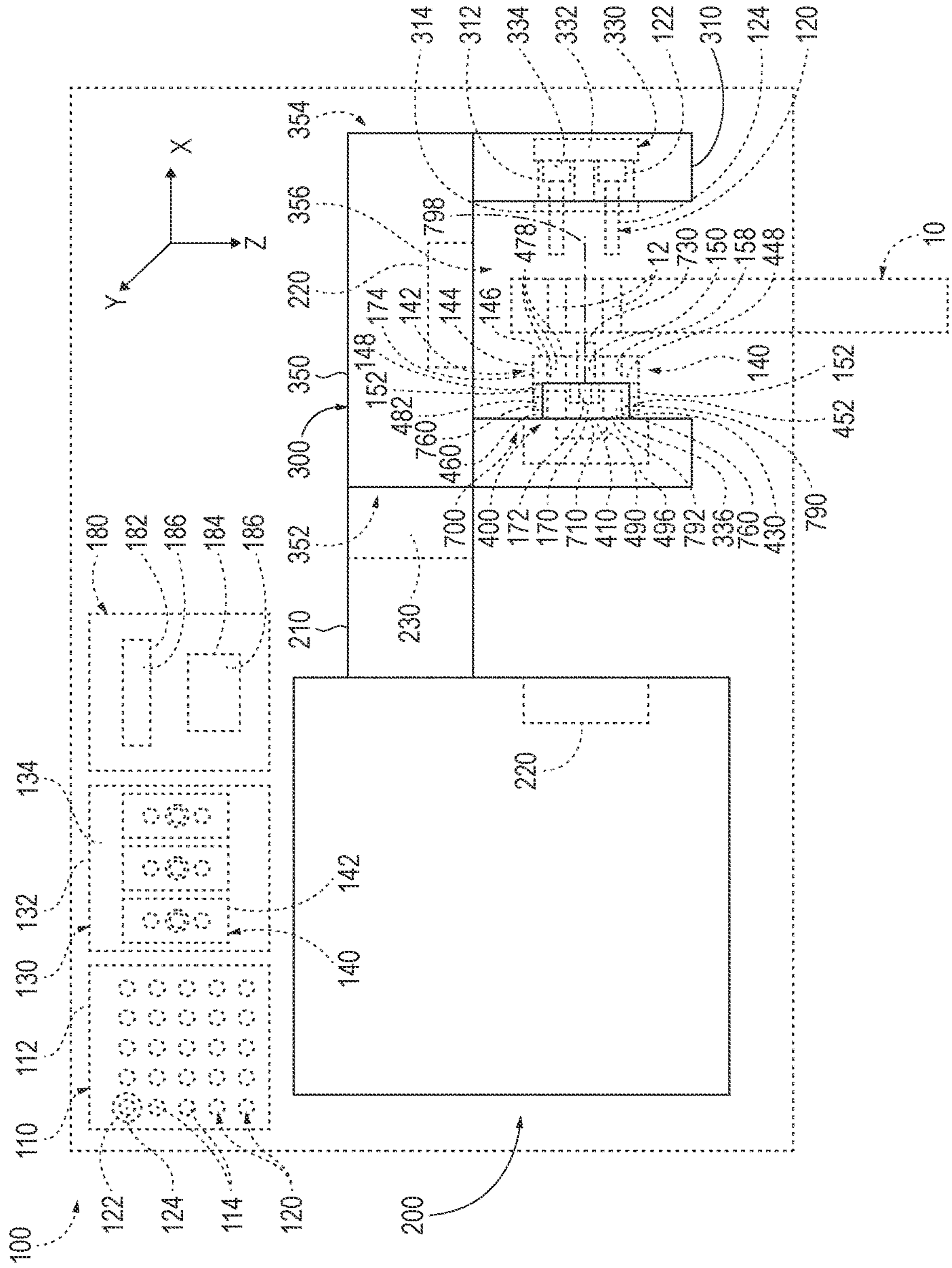
FIG. 1 is a schematic illustration of examples of a nut plate installation system that includes a nut plate installation robot that includes an end effector that includes a nut plate gripper, according to the present disclosure.

FIGS. 1-23 provide illustrative, non-exclusive examples of nut plate grippers 400/700, of end effectors 300 that include nut plate grippers 400/700, of nut plate installation robots 200 that include end effectors 300, of nut plate installation systems 100 that include nut plate installation robots 200, and/or of methods 500 and 600, according to the present disclosure. Elements that serve a similar, or at least substantially similar, purpose are labeled with like numbers in each of FIGS. 1-23, and these elements may not be discussed in detail herein with reference to each of FIGS. 1-23. Similarly, all elements may not be labeled in each of FIGS. 1-23, but reference numerals associated therewith may be utilized herein for consistency. Elements, components, and/or features that are discussed herein with reference to one or more of FIGS. 1-23 may be included in and/or utilized with any of FIGS. 1-23 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 2:
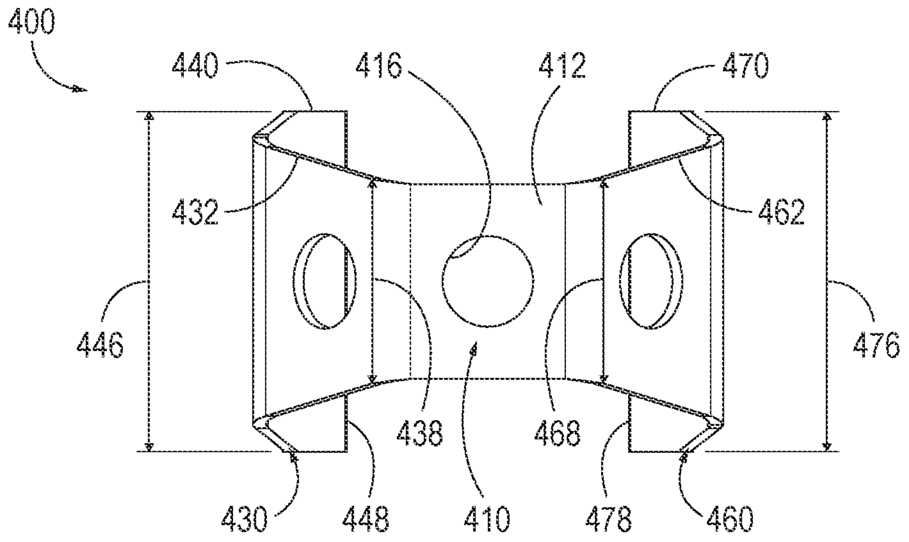
FIG. 2 is a less schematic top view illustrating an example of a nut plate gripper, according to the present disclosure.
Figure 3:
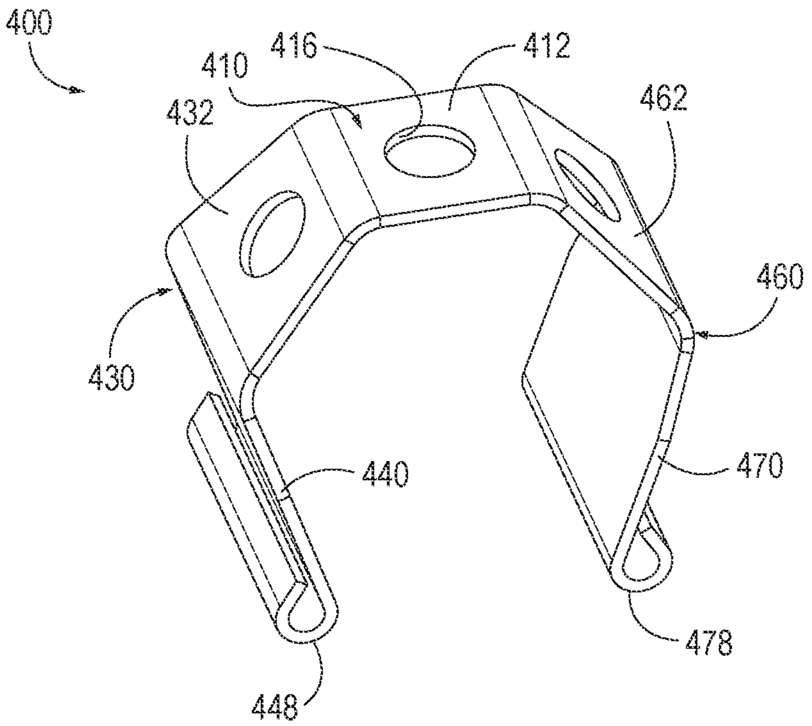
FIG. 3 is a less schematic side view illustrating an example of a nut plate gripper, according to the present disclosure.
Figure 4:
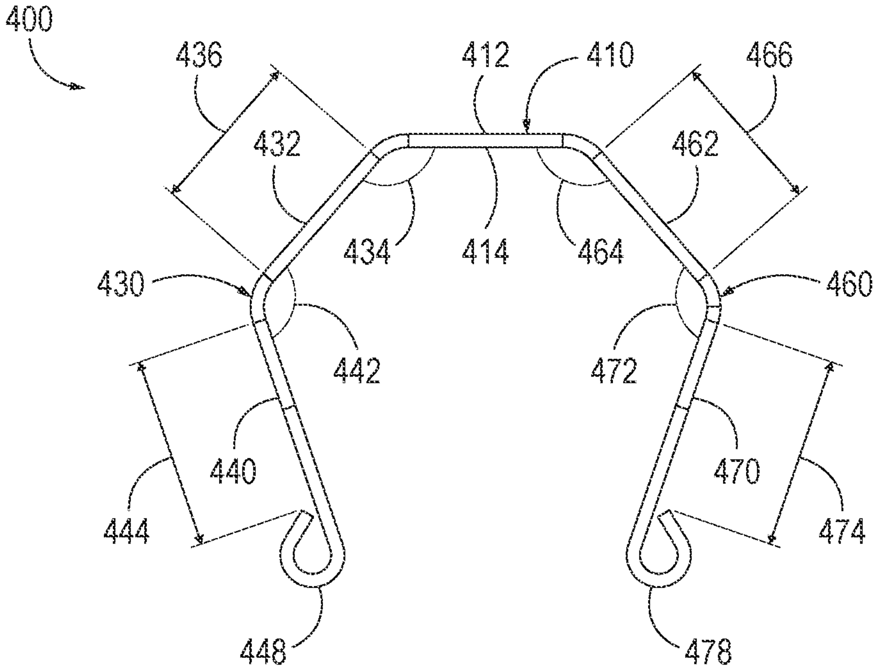
FIG. 4 is a less schematic front view illustrating an example of a nut plate gripper, according to the present disclosure.
Figure 12:
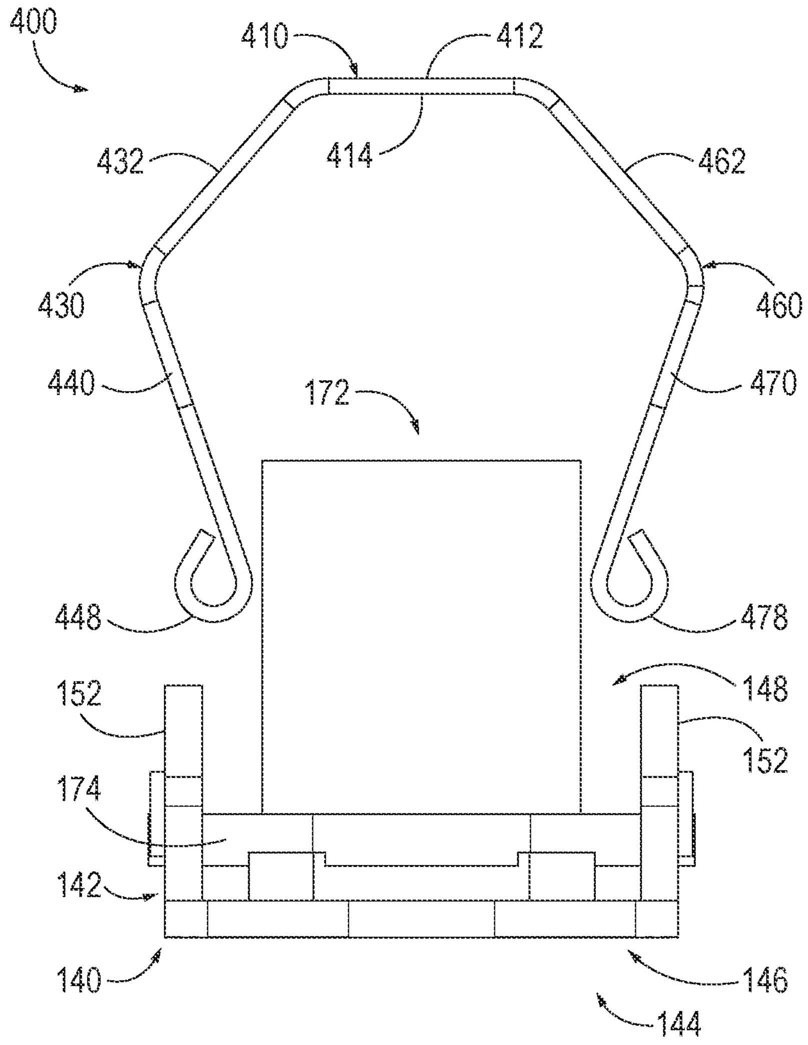
FIG. 12 is an example of a nut plate gripper aligned with a nut plate, according to the present disclosure.
Figure 14:
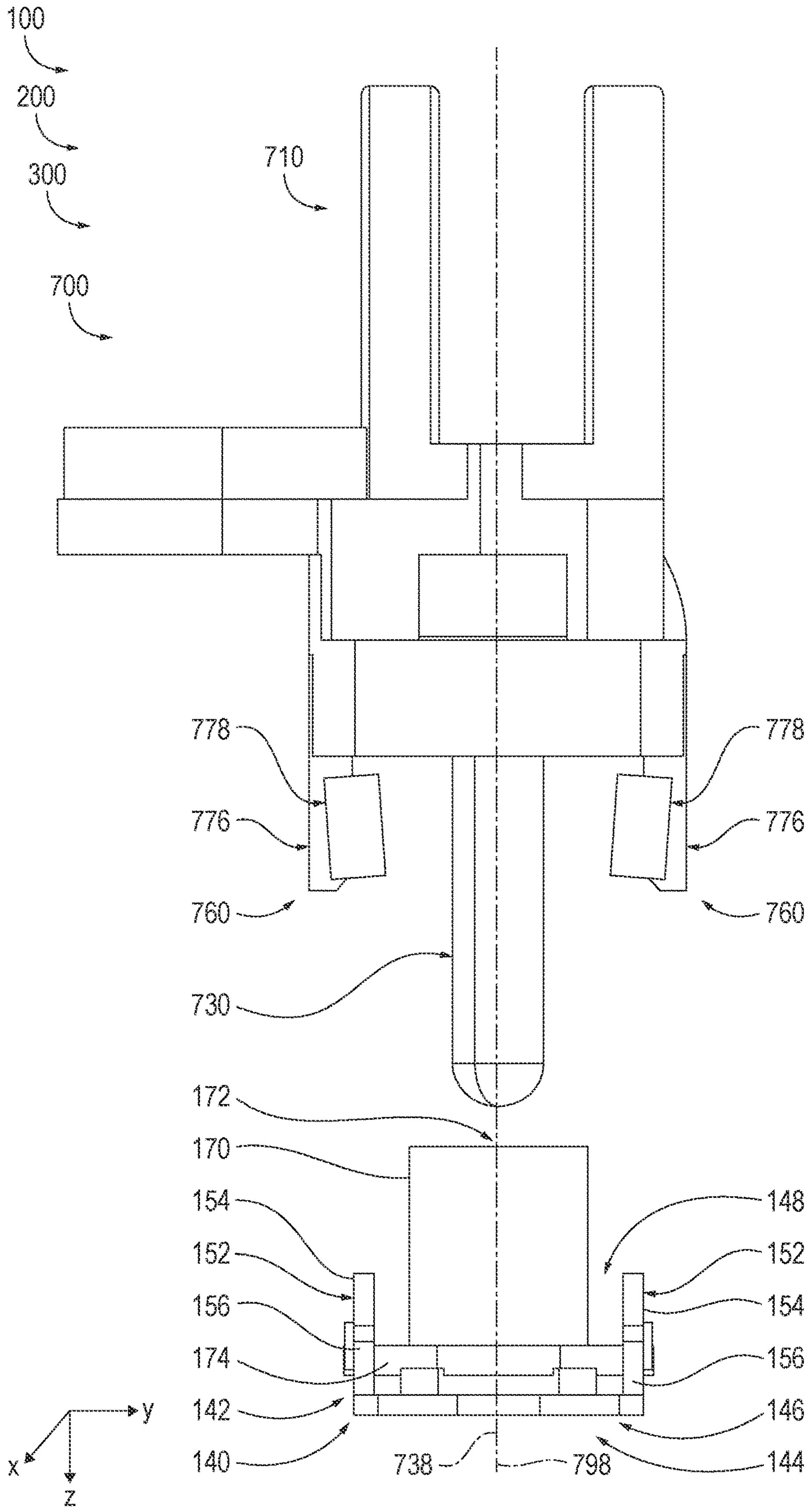
FIG. 14 is an example of another nut plate gripper aligned with a nut plate, according to the present disclosure.
Figure 15:
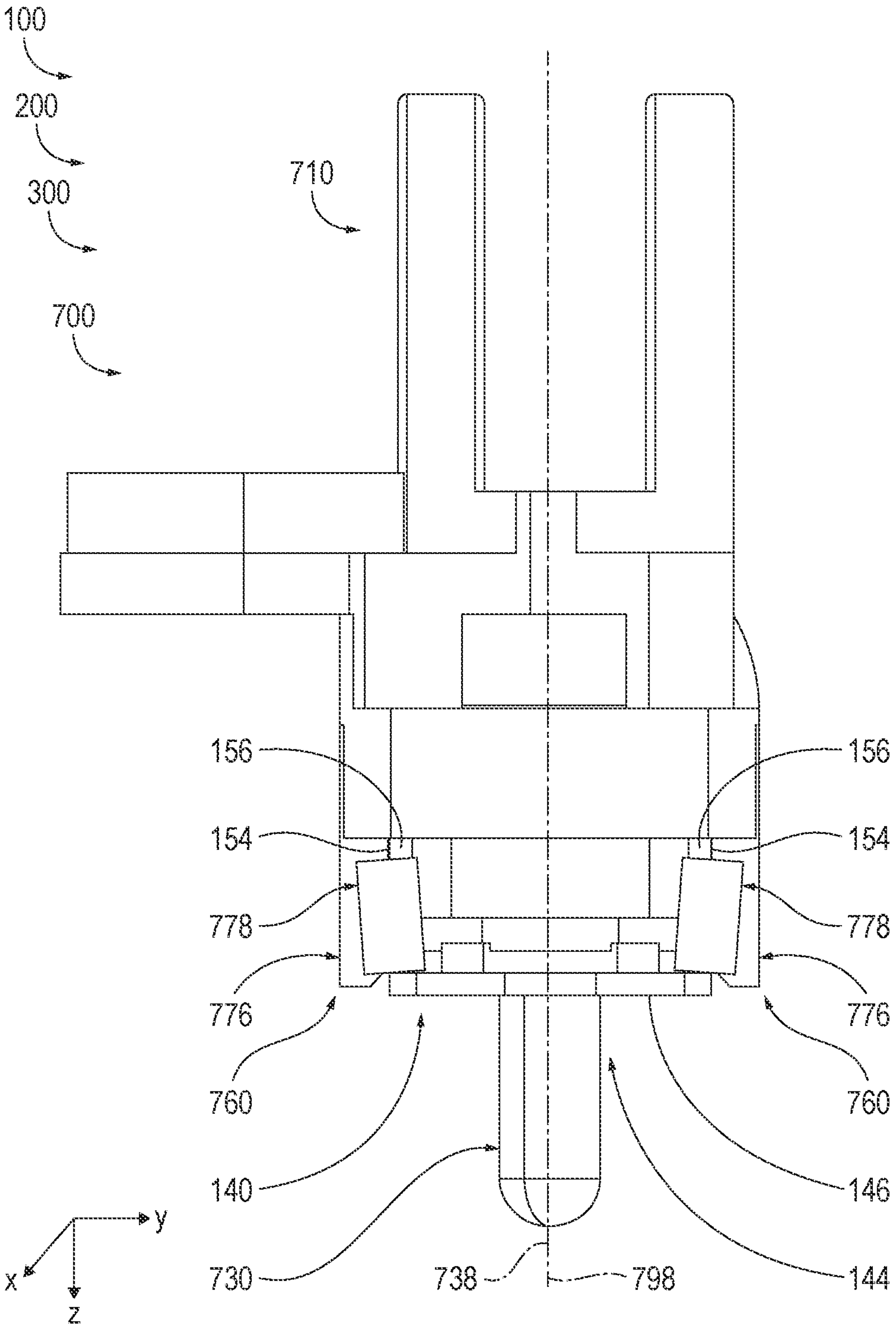
FIG. 15 is an example of the other nut plate gripper of FIG. 14 gripping a nut plate.

FIG. 1 is a schematic illustration of examples of a nut plate gripper 400/700, which may be included in an end effector 300, which may be included in a nut plate installation robot 200, which may be included in a nut plate installation system 100, according to the present disclosure. FIGS. 2-4 are less schematic views, illustrating an example of a nut plate gripper 400 according to the present disclosure; and FIGS. 5-10 are less schematic views, illustrating examples of nut plate grippers 700 according to the present disclosure. Nut plate grippers 400/700 are configured to grip a nut plate 140. FIG. 12 is an example of nut plate gripper 400 aligned with a nut plate 140, FIG. 13 is an example of nut plate gripper 400 gripping nut plate 140, FIG. 14 is an example of nut plate gripper 700 aligned with nut plate 140, and FIG. 15 is an example of nut plate gripper 700 gripping nut plate 140.

FIGS. 2-10 and/or FIGS. 12-15 may include and/or be more detailed and/or less schematic illustrations of nut plate grippers 400/700 that are schematically illustrated in FIG. 1. With this in mind, any of the structures, functions, and/or features that are disclosed herein with reference to nut plate grippers 400 of FIGS. 2-4 and FIGS. 12-13, and/or with reference to nut plate grippers 700 of FIGS. 5-10 and FIGS. 14-15 may be included in and/or utilized with nut plate grippers 400/700 of FIG. 1 without departing from the scope of the present disclosure. Similarly, any of the structures, functions, and/or features that are disclosed herein with reference to nut plate installation system 100, nut plate installation robot 200, end effector 300, and/or nut plate grippers 400/700 of FIG. 1 may be included in and/or utilized with nut plate grippers 400/700 of FIGS. 2-10 and FIGS. 12-15 without departing from the scope of the present disclosure.

With general reference to the examples illustrated in FIGS. 1-4 and FIGS. 12-13, nut plate gripper 400 includes an attachment region 410, which may be configured to facilitate attachment of the nut plate gripper to end effector 300, which is illustrated in FIG. 1. Nut plate gripper 400 also includes a first resilient projecting region 430 and a second resilient projecting region 460. First resilient projecting region 430 extends from attachment region 410 and defines a first nut plate-contacting end 448. Similarly, second resilient projecting region 460 extends from attachment region 410 and defines a second nut plate-contacting end 478.

Figure 13:
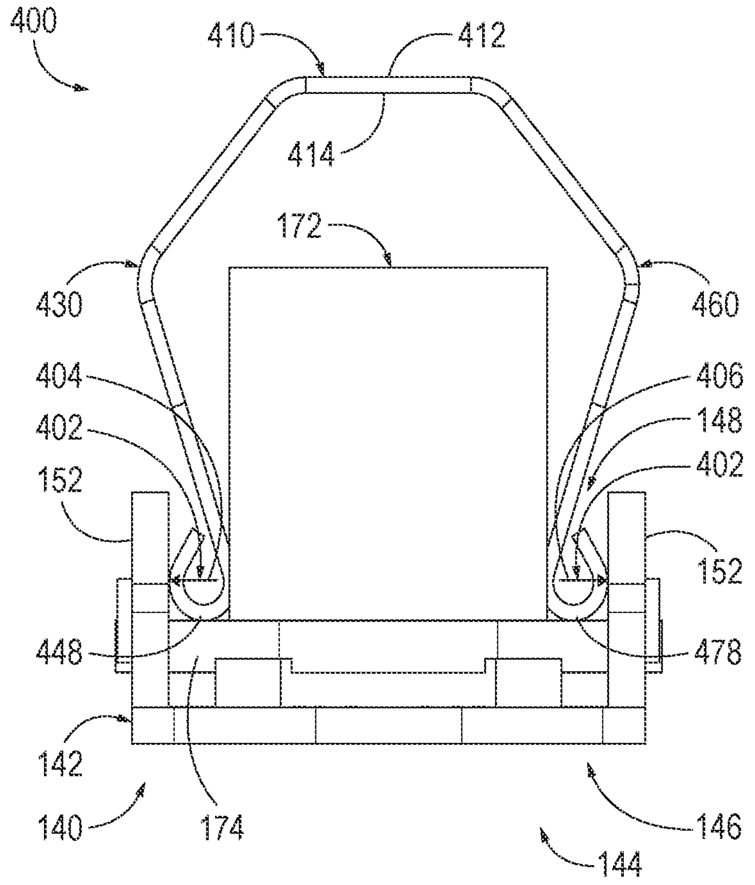
FIG. 13 is an example of a nut plate gripper gripping a nut plate, according to the present disclosure.

First resilient projecting region 430 and second resilient projecting region 460 may be configured to resiliently deflect toward one another to facilitate insertion of first nut plate-contacting end 448 and second nut plate-contacting end 478 between a pair of opposed plate flanges 152 of a base plate 142 of nut plate 140, as illustrated in FIGS. 1 and 12-13. Additionally or alternatively, and when first nut plate-contacting end 448 and second nut plate-contacting end 478 are positioned between the pair of opposed plate flanges 152, first resilient projecting region 430 and second resilient projecting region 460 may be configured to apply a retaining force 402, as illustrated in FIG. 13, to the pair of opposed plate flanges 152. The retaining force may retain nut plate 140 on nut plate gripper 400.

Figure 11:
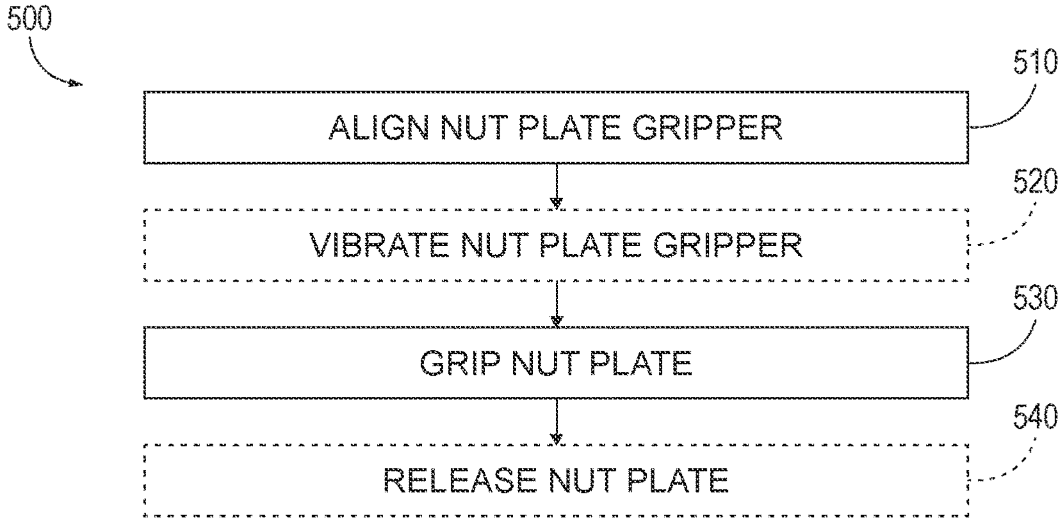
FIG. 11 is a flowchart depicting examples of methods of gripping a nut plate utilizing a nut plate gripper, according to the present disclosure.

When nut plate gripper 400 is utilized to grip nut plates 140, and as discussed in more detail herein with reference to methods 500 of FIG. 11, nut plate gripper 400 may be aligned with nut plate 140, as illustrated in FIG. 12. This alignment may be such that first nut plate-contacting end 448 of first resilient projecting region 430 and second nut plate-contacting end 478 of second resilient projecting region 460 are aligned with the pair of opposed plate flanges 152 of base plate 142 of nut plate 140. Subsequently, nut plate gripper 400 may be utilized to grip nut plate 140. This may include motion of nut plate gripper 400 and nut plate 140 toward one another such that first nut plate-contacting end 448, and second nut plate-contacting end 478 are positioned between the pair of opposed plate flanges 152 and apply retaining force 402 thereto, as illustrated in FIG. 13.

Attachment region 410 may include any suitable structure that may be adapted, configured, designed, and/or constructed to facilitate attachment of nut plate gripper 400 to a suitable end effector 300. As an example, and as perhaps best illustrated in FIGS. 2-3, nut plate gripper 400 may include a fastener-receiving region 416. Fastener-receiving region 416 may be configured to receive a fastener that operatively attaches nut plate gripper 400 to end effector 300. An example of fastener-receiving region 416 includes a fastener-receiving hole, which may be defined within, may extend within, and/or may extend through nut plate gripper 400. Examples of the fastener include a rivet, a threaded fastener, a screw, a bolt, and/or a nut.

Attachment region 410 may define a planar, or at least substantially planar, end effector-facing side 412, as illustrated in FIGS. 2-4 and FIGS. 12-13. Stated differently, attachment region 410 may include and/or be a planar, or at least substantially planar, attachment region 410. Such a configuration may increase a contact area between nut plate gripper 400 and end effector 300, thereby increasing a rigidity and/or a reliability of the interconnection therebetween. Attachment region 410 also may define an end effector-opposed side 414, and first resilient projecting region 430 and/or second resilient projecting region 460 may extend from end effector-opposed side 414 and/or away from end effector-facing side 412.

First resilient projecting region 430 and second resilient projecting region 460 may include and/or be any suitable structure and may define any suitable shape that may extend from attachment region 410 and/or that may define first nut plate-contacting end 448 and second nut plate-contacting end 478, respectively. In some examples, first resilient projecting region 430 and second resilient projecting region 460 may symmetrically extend from attachment region 410. Stated differently, first resilient projecting region 430 and second resilient projecting region 460 may be mirror, or at least substantially mirror, images of one another. Stated still differently, first resilient projecting region 430 and second resilient projecting region 460 may be symmetric about an axis of symmetry that extends therebetween.

In some examples, and as perhaps best illustrated in FIGS. 2-4 and 12, first resilient projecting region 430 may include a first divergent region 432 and a first convergent region 440. First divergent region 432 extends from attachment region 410 and tapers away from second resilient projecting region 460. First convergent region 440 extends from first divergent region 432 to first nut plate-contacting end 448 and tapers toward second resilient projecting region 460.

First divergent region 432 may extend from attachment region 410 at a first divergent region angle 434, as illustrated in FIG. 4. Examples of first divergent region angle 434 include obtuse first divergent region angles, as well as first divergent region angles of at least 90°, at least 100°, at least 110°, at least 120°, at least 130°, at least 140°, at least 150°, at least 160°, at most 170°, at most 160°, at most 150°, at most 140°, at most 130°, at most 120°, at most 110°, and/or at most 100°.

In some examples, first divergent region 432 may include and/or be a planar, or at least substantially planar, first divergent region 432. Stated differently, at least a portion, or subset, of a surface area of first divergent region 432 may be planar, or at least substantially planar.

In some examples, first divergent region 432 may extend a first divergent region length 436 from attachment region 410, as illustrated in FIG. 4. Examples of first divergent region length 436 include lengths of at least 1 millimeter (mm), at least 1.5 mm, at least 2 mm, at least 2.5 mm, at least 3 mm, at least 3.5 mm, at least 4 mm, at least 4.5 mm, at least 5 mm, at most 10 mm, at most 9 mm, at most 8 mm, at most 7 mm, at most 6 mm, at most 5 mm, at most 4 mm, and/or at most 3 mm.

In some examples, first divergent region 432 may have and/or define an average first divergent region width 438, as illustrated in FIG. 2. Examples of average first divergent region width 438 include widths of at least 2 mm, at least 2.5 mm, at least 3 mm, at least 3.5 mm, at least 4 mm, at least 4.5 mm, at least 5 mm, at least 5.5 mm, at least 6 mm, at most 12 mm, at most 11 mm, at most 10 mm, at most 9 mm, at most 8 mm, at most 7 mm, at most 6 mm, at most 5 mm, and/or at most 4 mm.

In some examples, first convergent region 440 may extend at a first convergent region angle 442 relative to first divergent region 432, as illustrated in FIG. 4. Examples of first convergent region angle 442 include obtuse first convergent region angles, as well as first convergent region angles of at least 90°, at least 100°, at least 110°, at least 120°, at least 130°, at least 140°, at least 150°, at least 160°, at most 170°, at most 160°, at most 150°, at most 140°, at most 130°, at most 120°, at most 110°, and/or at most 100°.

In some examples, first convergent region 440 may include and/or be a planar, or at least substantially planar, first convergent region 440. Stated differently, at least a portion, or a subset, of a surface area of first convergent region 440 may be planar, or at least substantially planar.

In some examples, first convergent region 440 may extend a first convergent region length 444 from first divergent region 432, as illustrated in FIG. 4. Examples of first convergent region length 444 include lengths of at least 1 mm, at least 1.5 mm, at least 2 mm, at least 2.5 mm, at least 3 mm, at least 3.5 mm, at least 4 mm, at least 4.5 mm, at least 5 mm, at most 10 mm, at most 9 mm, at most 8 mm, at most 7 mm, at most 6 mm, at most 5 mm, at most 4 mm, and/or at most 3 mm.

In some examples, first convergent region 440 may have and/or define an average first convergent region width 446, as illustrated in FIG. 2. Examples of average first convergent region width 446 include widths of at least 5 mm, at least 5.5 mm, at least 6 mm, at least 6.5 mm, at least 7 mm, at least 7.5 mm, at least 8 mm, at least 8.5 mm, at least 9 mm, at most 15 mm, at most 14 mm, at most 13 mm, at most 12 mm, at most 11 mm, at most 10 mm, at most 9 mm, and/or at most 8 mm.

In some examples, first convergent region 440 may include a first pair of opposed ramps 452, as illustrated in FIG. 1. The first pair of opposed ramps 452 may be positioned on opposed sides of first convergent region 440 and may project away from first convergent region 440 such that, when nut plate gripper 400 grips nut plate 140, opposed outer edges of a first plate flange of plate flanges 152 face toward the first pair of opposed ramps 452. First pair of opposed ramps 452 may be angled relative to one another and/or relative to the opposed outer edges of the first plate flange. Such a configuration may permit and/or facilitate precise and/or reproducible positioning of nut plate 140 relative to nut plate gripper 400 along a length of first nut plate-contacting end 448 thereof and/or along the Z-axis illustrated in FIG. 1.

First nut plate-contacting end 448 may have and/or define any suitable shape. As an example, and as perhaps best illustrated in FIGS. 2-4 and FIGS. 12-13, first nut plate-contacting end 448 may include and/or be a rounded first nut plate-contacting end 448. Such a configuration may facilitate gripping of nut plate 140 by nut plate gripper 400, such as by facilitating insertion of first nut plate-contacting end 448 between the pair of opposed plate flanges 152 of base plate 142 of nut plate 140.

In some examples, and as perhaps best illustrated in FIGS. 2-4 and 12, second resilient projecting region 460 may include a second divergent region 462 and a second convergent region 470. Second divergent region 462 extends from attachment region 410 and tapers away from first resilient projecting region 430. Second convergent region 470 extends from second divergent region 462 to second nut plate-contacting end 478 and tapers toward first resilient projecting region 430.

Second divergent region 462 may extend from attachment region 410 at a second divergent region angle 464, as illustrated in FIG. 4. Examples of second divergent region angle 464 include obtuse second divergent region angles, as well as second divergent region angles of at least 90°, at least 100°, at least 110°, at least 120°, at least 130°, at least 140°, at least 150°, at least 160°, at most 170°, at most 160°, at most 150°, at most 140°, at most 130°, at most 120°, at most 110°, and/or at most 100°.

In some examples, second divergent region 462 may include and/or be a planar, or at least substantially planar, second divergent region 462. Stated differently, at least a portion, or subset, of a surface area of second divergent region 462 may be planar, or at least substantially planar.

In some examples, second divergent region 462 may extend a second divergent region length 466 from attachment region 410, as illustrated in FIG. 4. Examples of second divergent region length 466 include lengths of at least 1 mm, at least 1.5 mm, at least 2 mm, at least 2.5 mm, at least 3 mm, at least 3.5 mm, at least 4 mm, at least 4.5 mm, at least 5 mm, at most 10 mm, at most 9 mm, at most 8 mm, at most 7 mm, at most 6 mm, at most 5 mm, at most 4 mm, and/or at most 3 mm.

In some examples, second divergent region 462 may have and/or define an average second divergent region width 468, as illustrated in FIG. 2. Examples of average second divergent region width 468 include widths of at least 2 mm, at least 2.5 mm, at least 3 mm, at least 3.5 mm, at least 4 mm, at least 4.5 mm, at least 5 mm, at least 5.5 mm, at least 6 mm, at most 12 mm, at most 11 mm, at most 10 mm, at most 9 mm, at most 8 mm, at most 7 mm, at most 6 mm, at most 5 mm, and/or at most 4 mm.

In some examples, second convergent region 470 may extend at a second convergent region angle 472 relative to second divergent region 462, as illustrated in FIG. 4. Examples of second convergent region angle 472 include obtuse second convergent region angles, as well as second convergent region angles 472 of at least 90°, at least 100°, at least 110°, at least 120°, at least 130°, at least 140°, at least 150°, at least 160°, at most 170°, at most 160°, at most 150°, at most 140°, at most 130°, at most 120°, at most 110°, and/or at most 100°.

In some examples, second convergent region 470 may include and/or be a planar, or at least substantially planar, second convergent region 470. Stated differently, at least a portion, or subset, of a surface area of second convergent region 470 may be planar, or at least substantially planar.

In some examples, second convergent region 470 may extend a second convergent region length 474 from second divergent region 462, as illustrated in FIG. 4. Examples of second convergent region length 474 include lengths of at least 1 mm, at least 1.5 mm, at least 2 mm, at least 2.5 mm, at least 3 mm, at least 3.5 mm, at least 4 mm, at least 4.5 mm, at least 5 mm, at most 10 mm, at most 9 mm, at most 8 mm, at most 7 mm, at most 6 mm, at most 5 mm, at most 4 mm, and/or at most 3 mm.

In some examples, second convergent region 470 may have and/or define an average second convergent region width 476, as illustrated in FIG. 2. Examples of average second convergent region width 476 include widths of at least 5 mm, at least 5.5 mm, at least 6 mm, at least 6.5 mm, at least 7 mm, at least 7.5 mm, at least 8 mm, at least 8.5 mm, at least 9 mm, at most 15 mm, at most 14 mm, at most 13 mm, at most 12 mm, at most 11 mm, at most 10 mm, at most 9 mm, and/or at most 8 mm.

In some examples, second convergent region 470 may include a second pair of opposed ramps 482, as illustrated in FIG. 1. The second pair of opposed ramps 482 may be positioned on opposed sides of second convergent region 470 and may project away from second convergent region 470 such that, when nut plate gripper 400 grips nut plate 140, opposed outer edges of a second plate flange of plate flanges 152 face toward the second pair of opposed ramps 482. Second pair of opposed ramps 482 may be angled relative to one another and/or relative to the opposed outer edges of the second plate flange. Such a configuration may permit and/or facilitate precise and/or reproducible positioning of nut plate 140 relative to nut plate gripper 400 along a length of second nut plate-contacting end 478 thereof and/or along the Z-axis illustrated in FIG. 1.

Second nut plate-contacting end 478 may have and/or define any suitable shape. As an example, and as perhaps best illustrated in FIGS. 2-4 and FIGS. 12-13, second nut plate-contacting end 478 may include and/or be a rounded second nut plate-contacting end 478. Such a configuration may facilitate gripping of nut plate 140 by nut plate gripper 400, such as by facilitating insertion of second nut plate-contacting end 478 between the pair of opposed plate flanges 152 of base plate 142 of nut plate 140.

Nut plate gripper 400 may grip nut plate 140 in any suitable manner. As an example, and with reference to FIG. 13, when nut plate gripper 400 grips nut plate 140, a first retaining force 404 of first resilient projecting region 430 and a second retaining force 406 of second resilient projecting region 460 may act against base plate 142 of nut plate 140. More specifically, first retaining force 404 and second retaining force 406 may act against the pair of opposed plate flanges 152 of base plate 142, such as to retain nut plate 140 on nut plate gripper 400.

As another example, and when nut plate gripper 400 grips nut plate 140, first nut plate-contacting end 448 may be configured to define a corresponding two-point contact with the base plate 142 of the nut plate 140 to locate base plate 142 relative to first nut plate-contacting end 448 in two dimensions, such as the X- and Y-dimensions and/or along the X- and Y-axes of FIG. 1. In addition, second nut plate-contacting end 478 may be configured to define another corresponding two-point contact with the base plate 142 of nut plate 140 to locate base plate 142 relative to second nut plate-contacting end 478 in the two dimensions, such as the X- and Y-dimensions of FIG. 1. Such a configuration may cause nut plate gripper 400 and nut plate 140 to have a predetermined, consistent, and/or repeatable relative orientation, at least in the two dimensions, such as the X- and Y-dimensions of FIG. 1, when nut plate gripper 400 grips nut plate 140. In addition, and when nut plate gripper 400 includes first pair of opposed ramps 452 and/or second pair of opposed ramps 482, nut plate gripper 400 and nut plate 140 also may have a predetermined, consistent, and/or repeatable relative orientation in a third dimension, such as the Z-dimension, or along the Z-axis, of FIG. 1.

It is within the scope of the present disclosure that nut plate gripper 400 may be configured to repeatedly grip, and also to repeatedly release, nut plate 140. This repeated grip and/or repeated release may be performed without damage to nut plate 140 and/or nut plate gripper 400. Stated differently, nut plate gripper 400 may be configured to be utilized with and/or to position a plurality of different nut plates 140, such as via methods 500 and/or 600 that are discussed in more detail herein.

Nut plate gripper 400 may include and/or may be defined from any suitable structure and/or material. In some examples, nut plate gripper 400 may include and/or be a unitary nut plate gripper 400 and/or a monolithic nut plate gripper 400. Stated differently, nut plate gripper 400 may be formed and/or defined from a single and/or a continuous nut plate gripper material. In some examples, nut plate gripper 400 may include and/or be a metallic nut plate gripper 400. In some examples, nut plate gripper 400 may be defined by a strip of steel and/or a strip of spring steel. In some examples, nut plate gripper 400 may include and/or be a formed metallic strip.

Nut plate gripper 400 may be configured to passively grip nut plate 140 responsive to an insertion force that urges first nut plate-contacting end 448 and second nut plate-contacting end 478 between the pair of opposed plate flanges 152. This is illustrated by the transition from the configuration illustrated in FIG. 12 to the configuration illustrated in FIG. 13. Additionally or alternatively, nut plate gripper 400 may be configured to passively release nut plate 140 responsive to a separation force that urges first nut plate-contacting end 448 and second nut plate-contacting end 478 from between the pair of opposed plate flanges 152. This is illustrated by the transition from the configuration illustrated in FIG. 13 to the configuration illustrated in FIG. 12.

As illustrated in dashed lines in FIG. 1, nut plate gripper 400 may include a vibration structure 490. Vibration structure 490, when present, may be adapted, configured, designed, and/or constructed to vibrate first resilient projecting region 430 and/or second resilient projecting region 460. This vibration may be utilized to permit and/or to facilitate insertion of first nut plate-contacting end 448 and second nut plate-contacting end 478 between the pair of opposed plate flanges 152 of nut plate 140. Additionally or alternatively, this vibration may be utilized to permit and/or facilitate positioning of base plate rivet openings 158 of nut plate 140 onto corresponding rivets 120, as is discussed in more detail herein. An example of vibration structure 490 includes a vibration motor.

As also illustrated in FIG. 1, and while not required of all embodiments, nut plate gripper 400 may include a gripper actuator 496. Gripper actuator 496, when present, may be configured to selectively urge first resilient projecting region 430 and second resilient projecting region 460 toward one another. This may facilitate insertion of first nut plate-contacting end 448 and second nut plate-contacting end 478 between the pair of opposed plate flanges 152 and/or may facilitate separation of nut plate gripper 400 from the nut plate 140. Additionally or alternatively, gripper actuator 496 may be configured to selectively urge first resilient projecting region 430 and second resilient projecting region 460 away from one another, such as to cause nut plate gripper 400 to grip nut plate 140. Examples of gripper actuator 496 include a mechanical actuator, a pneumatic actuator, a hydraulic actuator, a cam, and/or a double-acting cam.

Nut plate 140 may include and/or be any suitable structure that may be adapted, configured, designed, sized, and/or constructed to permit and/or facilitate attachment of two of more components of a structure 10, such as an aircraft, as illustrated in FIG. 1. In some examples, and with general reference to FIGS. 1 and 12-13, nut plate 140 may include base plate 142. Base plate 142 may have and/or define the pair of opposed plate flanges 152. In addition, base plate 142 may define a structure-contacting region 144 that defines a structure-facing side 146 and a structure-opposed side 148 (see FIG. 14). Base plate 142 also may define a fastener opening 150, as illustrated in FIG. 1, which may extend through structure-contacting region 144 of base plate 142 and/or may extend between structure-facing side 146 and structure-opposed side 148. Base plate 142 further may define base plate rivet openings 158, which may be configured to receive rivets 120.

Nut plate 140 also may include a nut 170, as illustrated in FIG. 1. Nut 170 may be operatively attached to base plate 142. In addition, nut 170 may define a threaded central opening 172, which may be aligned with fastener opening 150 of base plate 142. Nut 170 may be operatively attached to structure-opposed side 148 of base plate 142 and/or may be positioned between the pair of opposed plate flanges 152. Nut plate 140 may be configured to permit limited motion of nut 170 relative to base plate 142. As an example, a spring clip 174 may operatively attach nut 170 to base plate 142 while permitting the limited motion. As discussed, nut plate gripper 400 may be configured to define a two-point contact between first nut plate-contacting end 448 and nut plate 140 and also between second nut plate-contacting end 478 and nut plate 140. This two-point contact may include one point of contact between first nut plate-contacting end 448 and/or second nut plate-contacting end 478 and a corresponding region of spring clip 174 and a second point of contact between first nut plate-contacting end 448 and/or second nut plate-contacting end 478 and a corresponding one of the pair of opposed plate flanges 152, as illustrated in FIG. 13.

As discussed, nut plate 140 may be configured to permit limited motion of nut 170 relative to base plate 142. Such a configuration may permit and/or facilitate improved utilization of nut plate 140 to attach the two or more components of structure 10, such as via permitting a corresponding fastener to be inserted into threaded central opening 172 despite minor misalignment. However, such a configuration also causes a relative orientation between base plate 142 and threaded central opening 172 to be inconsistent and/or to vary, at least within the constraints of the permitted limited motion. With this in mind, and as discussed, nut plate gripper 400 according to the present disclosure, may grip nut plate 140 without extending within threaded central opening 172. Stated differently, and when nut plate gripper 400 grips nut plate 140, nut plate gripper 400 may be entirely external of threaded central opening 172. Such a configuration may permit nut plate gripper 400, according to the present disclosure, to grip and/or position nut plate 140 more precisely and/or reproducibly than would be possible if nut plate gripper 400 were to extend within threaded central opening 172 and/or to grip nut plate 140 via threaded central opening 172.

With general reference to the examples illustrated in FIGS. 1, 5-10, and 14-15, nut plate gripper 700 is configured to grip a nut plate, such as nut plate 140 of FIGS. 1 and 14-15, along an engagement axis 798. As discussed in more detail herein, nut plate 140 includes a base plate 142, which defines a pair of opposed plate flanges 152, and a nut 170 that is operatively attached to base plate 142 and defines a threaded central opening 172.

Nut plate gripper 700 includes an attachment region 710, which may be configured to facilitate attachment of nut plate gripper 700 to an end effector, such as end effector 300, which is discussed in more detail herein. Nut plate gripper 700 also includes an elongate resilient retention structure 730, which extends from attachment region 710 along engagement axis 798 and is sized for an interference fit within threaded central opening 172 of nut 170. Nut plate gripper 700 further includes a pair of orienting structures 760 positioned on opposed sides of elongate resilient retention structure 730 and configured to operatively engage base plate 142 when nut plate gripper 700 grips nut plate 140, such as to precisely orient base plate 142 relative to nut plate gripper 700 along an orienting axis. Examples of the orienting axis include the X-, Y-, and/or Z-axes illustrated in FIGS. 1, 5-10, and 14-15, and are discussed in more detail herein.

When nut plate gripper 700 is utilized to grip nut plates 140, and as discussed in more detail herein with reference to methods 500 of FIG. 11, nut plate gripper 700 may be aligned with nut plate 140. This alignment may include alignment of a longitudinal axis 738 of elongate resilient retention structure 730 with and/or within a threaded central opening 172 of nut 170 of nut plate 140, as perhaps best illustrated in FIG. 14. This alignment also may include alignment of the pair of orienting structures 760 with base plate 142 of nut plate 140, as also illustrated in FIG. 14. As illustrated, longitudinal axis 738 may extend parallel to, at least substantially parallel to, coextensive with, or at least substantially coextensive with engagement axis 798.

Subsequently, nut plate gripper 700 may be utilized to grip nut plate 140, as illustrated by the transition from the configuration illustrated in FIG. 14 to the configuration illustrated in FIG. 15. This may be accomplished by moving nut plate 140 and nut plate gripper 700 toward one another along engagement axis 798 and/or such that elongate resilient retention structure 730 extends within, and defines an interference fit, with threaded central opening 172 of nut 170. This also may be such that the pair of orienting structures 760 operatively engages with base plate 142 of nut plate 140 to precisely orient base plate 142 relative to nut plate gripper 700 along the orienting axis.

Elongate resilient retention structure 730 may have and/or define any suitable shape that may define longitudinal axis 738, that may extend from attachment region 710 along engagement axis 798, and/or that may be sized for the interference fit within threaded central opening 172 of nut 170. As examples, elongate resilient retention structure 730 may include and/or be a cylindrical elongate resilient retention structure, an at least partially cylindrical elongate resilient retention structure, a conic elongate resilient retention structure, an at least partially conic elongate resilient retention structure, a tubular elongate resilient retention structure, an at least partially tubular elongate resilient retention structure, a hollow elongate resilient retention structure, and/or an at least partially hollow elongate resilient retention structure.

In a more specific example, elongate resilient retention structure 730 may include an alignment region 732 and a retention region 736. Alignment region 732 may be sized to fit within, for a sliding fit within, and/or for an interference-free fit within threaded central opening 172 of nut 170, as illustrated in FIGS. 14-15 and discussed in more detail herein. In contrast, retention region 736 may be sized for the interference fit within threaded central opening 172. In such a configuration, elongate resilient retention structure 730 may be oriented such that, when nut plate gripper 700 is positioned to grip nut plate 140, alignment region 732 enters threaded central opening 172 prior to contact between retention region 736 and threaded central opening 172. Such a configuration may permit and/or facilitate improved insertion of elongate resilient retention structure 730 into threaded central opening 172, even in circumstances in which there is a slight misalignment between elongate resilient retention structure 730 and threaded central opening 172. Stated differently, alignment region 732 may be utilize to guide and/or direct retention region 736 into threaded central opening 172, thereby decreasing a need for precise alignment between elongate resilient retention structure 730 and threaded central opening 172 prior to nut plate 140 being gripped by nut plate gripper 700.

Alignment region 732 may have and/or define any suitable shape. As an example, alignment region 732 may include and/or be a cylindrical, or an at least partially cylindrical, alignment region. As another example, and as illustrated in FIGS. 5-8, alignment region 732 may include an alignment region tip 734, which may be shaped to facilitate insertion of alignment region 732 into threaded central opening 172. Examples of alignment region tip 734 include a rounded alignment region tip, an at least partially spherical alignment region tip, and/or an at least partially conical alignment region tip.

Retention region 736 may have and/or define any suitable shape. As examples, retention region 736 may include and/or be a tapered retention region, a ribbed retention region, a fingered retention region, and/or an at least partially conic retention region.

Elongate resilient retention structure 730 may be sized such that a maximum transverse dimension of at least a region of elongate resilient retention structure 730, such as retention region 736, is greater than an inside diameter of threaded central opening 172. The maximum transverse dimension may be measured in a direction that is perpendicular to longitudinal axis 738 and/or that is perpendicular to engagement axis 798. Such a configuration may permit and/or facilitate the interference fit between elongate resilient retention structure 730 and threaded central opening 172.

It is within the scope of the present disclosure that elongate resilient retention structure 730 may define a retention structure aspect ratio, such as may be defined as a ratio of a length of elongate resilient retention structure 730 to a width of elongate resilient retention structure 730. The length may be measured along and/or parallel to longitudinal axis 738, while the width may be measured perpendicular to longitudinal axis 738. Examples of the retention structure aspect ratio include aspect ratios of at least 2, at least 3, at least 4, at least 5, at least 6, at least 7, at least 8, at most 15, at most 10, at most 9, at most 8, at most 7, and/or at most 6.

Elongate resilient retention structure 730 may define the interference fit in any suitable manner. As an example, and when nut plate gripper 700 grips nut plate 140, at least a region of elongate resilient retention structure 730 may be compressed by nut 170. This compression may be in a direction that is perpendicular to engagement axis 798 and/or perpendicular to longitudinal axis 738.

Elongate resilient retention structure 730 may include and/or be defined by a retention structure material, which may differ from an orienting structure material that is included in and/or that defines the pair of orienting structures 760. Examples of the retention structure material include a resilient retention structure material, an elastomeric retention structure material, and a polymeric retention structure material. Examples of the orienting structure material include a resilient orienting structure material and a polymeric orienting structure material. More specific examples of the orienting structure material include acrylonitrile butadiene styrene, polyethylene terephthalate, polylactic acid, poly-ether-ether-ketone, polycarbonate, and nylon.

In general, the retention structure material may be more flexible and/or more resilient when compared to the orienting structure material. As an example, a retention structure Young's Modulus of the retention structure material may be less than an orienting structure Young's modulus of the orienting structure material. As more specific examples, a ratio of the retention structure Young's modulus to the orienting structure Young's modulus may be less than 1.0, less than 0.9, less than 0.8, less than 0.7, less than 0.6, less than 0.5, less than 0.4, less than 0.3, less than 0.2, or less than 0.1.

Elongate resilient retention structure 730 may be defined in any suitable manner. As an example, elongate resilient retention structure 730 may include and/or be a molded elongate resilient retention structure 730. Similarly, orienting structures 760 may be defined in any suitable manner. As an example, orienting structures 760 may include a pair of 3-D printed orienting structures 760. Such a configuration may permit and/or facilitate improved and/or rapid adjustment of one or more dimensions of orienting structures 760, such as to permit and/or facilitate gripping of nut plates 140 of varying geometries by nut plate grippers 700.

The pair of orienting structures 760 may include any suitable structure that may be positioned on opposed sides of elongate resilient retention structure 730 and/or that may be configured to operatively engage base plate 142 to precisely orient base plate 142 relative to nut plate gripper 700 along the orienting axis. As an example, the pair of orienting structures 760 may include and/or be a pair of opposed orienting structures, such as may face toward one another and/or may be symmetrically positioned on opposed sides of elongate resilient retention structure 730.

In some examples, and as perhaps best illustrated in FIGS. 5-8, each orienting structure 760 may include a corresponding chamfered region 762. Chamfered regions 762 may be shaped to facilitate alignment of nut plate 140 with nut plate gripper 700 as nut plate gripper 700 engages with and/or grips nut plate 140. Stated differently, chamfered regions 762 may direct and/or urge nut plate 140 toward a precise orientation along the orienting axis. Chamfered region 762 also may be referred to herein as and/or may be a tapered region 762, a sloped region 762, and/or a rounded region 762. As illustrated, chamfered regions 762 may face toward, or at least partially toward, one another. Such a configuration may be utilized to direct and/or to urge base plate 142 of nut plate 140 between the pair of opposed orienting structures 760.

It is within the scope of the present disclosure that orienting structures 760 may be adapted, configured, designed, and/or constructed to have a desired amount of flexibility, such as along a flex axis that may be perpendicular to engagement axis 798. Stated differently, orienting structures 760 may be designed to bend and/or to flex along the flex axis, and this bending and/or flexing may permit orienting structures 760 to adjust for misalignment with nut plate 140 and/or to at least partially grip nut plate 140. The flexibility may be accomplished in any suitable manner. As an example, a thickness of orienting structures 760 and/or a material of construction of orienting structures 760 may be selected to provide the desired amount of flexibility. As another example, and as illustrated in FIGS. 5-10, orienting structures 760 may define relief regions 770 relative to a remainder of nut plate gripper 700. Relief regions 770, when present, may increase the flexibility of orienting structures 760 without a need to increase a distance for orienting structures 760 to project away from attachment region 710 and/or along engagement axis 798.

It is within the scope of the present disclosure that nut plate grippers 700 may include any suitable number of orienting structures 760 or number of pairs of orienting structures 760. It is also within the scope of the present disclosure that each orienting structure 760, or each pair of orienting structures 760, may be configured to operatively engage base plate 142 and/or to precisely orient base plate 142 relative to nut plate gripper 700 along a corresponding orienting axis.

As an example, orienting structures 760 may include a first pair of orienting structures 760 configured to operatively engage base plate 142 to precisely orient base plate 142 relative to nut plate gripper 700 along a first orienting axis. As another example, orienting structures 760 may include a second pair of orienting structures 760 configured to operatively engage base plate 142 to precisely orient base plate 142 relative to nut plate gripper 700 along a second orienting axis. The second orienting axis may differ from and/or may be perpendicular to the first orienting axis. As yet another example, orienting structures 760 may include a third pair of orienting structures 760 configured to operatively engage base plate 142 to precisely orient base plate 142 relative to nut plate gripper 700 along a third orienting axis. The third orienting axis may differ from and/or may be orthogonal to the first orienting axis and the second orienting axis. An example of the first orienting axis includes one of the X-axis, the Y-axis, and the Z-axis of FIGS. 1 and 5-10. An example of the second orienting axis includes another of the X-axis, the Y-axis, and the Z-axis of FIGS. 1 and 5-10. An example of the third orienting axis includes yet another of the X-axis, the Y-axis, and the Z-axis of FIGS. 1 and 5-10.

Figure 5:
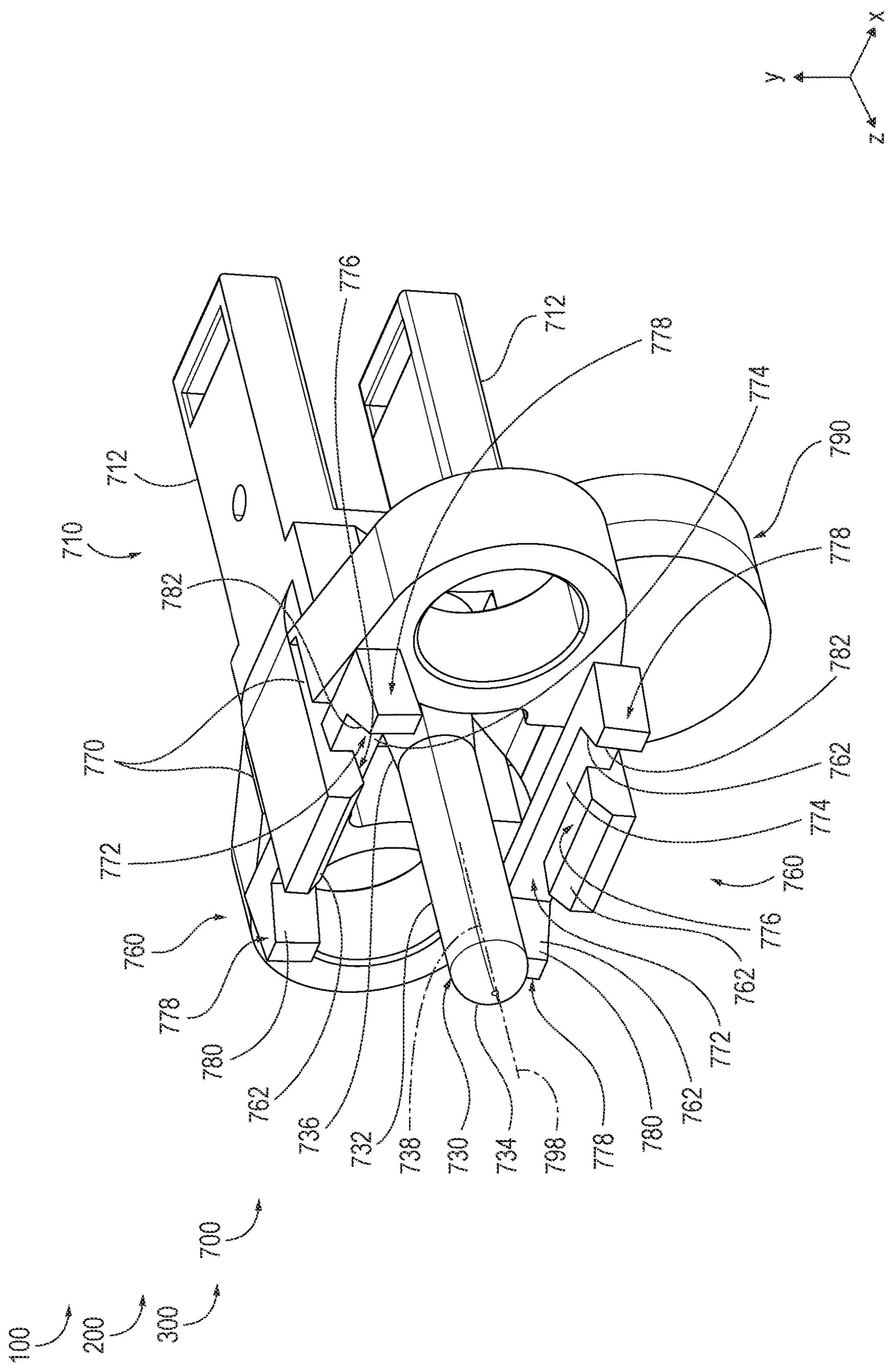
FIG. 5 is a less schematic profile view illustrating an example of another nut plate gripper, according to the present disclosure.
Figure 7:
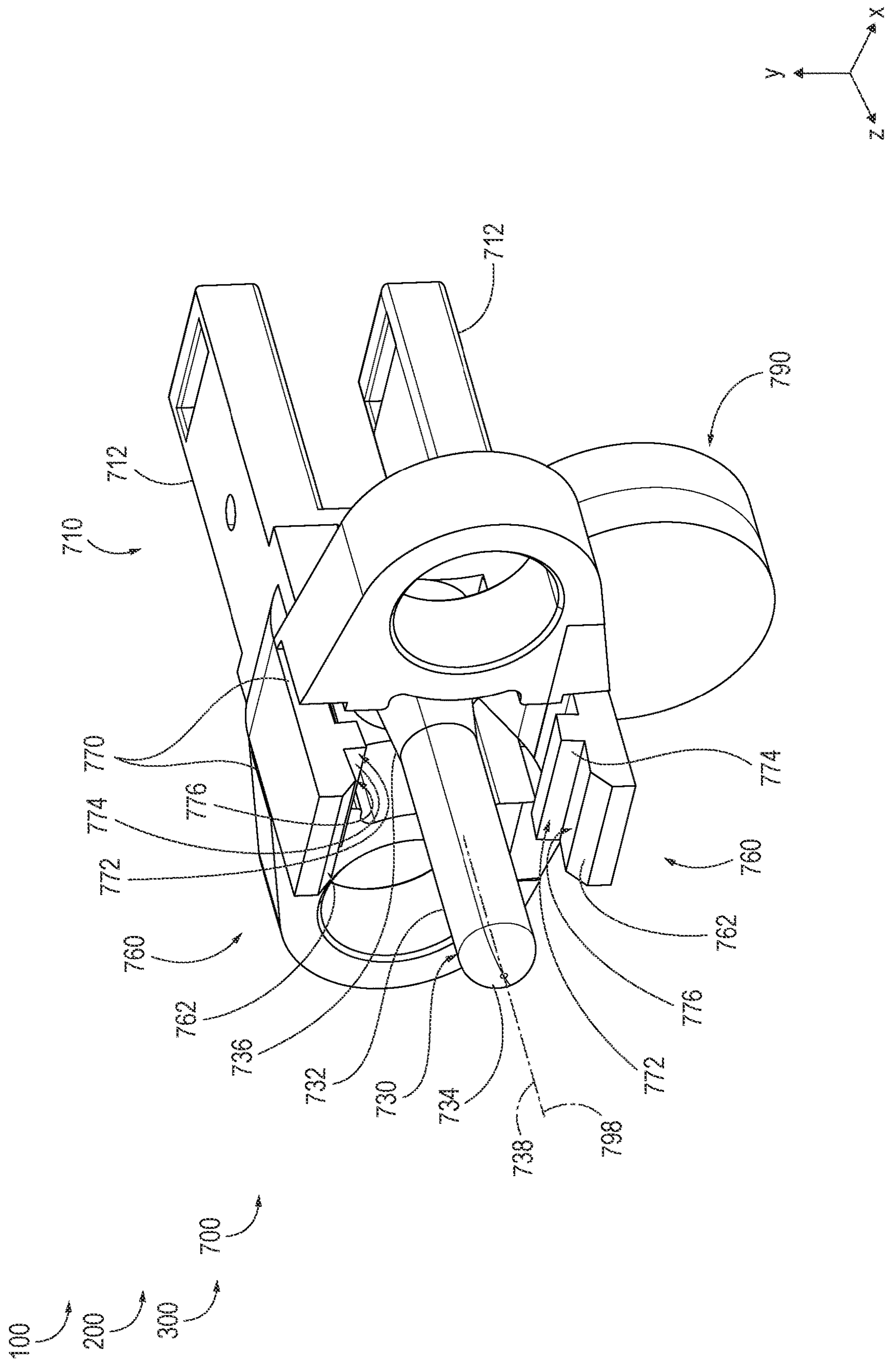
FIG. 7 is a less schematic profile view illustrating an example of another nut plate gripper, according to the present disclosure.
Figure 8:
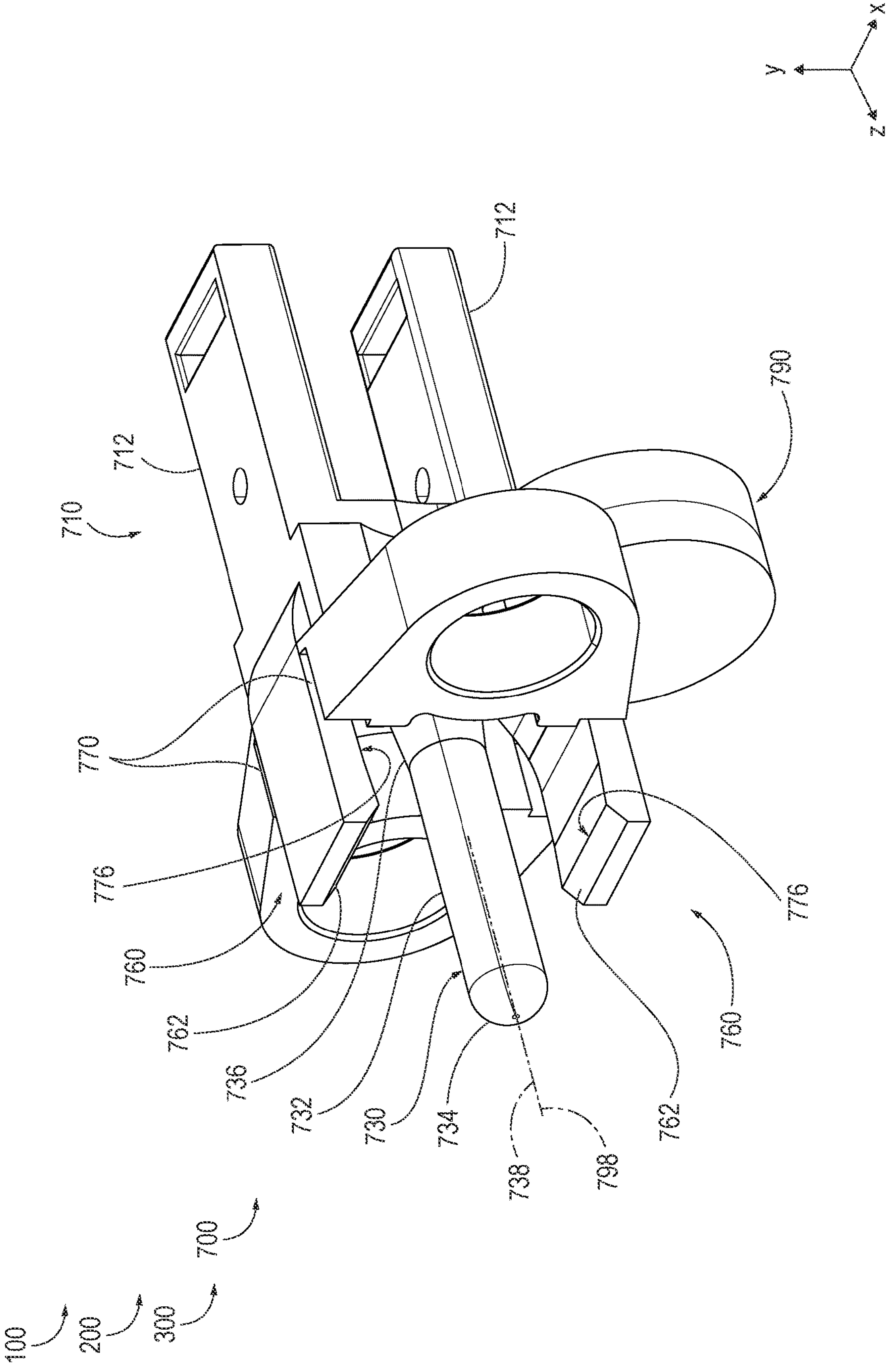
FIG. 8 is a less schematic profile view illustrating an example of another nut plate gripper, according to the present disclosure.

In a more specific example, the pair of orienting structures 760 may include a pair of structure-opposed side-engaging orienting structures 772, as illustrated in FIGS. 5 and 7. The pair of structure-opposed side-engaging orienting structures 772 may be configured to operatively engage structure-opposed side 148 of base plate 142. As an example, structure-opposed side-engaging orienting structures 772 may include and/or define a pair of structure-opposed side-engaging surfaces 774 that extend perpendicular, or at least partially perpendicular, to engagement axis 798. When nut plate gripper 700 grips nut plate 140, structure-opposed side 148 of base plate 142 may rest against and/or contact structure-opposed side-engaging orienting structures 772, thereby precisely orienting base plate 142 relative to nut plate gripper 700 along a corresponding orienting axis that may correspond to and/or may be the Z-axis.

In another more specific example, the pair of orienting structures 760 may include a pair of flange-face-engaging orienting structures 776, as illustrated in FIGS. 5, 7-10, and 14-15. The pair of flange-face-engaging orienting structures 776 may be configured to operatively engage flange faces 154 of plate flanges 152 of nut plates 140, as illustrated in FIGS. 14-15. This may be accomplished in any suitable manner. As an example, the pair of flange-face-engaging orienting structures 776 may extend, or may define surfaces that extend, from attachment region 410 and/or along engagement axis 798. As additional examples, the pair of flange-face-engaging orienting structures 776 may be configured to compress base plate 142 in a direction that is at least partially perpendicular to engagement axis 798, may be configured to compress the pair of opposed plate flanges 152 in the direction that is at least partially perpendicular to engagement axis 798, may be configured to contact a pair of opposed external flange faces 154 of the pair of opposed plate flanges 152, and/or may be configured to grip the pair of opposed plate flanges 152. The operative engagement with flange faces 154 may precisely orient base plate 142 relative to nut plate gripper 700 along a corresponding orienting axis that may correspond to and/or may be the Y-axis.

In another example, the pair of orienting structures 760 may include a pair of flange-edge-engaging orienting structures 778, as illustrated in FIGS. 5 and 14-15. The pair of flange-edge-engaging orienting structures 778 may be configured to operatively engage opposed edges 156 of plate flanges 152, as illustrated in FIGS. 14-15. This may be accomplished in any suitable manner. As an example, and as illustrated in FIG. 5, the pair of flange-edge-engaging orienting structures 778 may define a first flange-edge-engaging projection 780 and a second flange-edge-engaging projection 782. In such a configuration, and when nut plate gripper 700 grips nut plate 140, a corresponding plate flange 152 may extend between and/or may contact first plate flange-edge-engaging projection 780 and second flange-edge-engaging projection 782. This may precisely orient base plate 142 relative to nut plate gripper 700 along a corresponding orienting axis that may corresponds to and/or may be X-axis.

Attachment region 710 may include any suitable structure that may be adapted, configured, designed, and/or constructed to facilitate attachment of nut plate gripper 700 to end effector 300. Examples of attachment region 710 are disclosed herein with reference to attachment region 410 of nut plate gripper 400. In a specific example, and as perhaps best illustrated in FIGS. 5-10, attachment region 710 may include a pair of attachment region extensions 712. Attachment region extensions may extend parallel, or at least substantially parallel, to one another, may extend parallel, or at least substantially parallel, to engagement axis 798, may extend away from elongate resilient retention structure 730, and/or may extend away from orienting structures 760.

Figure 6:
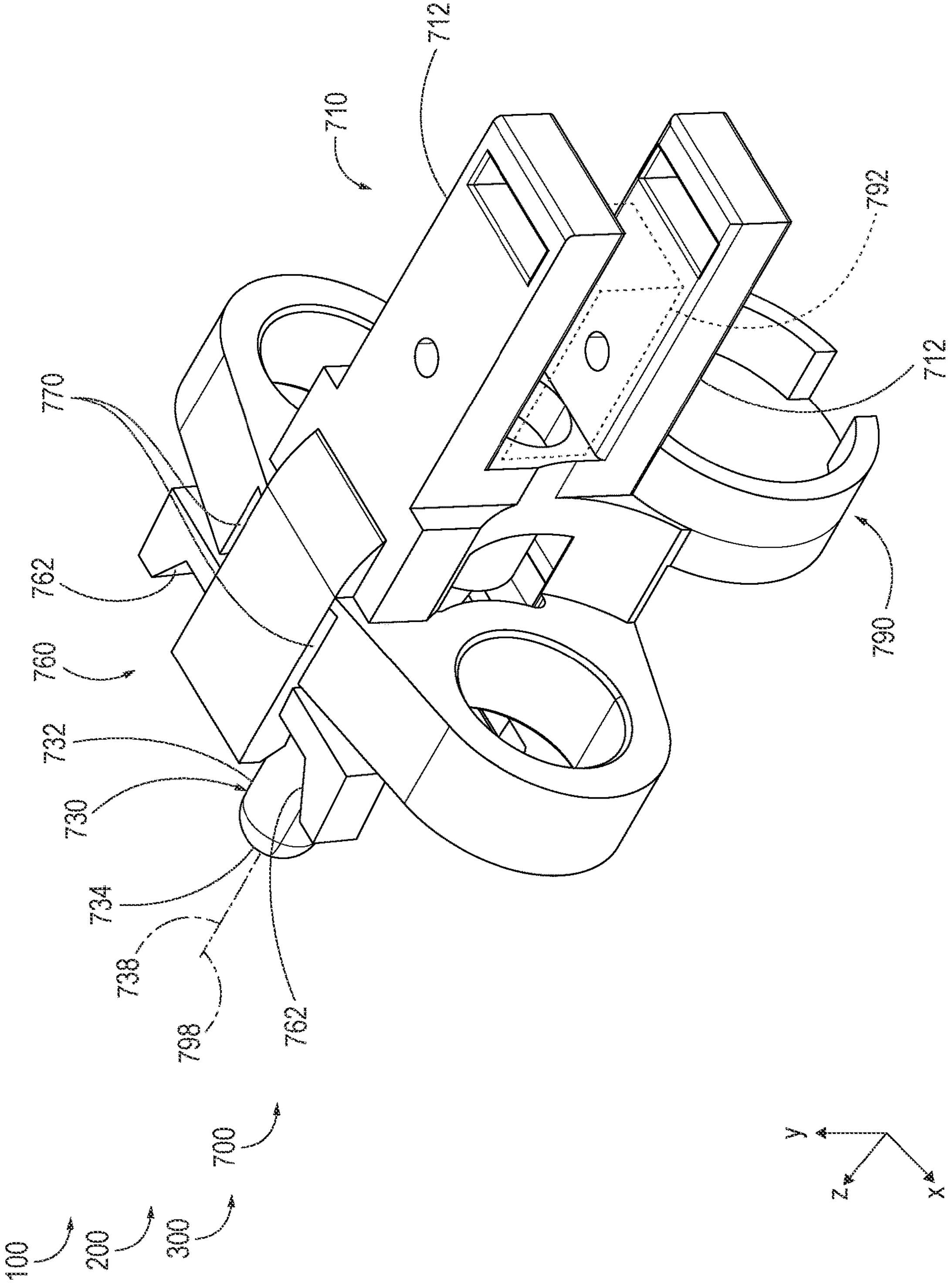
FIG. 6 is another less schematic profile view of the nut plate gripper of FIG. 5.
Figure 9:
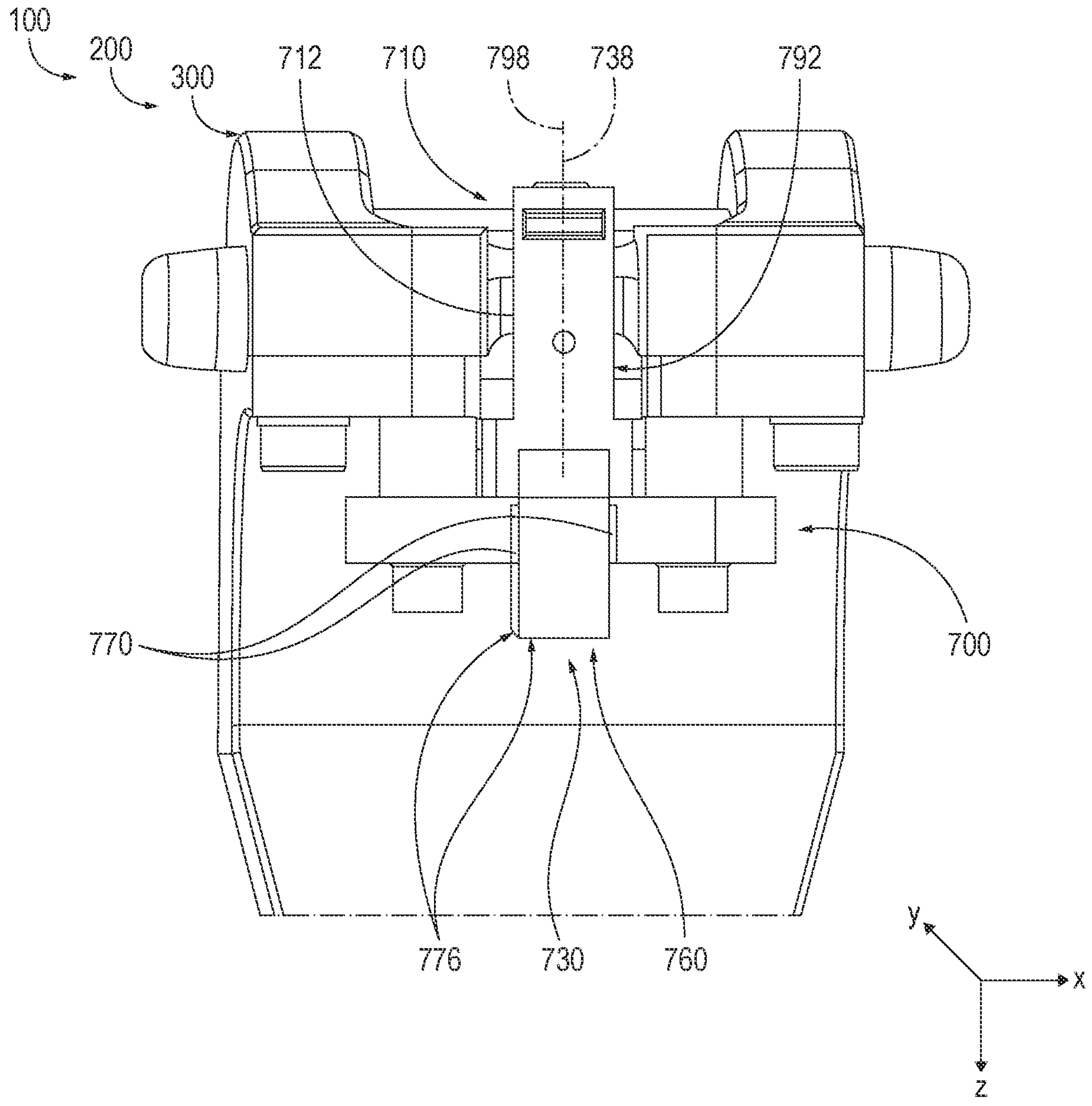
FIG. 9 is a less schematic side view illustrating an example of a nut plate gripper extended along an engagement axis, according to the present disclosure.
Figure 10:
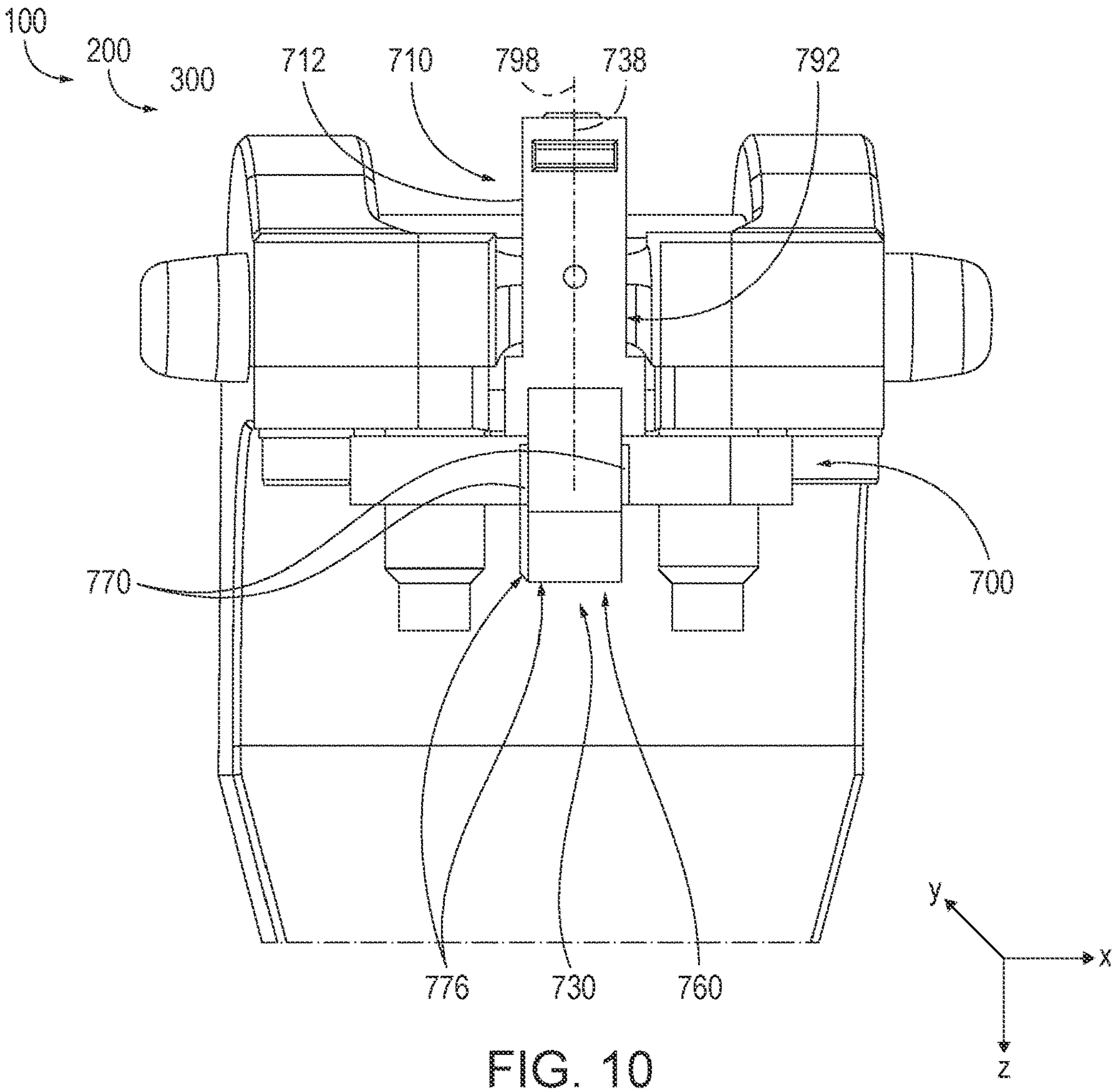
FIG. 10 is a less schematic side view, illustrating an example of a nut plate gripper retracted along an engagement axis, according to the present disclosure.

As illustrated in dashed lines in FIG. 6 and solid lines in FIGS. 9-10, nut plate gripper 700 also may include an engagement axis compliance member 792. Engagement axis compliance member 792 may be configured to permit and/or to facilitate constrained relative motion along engagement axis 798 and between the pair of orienting structures 760 and attachment region 710 and/or between elongate resilient retention structure 730 and attachment region 710. This constrained relative motion along engagement axis 798 is illustrated by the transition between the configuration illustrated in FIG. 9 and the configuration illustrated in FIG. 10 and may be utilized to decrease forces applied to nut plate 140 by nut plate gripper 700 when nut plate gripper 700 is utilized to grip, or initially grip, nut plate 140.

As illustrated in dashed lines in FIG. 1 and in solid lines in FIGS. 5-8, nut plate gripper 700 may include a vibration structure mount 790. Vibration structure mount 790 may be configured to receive a vibration structure, such as vibration structure 490 of FIG. 1; and the vibration structure may be configured to vibrate elongate resilient retention structure 730 and/or orienting structures 760 to facilitate alignment between nut plate gripper 700 and nut plate 140 when nut plate gripper 700 grips nut plate 140.

With general reference to FIGS. 1 and 17-23, end effector 300 may be configured to rivet nut plate 140 to structure 10. In FIGS. 17-23, and for simplicity, end effector 300 is illustrated as including a nut plate gripper in the form of nut plate gripper 400. However, it is within the scope of the present disclosure that end effector 300 additionally or alternatively may include and/or utilize nut plate gripper 700, as indicated in dashed lines in FIGS. 17-23. With this in mind, nut plate gripper 400 may be replaced with nut plate gripper 700 in FIGS. 17-23, without departing from the scope of the present disclosure. Stated differently, and in the context of FIGS. 17-23, any reference to nut plate gripper 400 may be replaced with nut plate gripper 700 without departing from the scope of the present disclosure.

End effector 300 also includes a rivet holder 310 and a yoke 350, which defines a nut plate gripper side 352 and a rivet holder side 354. Nut plate gripper 400 may be operatively attached to nut plate gripper side 352, and/or rivet holder 310 may be operatively attached to rivet holder side 354. This operative attachment may be such that nut plate gripper 400 and rivet holder 310 define a structure-receiving region 356 therebetween. Nut plate gripper 400 may be configured to grip nut plate 140 such that structure-facing side 146 of structure-contacting region 144 of base plate 142 of nut plate 140 faces toward structure-receiving region 356. Rivet holder 310 may be configured to selectively retain a plurality of rivet heads 122 of a plurality of corresponding rivets 120, as illustrated in FIG. 1. This operative retention may be such that a plurality of pins 124 of rivets 120 extends toward structure-receiving region 356, as seen in FIG. 1. Pins 124 also may be referred to herein as and/or may be tails 124 of rivets 120.

Figure 17:
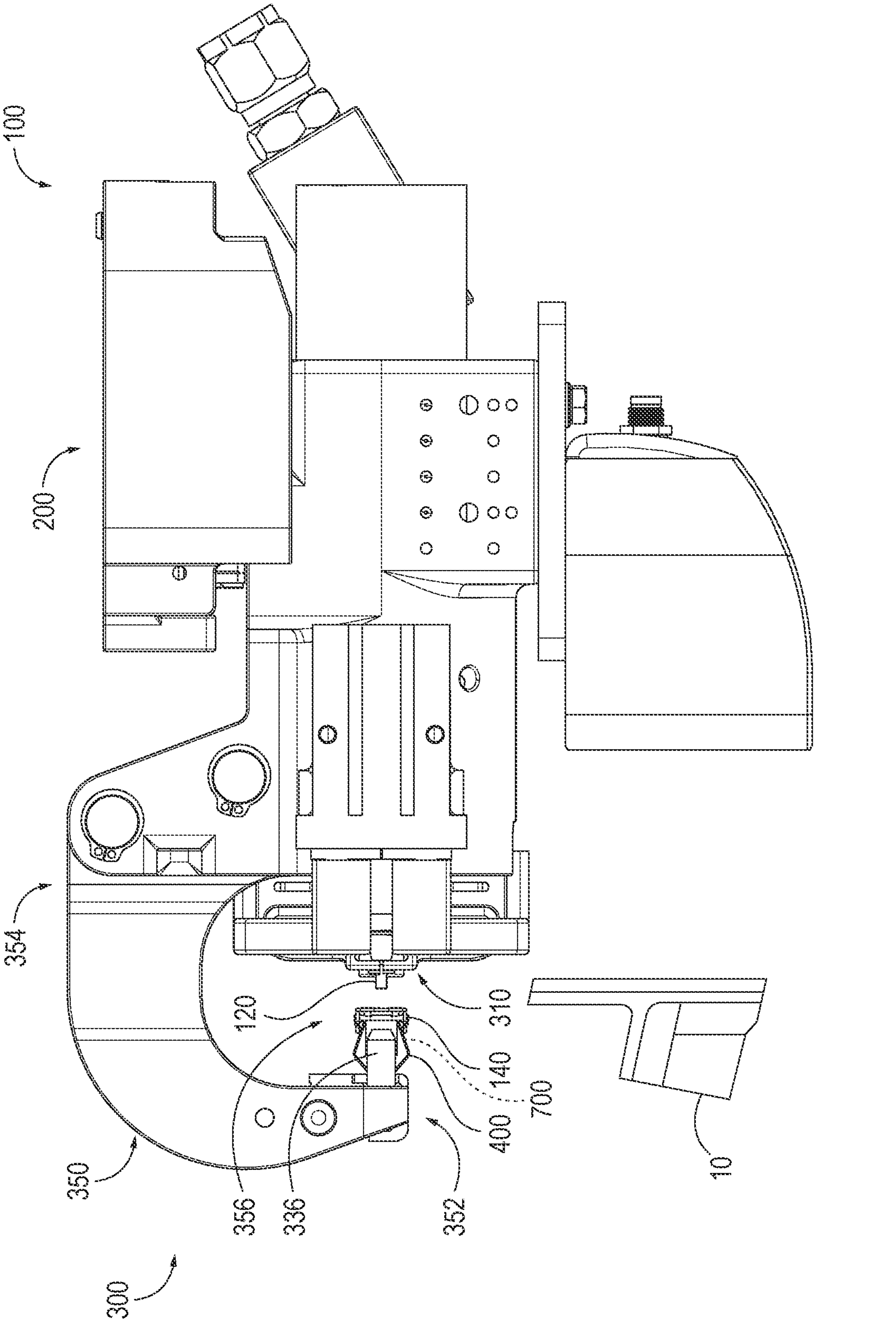
FIG. 17 is an illustration of a nut plate installation system during the methods of FIG. 16.
Figure 19:
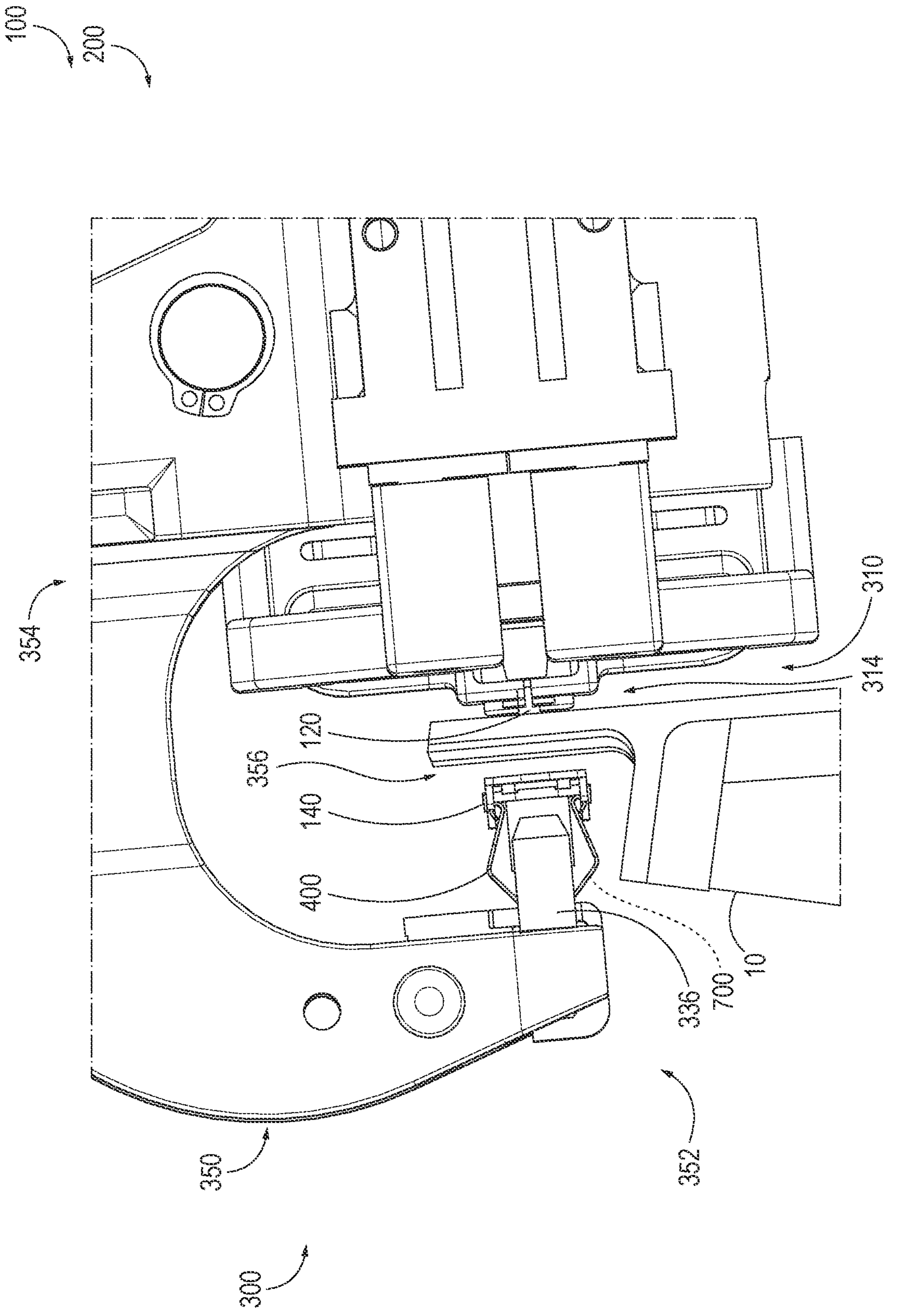
FIG. 19 is an illustration of a nut plate installation system during the methods of FIG. 16.
Figure 20:
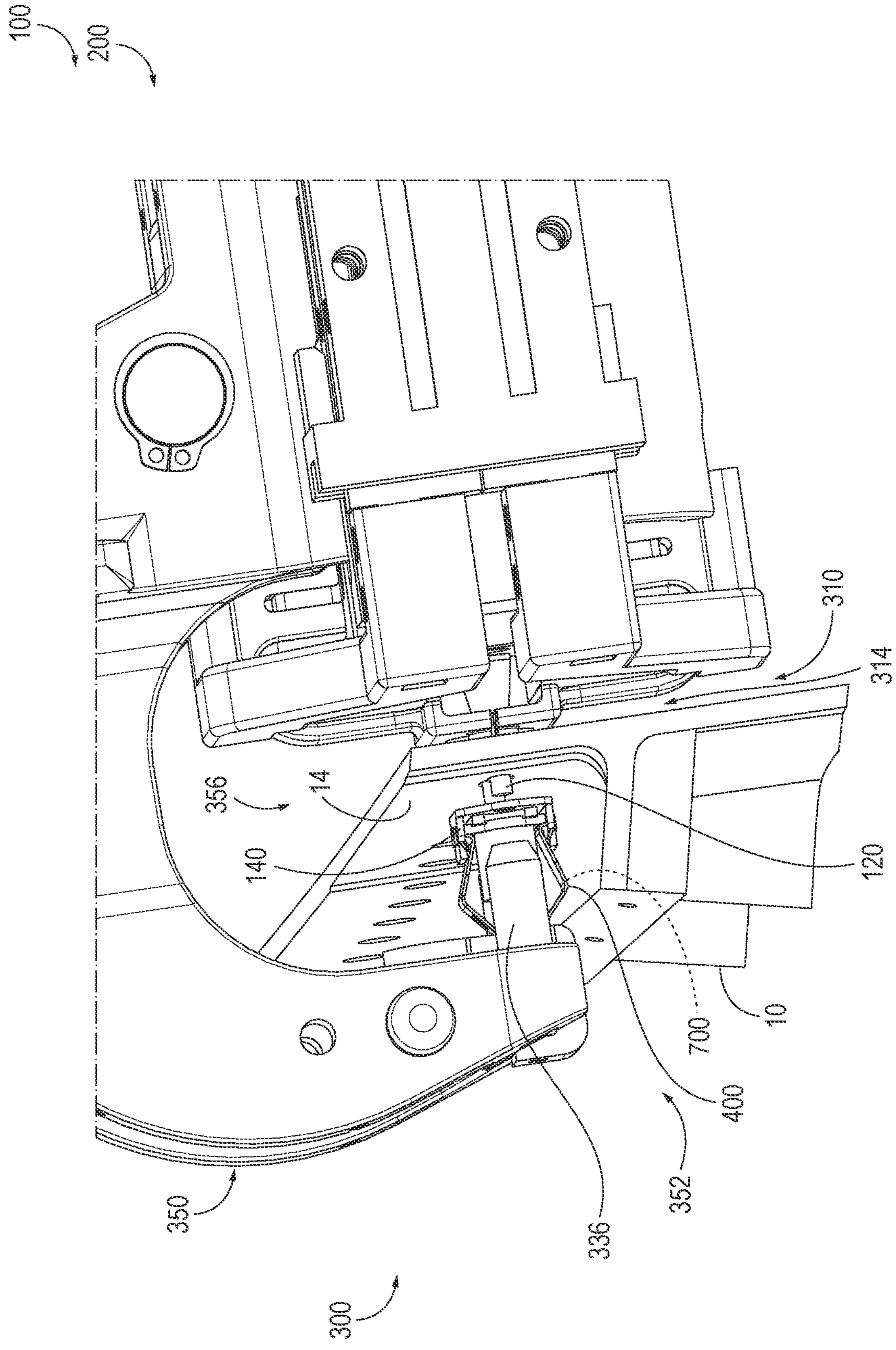
FIG. 20 is an illustration of a nut plate installation system during the methods of FIG. 16.
Figure 21:
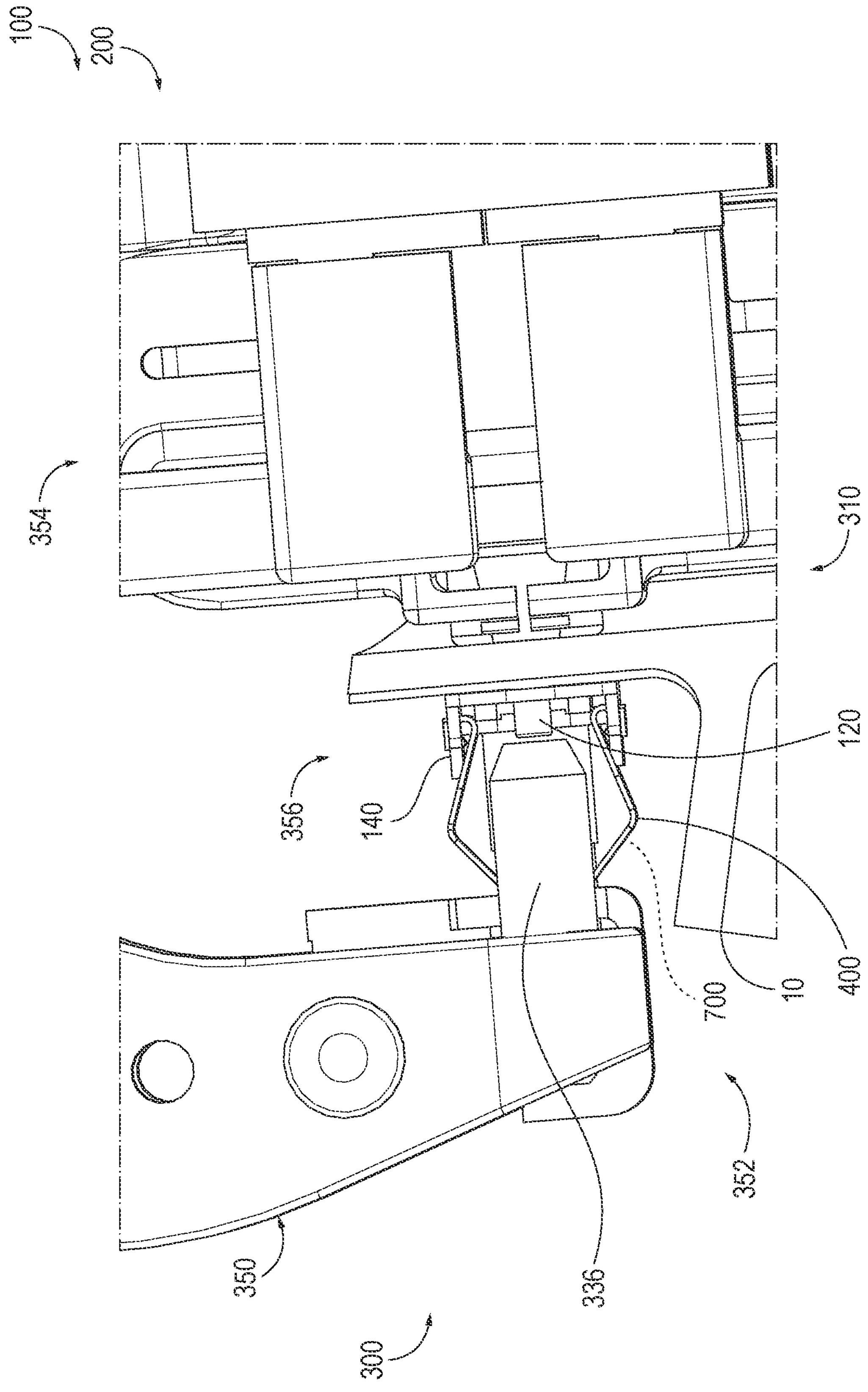
FIG. 21 is an illustration of a nut plate installation system during the methods of FIG. 16.
Figure 22:
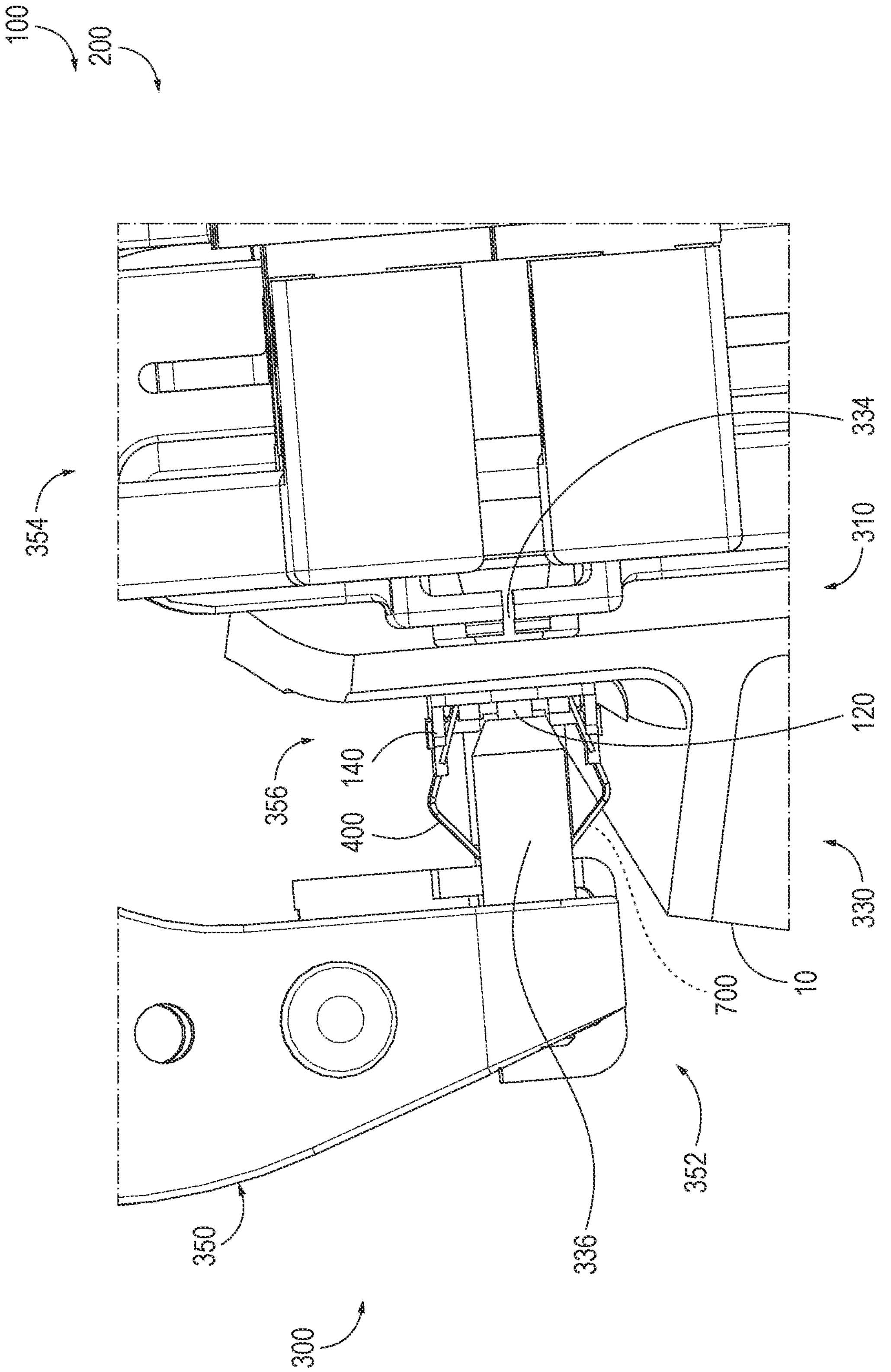
FIG. 22 is an illustration of a nut plate installation system during the methods of FIG. 16.
Figure 23:
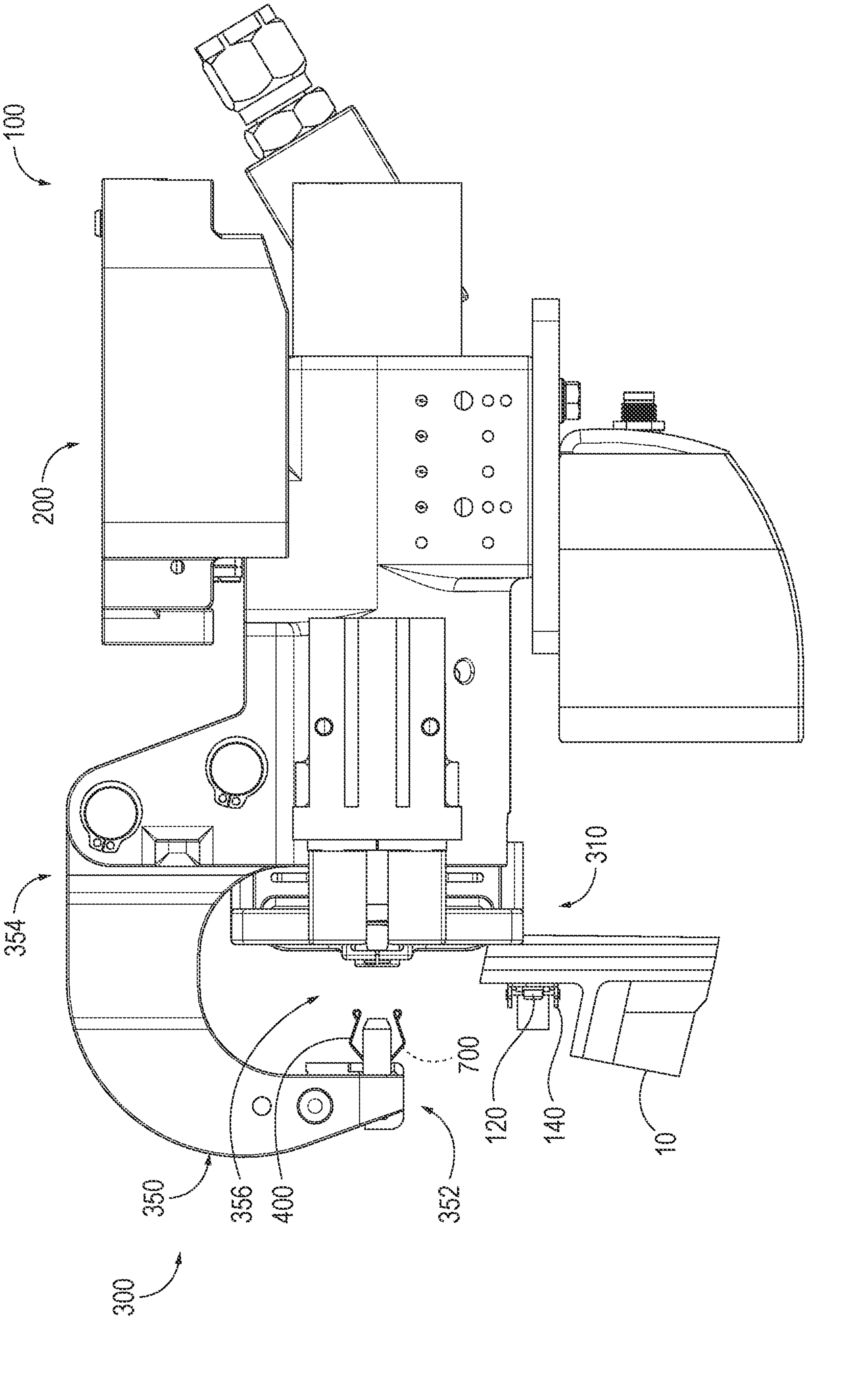
FIG. 23 is an illustration of a nut plate installation system during the methods of FIG. 16.

When end effector 300 is utilized to rivet nut plate 140 to structure 10, and as discussed in more detail herein with reference to methods 500 of FIG. 11, nut plate gripper 400 may grip a corresponding nut plate 140, and rivet holder 310 may retain a plurality of rivets 120, as illustrated in FIGS. 1 and 17. Subsequently, end effector 300 may be oriented such that nut plate 140 and rivets 120 both are positioned at a desired location on structure 10, with structure 10 extending within structure-receiving region 356, as illustrated in FIG. 19. Then, rivets 120 may be inserted through corresponding holes in structure 10, as illustrated in FIG. 20. Subsequently, nut plate 140 may be positioned over rivets 120, as illustrated in FIG. 21; and rivets 120 may be set by end effector 300, as illustrated in FIG. 22, such that nut plate 140 is operatively attached to structure 10, as illustrated in FIG. 23.

Nut plate gripper 400 may include any suitable structure that may be operatively attached to nut plate gripper side 352 and/or that may be adapted, configured, designed, and/or constructed to grip nut plate 140. Examples of nut plate gripper 400 are disclosed herein; however, it is within the scope of the present disclosure that end effector 300 may include and/or utilize other nut plate grippers 400 in addition to, or instead of, those that are disclosed herein, such as nut plate gripper 700.

In some examples, nut plate gripper 400 may be configured to grip a structure-opposed side 148 of nut plate 140 and/or of base plate 142 of nut plate 140. In some examples, and when nut plate gripper 400 grips nut plate 140, nut plate gripper 400 may be external, or entirely external, a threaded central opening 172 of a nut 170 of nut plate 140. In some examples, nut plate gripper 400 may be configured to grip a pair of opposed plate flanges 152 of base plate 142. In some such examples, nut plate gripper 400 may be configured to apply a tensile retaining force to the pair of opposed plate flanges 152. In some examples, nut plate gripper 400 may be configured to utilize a vacuum force to grip nut plate 140.

In some examples, nut plate gripper 400 may be configured to passively grip nut plate 140. In some examples, end effector 300 and/or nut plate gripper 400 includes a gripper actuator 496, as illustrated in FIG. 1. Gripper actuator 496, when present, may be configured to actively actuate nut plate gripper 400 to grip nut plate 140. Examples of gripper actuator 496 are disclosed herein.

In some examples, end effector 300 and/or nut plate gripper 400 may include a vibration structure 490, as illustrated in FIG. 1. Vibration structure 490, when present, may be configured to vibrate nut plate gripper 400. This vibration may be utilized to facilitate alignment of nut plate gripper 400 with nut plate 140 and/or to facilitate alignment of nut plate 140 with structure 10 and/or with rivets 120.

Rivet holder 310 may include any suitable structure that may be operatively attached to rivet holder side 354 of yoke 350, that may face toward nut plate gripper 400, and/or that may selectively retain the plurality of rivets 120. In some examples, and as illustrated in FIG. 1, rivet holder 310 may include a plurality of rivet-receiving regions 312. Rivet-receiving regions 312 may be adapted, configured, sized, and/or shaped to receive the plurality of rivets 120.

In some examples, and as also illustrated in FIG. 1, rivet holder 310 may include a rivet gripper 314. Rivet gripper 314 may be configured to selectively grip the plurality of rivets 120. As an example, rivet gripper 314 may define a gripping state in which rivet gripper 314 retains the plurality of rivets 120 within rivet holder 310, and a free state in which the plurality of rivets 120 is free to be separated from rivet holder 310, such as via motion along at least one separation axis.

In some examples, rivet holder 310 may be configured to selectively retain the plurality of rivet heads 122 of rivets 120 such that a relative orientation of the plurality of pins 124 corresponds to a relative orientation of a plurality of base plate rivet openings 158 of base plate 142. Additionally or alternatively, rivet holder 310 may be configured to selectively retain the plurality of rivet heads 122 such that the relative orientation of the plurality of pins 124 corresponds to a relative orientation of a plurality of structure rivet openings 12 defined within structure 10.

In some examples, and as illustrated in dashed lines in FIG. 1, end effector 300 may include a rivet set structure 330. Rivet set structure 330 may be configured to set the plurality of rivets 120 such that the plurality of rivets operatively attaches base plate 142 of nut plate 140 to structure 10. Rivet set structure 330 may include any suitable structure that may be utilized to set the plurality of rivets 120 and/or to operatively attach base plate 142 to structure 10.

As an example, rivet set structure 330 may include an anvil 334 and a die 336. Anvil 334 may be configured to act upon the plurality of rivet heads 122 to compress the plurality of rivets 120 between anvil 334 and die 336.

As another example, rivet set structure 330 may include set structure linear actuator 332. Set structure linear actuator 332 may be configured to operatively translate anvil 334 relative to die 336 to compress the plurality of rivets 120 between anvil 334 and die 336.

Anvil 334 may be operatively attached to rivet holder side 354 of yoke 350 and/or may face toward nut plate gripper side 352 of yoke 350. Die 336 may be operatively attached to nut plate gripper side 352 of yoke 350 and/or may face toward nut plate gripper side 352 of yoke 350. Die 336 may extend at least partially between a first resilient projecting region 430 and a second resilient projecting region 460 of nut plate gripper 400. Die 336 also may include a chamfered die end, which may be sized to provide clearance between die 336 and nut plate gripper 400. Such a configuration may permit and/or facilitate utilization of end effector 300 to attach nut plates 140 to structures 10 that may be spatially constrained. Additionally or alternatively, such a configuration may permit and/or facilitate operative attachment of nut plates 140 to structures 10 utilizing nut plate grippers 400 that are disclosed herein.

Turning more particularly to FIG. 1, nut plate installation robot 200 includes a robot arm 210, an end effector 300, and a vision system 220. Robot arm 210 may be configured to be operatively attached to, to support, and/or to move end effector 300. Vision system 220 may be configured to view end effector 300, nut plate gripper 400, nut plate 140, the plurality of rivets 120, and/or structure 10. This may permit and/or facilitate alignment among nut plate 140, the plurality of rivets 120, and structure 10. In some examples, vision system 220 additionally or alternatively may be configured to view a sealant application structure 180, a rivet kitting structure 110, and/or a nut plate kitting structure 130, which are discussed in more detail herein. This may permit alignment of end effector 300 with rivet kitting structure 110, such as to facilitate receipt of rivets 120 by end effector 300 and/or from rivet kitting structure 110. This also may permit alignment of end effector 300 with nut plate kitting structure 130, such as to facilitate receipt of nut plate 140 by nut plate gripper and/or from nut plate kitting structure 130. This also may permit alignment of end effector 300 with sealant application structure 180, such as to facilitate application of a sealant 186 to nut plate 140 by sealant application structure 180.

Inclusion of vision system 220 within nut plate installation robot 200 may decrease a potential for, or even eliminate, manual teaching of the operation of nut plate installation robot 200. The inclusion of vision system 220 additionally or alternatively may permit nut plate installation robot 200 to recognize, or to visually recognize, various structures, including rivets 120, nut plate 140, rivet kitting structure 110, nut plate kitting structure 130, and/or sealant application structure 180. Furthermore, vision system 220 may be utilized, by nut plate installation robot 200, to recognize, or to distinguish, different rivets 120, nut plates 140, and/or structures 10 that may be utilized by and/or operated on nut plate installation robot 200.

Vision system 220 may include any suitable structure, examples of which include a camera and a digital camera. In addition, vision system 220 may be positioned, operatively attached to, and/or configured to view any suitable structure. As an example, and as illustrated in FIG. 1, vision system 220 may be operatively attached to yoke 350. Such a configuration may permit vision system 220 to view structure-receiving region 356 and/or components of end effector 300 that may be positioned therein. As another example, vision system 220 may be operatively attached to another component of nut plate installation robot 200 and/or may be configured to view other regions of nut plate installation robot 200 and/or an environment that surrounds nut plate installation robot 200.

As illustrated in dashed lines in FIG. 1, nut plate installation robot 200 may include a linear slide 230, which may operatively attach end effector 300 to another component of nut plate installation robot 200, such as to robot arm 210. Linear slide 230 may be configured to translate end effector 300 along a translation axis that may be parallel, or at least substantially parallel, to an axis along which set structure linear actuator 332 moves anvil 334. Such a configuration may permit nut plate installation robot 200 to bring nut plate 140 into contact with structure 10 and/or to move the end effector along the translation axis without a need to move an entirety of nut plate installation robot 200, thereby improving an overall accuracy and/or precision of installation of nut plate 140 by nut plate installation robot 200.

With continued reference to FIG. 1, nut plate installation system 100 includes nut plate installation robot 200. Nut plate installation system 100 also includes rivet kitting structure 110, nut plate kitting structure 130, and/or sealant application structure 180, which may be configured to apply sealant 186 to nut plate 140.

Figure 16:
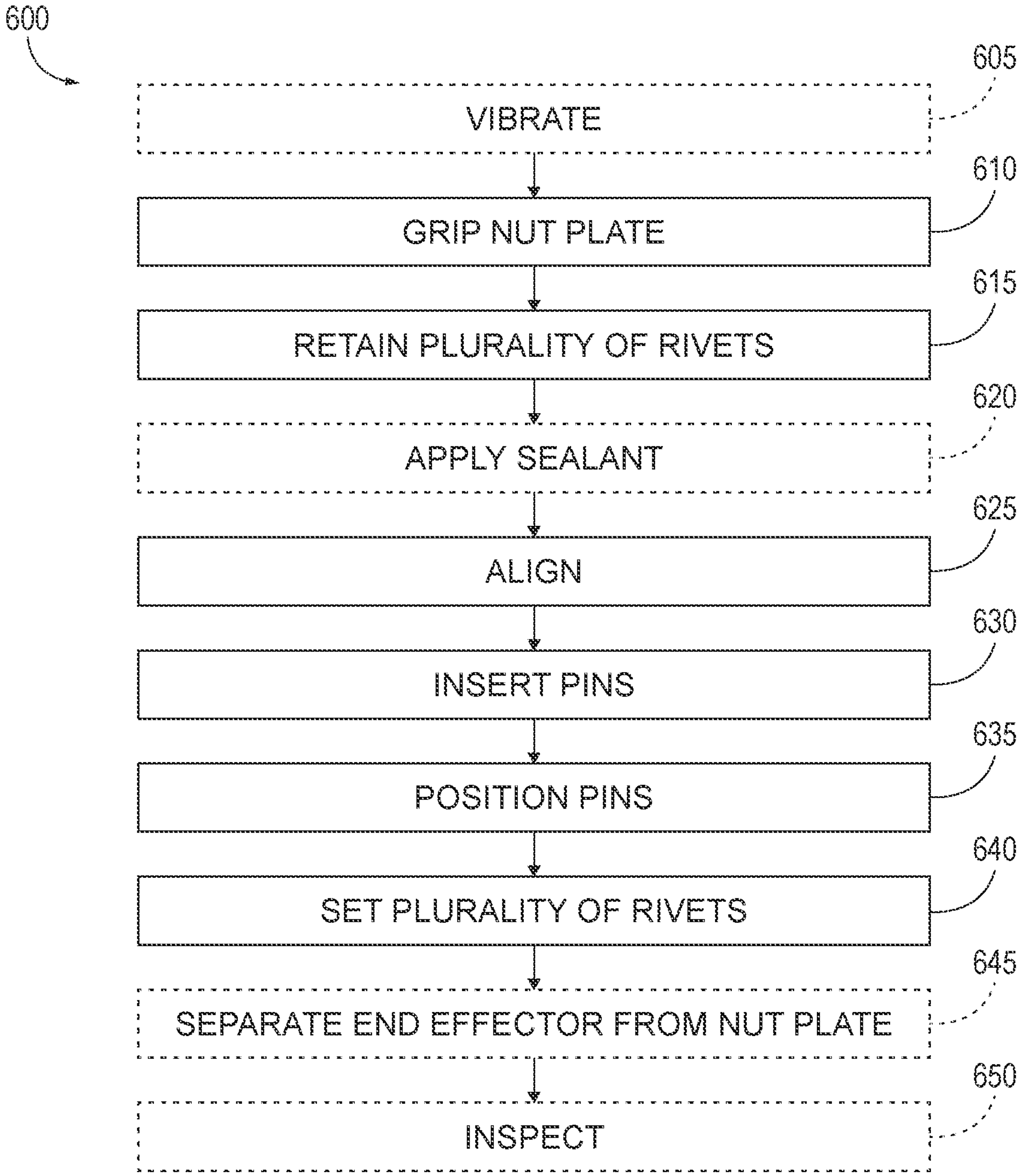
FIG. 16 is a flowchart depicting examples of methods of utilizing a nut plate installation system, according to the present disclosure.

During operation of nut plate installation system 100, and as discussed in more detail herein with reference to methods 600 of FIG. 16, robot arm 210 may be utilized to position end effector 300 relative to structure 10, rivet kitting structure 110, nut plate kitting structure 130, and/or sealant application structure 180. As an example, robot arm 210 may position end effector 300 relative to structure 10 to permit and/or facilitate attachment of nut plate 140 to structure 10. As another example, robot arm 210 may position end effector 300 relative to rivet kitting structure 110, such as to permit and/or facilitate receipt of rivets 120 from rivet kitting structure 110 and/or by rivet holder 310. As yet another example, robot arm 210 may position end effector 300 relative to nut plate kitting structure 130, such as to permit and/or facilitate receipt of a nut plate 140 by nut plate gripper 400. As another example, robot arm 210 may position end effector 300 relative to sealant application structure 180, such as to permit and/or facilitate application of sealant 186 to nut plate 140.

Rivet kitting structure 110 may include and/or be any suitable structure that may be adapted, configured, designed, sized, and/or constructed to house, contain, and/or support the plurality of rivets 120, to present the plurality of rivets 120 to end effector 300, and/or to orient the plurality of rivets 120 such that the plurality of rivets 120 may be received by rivet holder 310 of end effector 300. In some examples, the plurality of rivets supported by rivet kitting structure 110 may include and/or be a single type, or a single size, of rivets 120. In other examples, rivet kitting structure 110 may support a plurality of different types of rivets 120, with each type of rivet 120 being designated for use with a corresponding type of nut plate 140 and/or for a corresponding location on structure 10. In such a configuration, rivet kitting structure 110 may include a plurality of carousels, with each carousel supporting a distinct, or a different, type of rivet 120. Additionally or alternatively, and in such a configuration, vision system 220 may be configured to distinguish and/or to recognize the different types of rivets 120, thereby permitting nut plate installation system 100 to selectively position a desired type of rivet 120 within rivet holder 310 of end effector 300.

As discussed, end effector 300 may be configured to support a plurality of rivets 120 within rivet holder 310. With this in mind, rivet kitting structure 110 may contain, or may be configured to contain, a plurality of sets of the plurality of corresponding rivets 120, such as to permit and/or facilitate nut plate installation robot 200 to receive the plurality of rivets 120 a plurality of times from rivet kitting structure 110.

Rivet kitting structure 110 may support rivets 120 in any suitable manner. As an example, rivet kitting structure 110 may include a plurality of resilient receptacles 114, which may be configured to resiliently retain the plurality of rivets 120. As a more specific example, resilient receptacles 114 may be configured to deform and/or stretch to receive the plurality of rivets 120, and resilient receptacles 114 may press against the plurality of rivets with a restoring force that retains the plurality of rivets within rivet kitting structure 110.

In some examples, rivet kitting structure 110 may be configured to retain the plurality of rivets 120 in a vertical orientation. Stated differently, rivet kitting structure 110 may be configured to retain the plurality of rivets such that pins 124 of rivets 120 extend vertically upward from corresponding rivet heads 122 of rivets 120. Such a configuration may permit end effector 300 to grip both rivets 120 and nut plate 140 without a need to rotate end effector 300 about a horizontal axis, thereby decreasing an overall complexity of nut plate installation robot 200.

In some examples, rivet kitting structure 110 may include and/or be a rotary rivet kitting structure 112. Rotary rivet kitting structure 112 may be configured to rotate in order to make the plurality of rivets 120 accessible to end effector 300.

Nut plate kitting structure 130 may include and/or be any suitable structure that may be adapted, configured, designed, sized, and/or constructed to house, contain, and/or support a plurality of nut plates 140, to supply at least one nut plate 140 of the plurality of nut plates 140 to end effector 300, and/or to orient nut plates 140 such that nut plates 140 may be gripped by nut plate gripper 400 of end effector 300. In some examples, the plurality of nut plates 140 supported by nut plate kitting structure 130 may include and/or be a single type, or a single size, of nut plates 140. In other examples, nut plate kitting structure 130 may support a plurality of different types of nut plates 140, with each type of nut plate 140 being designated for use with a corresponding type of rivet 120 and/or for a corresponding location on structure 10. In such a configuration, nut plate kitting structure 130 may include a plurality of carousels, with each carousel supporting a distinct, or different, type of nut plate 140. Additionally or alternatively, and in such a configuration, vision system 220 may be configured to distinguish and/or recognize the different types of nut plates 140, thereby permitting nut plate installation system 100 to selectively grip a desired type of nut plate 140 with nut plate gripper 400 of end effector 300.

In some examples, nut plate kitting structure 130 may be configured to support nut plates 140 on a horizontal nut plate kitting structure surface 134. In some examples, nut plate kitting structure 130 may include and/or be a rotary nut plate kitting structure 132. Rotary nut plate kitting structure 132 may be configured to rotate to make nut plates 140, or a given nut plate 140, accessible to end effector 300.

Sealant application structure 180 may include and/or be any suitable structure that may be adapted, configured, designed, sized, and/or constructed to house, contain, and/or support sealant 186 and/or to apply sealant 186 to nut plates 140 while nut plates 140 are gripped by nut plate gripper 400. This may include application of sealant 186 to structure-facing side 146 of structure-contacting region 144 of base plate 142. An example of sealant application structure 180 includes a roller 182, which may be configured to apply sealant 186 to nut plate 140 and/or structure-facing side 146 thereof. Another example of sealant application structure 180 includes a volume 184 of sealant 186 within which nut plate installation robot 200 may be configured to dip nut plate 140 and/or structure-facing side 146 thereof.

In some examples of nut plate installation systems 100, according to the present disclosure, sealant application structure 180 may be configured to apply sealant 186 to nut plate 140 and/or structure-facing side 146 thereof while nut plate 140 is gripped by nut plate gripper 400 and/or while structure 10 is spaced-apart from structure-receiving region 356 of end effector 300. Such a configuration may increase an accuracy with which sealant 186 may be positioned between nut plate 140 and structure 10 once nut plate 140 is attached to structure 10.

FIG. 11 is a flowchart depicting examples of methods 500 of gripping a nut plate utilizing a nut plate gripper, according to the present disclosure. Methods 500 include aligning a nut plate gripper at 510 and may include vibrating the nut plate gripper at 520. Methods 500 also include gripping the nut plate at 530 and may include releasing the nut plate at 540.

In a first example, such as when the nut plate gripper includes and/or is nut plate gripper 400, according to the present disclosure, aligning the nut plate gripper at 510 may include aligning a first nut plate-contacting end of a first resilient projecting region of the nut plate gripper with a pair of opposed plate flanges of a base plate of the nut plate, as illustrated in FIG. 12. The aligning at 510 also may include aligning a second nut plate-contacting end of a second resilient projecting region of the nut plate gripper with the pair of opposed plate flanges.

Examples of the nut plate gripper and/or components thereof are disclosed herein with reference to nut plate gripper 400. Examples of the nut plate and/or components thereof are disclosed herein with reference to nut plate 140.

Also with reference to the first example, vibrating the nut plate gripper at 520 may include vibrating any suitable component of the nut plate gripper. As examples, the vibrating at 520 may include vibrating the first nut plate-contacting end of the nut plate gripper and/or vibrating the second nut plate-contacting end of the nut plate gripper. The vibrating at 520 may be performed in any suitable manner and/or utilizing any suitable structure. As an example, the nut plate gripper may include a vibration structure, which may be configured to provide a motive force for the vibrating at 520. Examples of the vibration structure are disclosed herein with reference to vibration structure 490.

The vibrating at 520 may be performed with any suitable timing and/or sequence during methods 500. As examples, the vibrating at 520 may be performed prior to, subsequent to, and/or at least partially concurrently with the aligning at 510, the gripping at 530, and/or the releasing at 540.

Also in the first example, gripping the nut plate at 530 may include gripping the nut plate with the nut plate gripper. This may include moving the nut plate gripper and the nut plate toward one another and/or such that the first nut plate-contacting end and the second nut plate-contacting end are positioned between the pair of opposed plate flanges.

Additionally or alternatively, the gripping at 530 may include positioning the first nut plate-contacting end and the second nut plate-contacting end such that the first nut plate-contacting end and the second nut plate-contacting end apply a retaining force to the pair of opposed plate flanges. The vibrating at 520, when performed, may be performed at least partially concurrently with the moving. The retaining force may include and/or be a tensile retaining force, which may place at least a region of the nut plate in tension. Examples of the retaining force are disclosed herein with reference to retaining force 402.

In some examples, the retaining force may include a first retaining force, which is applied in a first force direction and/or by the first nut plate-contacting end. In some examples, the retaining force may include a second retaining force, which is applied in a second force direction and/or by the second nut plate-contacting end. Examples of the first retaining force are disclosed herein with reference to first retaining force 404; and examples of the second retaining force are disclosed herein with reference to second retaining force 406, as illustrated in FIG. 13.

In some examples, the gripping at 530 and/or the moving may include establishing a corresponding two-point contact between the first nut plate-contacting end and the nut plate. In some examples, the gripping at 530 and/or the moving additionally or alternatively may include establishing a corresponding two-point contact between the second nut plate-contacting end and the nut plate. As discussed in more detail herein, such two-point contact may locate, precisely locate, and/or reproducibly locate the nut plate relative to the nut plate gripper in two dimensions.

In some examples, the gripping at 530 and/or the moving may include positioning a first plate flange of the pair of opposed plate flanges between a first pair of opposed ramps of the nut plate gripper, such as to locate the nut plate and the nut plate gripper relative to one another in a third dimension. The first pair of opposed ramps may be defined on and/or by the first resilient projecting region. In some examples, the gripping at 530 and/or the moving may include positioning a second plate flange of the pair of opposed plate flanges between a second pair of opposed ramps of the nut plate gripper, such as to locate the nut plate and the nut plate gripper relative to one another in a third dimension. The second pair of opposed ramps may be defined on and/or by the second resilient projecting region. The third dimension may be perpendicular to the two dimensions. Examples of the first pair of opposed ramps are disclosed herein with reference to first pair of opposed ramps 452. Examples of the second pair of opposed ramps are disclosed herein with reference to second pair of opposed ramps 482.

In some examples, the gripping at 530 and/or the moving may include deflecting the first resilient projecting region and the second resilient projecting region toward one another. This may permit the first nut plate-contacting end and the second nut plate-contacting end to be positioned between the pair of opposed plate flanges. In some such examples, the retaining force may include and/or be a restoring force, which may be generated by the deflecting.

In some examples, and during the gripping at 530, the nut plate gripper may be external, or entirely external, a threaded central opening of a nut of the nut plate. Additionally or alternatively, and during the gripping at 530, the nut plate gripper may be free from direct physical contact with the threaded central opening.

Also with reference to the first example, releasing the nut plate at 540 may include releasing the nut plate from the nut plate gripper. As discussed in more detail herein, the nut plate gripper may be utilized to position the nut plate relative to a structure and/or such that the nut plate may be operatively attached to the structure. In this context, the releasing at 540 may be performed subsequent to the gripping at 530 and/or subsequent to attachment of the nut plate to the structure.

In some examples, the releasing at 540 may include passively releasing the nut plate from the nut plate gripper. This may include passively releasing the nut plate responsive to a separation force that urges the first nut plate-contacting end and the second nut plate-contacting end from between the pair of opposed plate flanges. In some examples, the releasing at 540 may include actively releasing the nut plate from the nut plate gripper. This may include actuating a gripper actuator of the nut plate gripper. Examples of the gripper actuator are disclosed herein with reference to gripper actuator 496.

In a second example, such as when the nut plate gripper includes and/or is nut plate gripper 700, according to the present disclosure, aligning the nut plate gripper at 510 additionally or alternatively may include aligning the nut plate gripper with the nut plate by aligning a longitudinal axis of an elongate resilient retention structure of the nut plate gripper with a threaded central opening of a nut of the nut plate. The aligning at 510 concurrently may include aligning a pair of orienting structures of the nut plate gripper with a base plate of the nut plate. Examples of the nut plate and/or components thereof are disclosed herein with reference to nut plate 140. Examples of the nut plate gripper and/or components thereof are disclosed herein with reference to nut plate gripper 700.

The aligning at 510 may be accomplished in any suitable manner. As an example, the aligning at 510 may include aligning such that the longitudinal axis of the elongate resilient retention structure extends within and/or through the threaded central opening. As another example, the aligning at 510 may include aligning such that the longitudinal axis of the elongate resilient retention structure extends parallel, or at least substantially parallel, to the engagement axis. As another example, the aligning at 510 may include concurrently moving the elongate resilient retention structure and the pair of orienting structures. The motion may be within a plane that is perpendicular, or at least substantially perpendicular, to the engagement axis.

Also with reference to the second example, vibrating the nut plate gripper at 520 additionally or alternatively may include vibrating the elongate resilient retention structure and/or vibrating the pair of orienting structures. This may include vibrating with, via, and/or utilizing a vibration structure, examples of which are disclosed herein.

Also with reference to the second example, gripping the nut plate at 530 additionally or alternatively may include gripping the nut plate with the nut plate gripper by moving the nut plate gripper and the nut plate toward one another along an engagement axis. The moving may be such that the elongate resilient retention structure of the nut plate gripper extends within and/or defines an interference fit with the threaded central opening of the nut of the nut plate. The moving also may be such that the pair or orienting structures of the nut plate gripper operatively engages with the base plate of the nut plate to precisely orient the base plate relative to the nut plate gripper along an orienting axis.

The gripping at 530 may be accomplished in any suitable manner. As an example, the griping at 530 may include moving the elongate resilient retention structure of the nut plate gripper into the threaded central opening of the nut plate. As additional examples, the gripping at 530 may include moving the pair of orienting structures into operative engagement with the base plate and/or physically contacting the base plate with the pair of orienting structures.

It is within the scope of the present disclosure that the gripping at 530 may include moving at least a region of the elongate resilient retention structure, such as an alignment region of the elongate resilient retention structure, into the threaded central opening of the nut plate prior to establishing operative engagement between the pair of orienting structures and the base plate. Examples of the alignment region are disclosed herein with reference to alignment region 732. In such an example, the gripping at 530 also may include subsequently moving a retention region of the elongate resilient retention structure into the threaded central opening and/or subsequently forming the interference fit between the threaded central opening and the retention region. Examples of the retention region are disclosed herein with reference to retention region 736.

It is also within the scope of the present disclosure that the gripping at 530 may include positioning the base plate at least partially between the pair of orienting structures. Additionally or alternatively, the gripping at 530 may include compressing at least a region of the base plate between the pair of orienting structures.

In some examples, the gripping at 530 may include deflecting at least a region of the elongate resilient retention structure from the longitudinal axis, which may be defined prior to the gripping at 530, via a deflection force applied by the pair of orienting structures. Such a configuration may permit and/or facilitate precise alignment of the nut plate relative to the nut plate gripper even in situations in which the nut is not precisely and/or consistently aligned with the base plate of the nut plate.

Subsequent to the gripping at 530, the elongate resilient retention structure may be resiliently deformed by a deformation force exerted on the elongate resilient retention structure and/or by the nut. The deformation force may be applied perpendicular, or at least substantially perpendicular, to the longitudinal axis of the elongate resilient retention structure. Stated differently, and subsequent to the gripping at 530, at least a region of the elongate resilient retention structure may be compressed by the nut and/or within the threaded central opening.

Also in the second example, releasing the nut plate at 540 additionally or alternatively may include releasing the nut plate from the nut plate gripper. As discussed in more detail herein, the nut plate gripper may be utilized to position the nut plate relative to a structure and/or such that the nut plate may be operatively attached to the structure. In this context, the releasing at 540 may be performed subsequent to the gripping at 530 and/or subsequent to attachment of the nut plate to the structure.

In some examples, the releasing at 540 may include passively releasing the nut plate from the nut plate gripper. This may include passively releasing the nut plate responsive to a separation force that urges the nut plate gripper away from the nut plate, such as along the engagement axis. The releasing at 540 may include establishing physical separation between the nut plate and the nut plate gripper, between the elongate resilient retention structure and the threaded central opening, and/or between the pair of orienting structures and the base plate.

FIG. 16 is a flowchart depicting examples of methods 600 of utilizing a nut plate installation system according to the present disclosure. Examples of the nut plate installation system and/or components thereof are disclosed herein with reference to nut plate installation system 100. Methods 600 may include vibrating at 605 and include gripping a nut plate at 610 and retaining a plurality of rivets at 615. Methods 600 also may include applying a sealant at 620 and include aligning at 625, inserting pins at 630, positioning pins at 635, and setting the plurality of rivets at 640. Methods 600 further may include separating the end effector from the nut plate at 645 and/or inspecting at 650.

Vibrating at 605 may include vibrating the nut plate gripper and/or the nut plate and may be performed in any suitable manner. As an example, the vibrating at 605 may include vibrating the nut plate gripper and/or the nut plate during the gripping at 610 and/or during the positioning at 635. As another example, the vibrating at 605 may include vibrating with, via, and/or utilizing a vibration structure, examples of which are disclosed herein with reference to vibration structure 490.

Gripping the nut plate at 610 may include gripping the nut plate with a nut plate gripper of an end effector. The end effector may form a portion of and/or be operatively attached to a nut plate installation robot of the nut plate installation system. Examples of the nut plate are disclosed herein with reference to nut plate 140. Examples of the nut plate gripper are disclosed herein with reference to nut plate gripper 400 and/or nut plate gripper 700. Examples of the end effector are disclosed herein with reference to end effector 300. Examples of the nut plate installation robot are disclosed herein with reference to nut plate installation robot 200. The gripping at 610 is illustrated in FIGS. 1, 13, 15, and 17, where nut plate 140 is gripped by nut plate gripper 400/700 of end effector 300 of nut plate installation robot 200 of nut plate installation system 100.

In some examples, the nut plate installation system may include a nut plate kitting structure, examples of which are disclosed herein with reference to nut plate kitting structure 130. In some such examples, the gripping at 610 may include obtaining the nut plate from the nut plate kitting structure. This may include obtaining the nut plate from and/or via a top and/or a horizontal nut plate kitting structure surface of the nut plate kitting structure.

Figure 18:
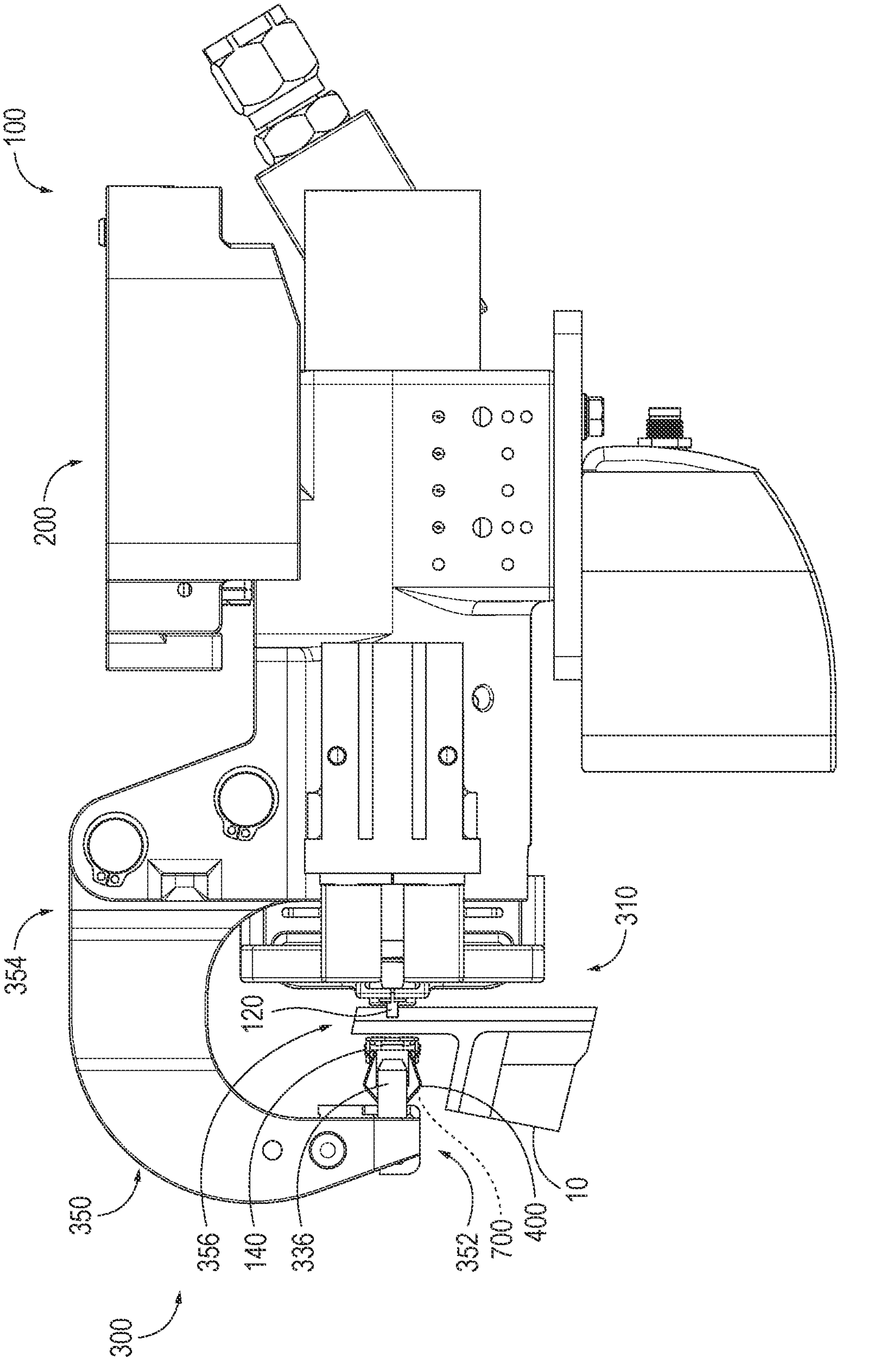
FIG. 18 is an illustration of a nut plate installation system during the methods of FIG. 16.

Retaining the plurality of rivets at 615 may include retaining the plurality of rivets with a rivet holder of the end effector. Examples of the rivet holder are disclosed herein with reference to rivet holder 310. In some examples, the nut plate installation system may include a rivet kitting structure, examples of which are disclosed herein with reference to rivet kitting structure 110. In some such examples, the retaining at 615 may include obtaining the plurality of rivets from the rivet kitting structure. This may include obtaining the plurality of rivets from and/or via a resilient receptacle of the rivet kitting structure. During the obtaining the plurality of rivets, the plurality of rivets may be oriented such that a pin of each rivet extends vertically above a corresponding rivet head of each rivet. The retaining at 615 is illustrated in FIGS. 1 and 18, where rivets 120 are gripped by rivet holder 310.

Applying the sealant at 620 may include applying the sealant to a structure-facing side of a structure-contacting region of a base plate of the nut plate. The applying at 620 may be performed in any suitable manner. As an example, the applying at 620 may include utilizing a roller to apply the sealant. As another example, the applying at 620 may include dipping the structure-facing side into a volume of the sealant. In some examples, the applying at 620 may be performed subsequent to the gripping at 610 and/or prior to the aligning at 625. In some examples, the applying at 620 may be performed while the structure is spaced-apart from a structure-receiving region of the end effector, which extends between the nut plate gripper and the rivet holder.

Aligning at 625 may be performed with, via, and/or utilizing the nut plate installation robot. The aligning at 625 may include aligning a plurality of base plate rivet openings of a base plate of the nut plate and/or aligning a plurality of pins of the rivets with a plurality of structure rivet openings of the structure. Additionally or alternatively, the aligning at 625 may include positioning the structure within the structure-receiving region that extends between the nut plate gripper and the rivet holder and/or positioning the structure such that the structure extends between, or directly between, the nut plate gripper and the rivet holder. The aligning at 625 is illustrated in FIGS. 18-19, where structure 10 is positioned within structure-receiving region 356 and/or such that the structure extends between nut plate 140 and rivets 120.

In some examples, the aligning at 625 may include viewing with a vision system of the nut plate installation robot, such as to permit and/or facilitate the alignment. In some such examples, the viewing with the vision system may include verifying a position for the nut plate, such as via verifying that the nut plate is positioned proximate and/or aligned with the structure, and/or via verifying that the plurality of base plate rivet openings is aligned with the plurality of structure rivet openings of the structure. In some such examples, the verifying may include viewing, with the vision system, the plurality of structure rivet openings prior to the inserting at 630. In some such examples, the verifying may include verifying that the plurality of structure rivet openings is free of a corresponding rivet prior to the inserting at 630, and/or verifying that a spacing among the plurality of structure rivet openings corresponds to a spacing among the plurality of base plate rivet openings. Examples of the vision system are disclosed herein with reference to vision system 220.

Inserting the pins at 630 may include inserting the plurality of pins into the plurality of rivet structure openings. This may include inserting such that the plurality of pins protrudes from, extends from, and/or is separated by a distance from a nut plate gripper-facing side of the structure. In some examples, the gripping at 610 may include gripping the plurality of rivets with a rivet gripper of the end effector. In such examples, the inserting at 630 may include releasing the plurality of rivets from the rivet gripper. Examples of the rivet gripper are disclosed herein with reference to rivet gripper 314. In some examples, the inserting at 630 may include translating the plurality of rivets along a longitudinal axis of at least one pin of the plurality of pins. The inserting at 630 is illustrated by the transition from the configuration illustrated in FIG. 19 to the configuration illustrated in FIG. 20. As illustrated in FIG. 20, pins of rivets 120 protrude from, extend from, and/or are separated by a distance from nut plate gripper-facing side 14 of structure 10.

Positioning the pins at 635 may include positioning the plurality of pins within the plurality of base plate rivet openings of the base plate of the nut plate. This may, in some examples, include moving the nut plate over the plurality of pins while the plurality of pins is stationary, or is at least substantially stationary. Additionally or alternatively, the positioning at 635 may include translating the nut plate along the longitudinal axis of at least one rivet of the plurality of rivets. The positioning at 635 is illustrated by the transition from the configuration illustrated in FIG. 20 to the configuration illustrated in FIG. 21. In FIG. 21, pins of rivets 120 are positioned within base plate rivet openings of nut plate 140.

Setting the plurality of rivets at 640 may include setting the plurality of rivets to operatively attach the nut plate to the structure. In some examples, the setting at 640 may include compressing the plurality of rivets with a rivet set structure of the end effector. In some examples, the setting at 640 may include compressing the plurality of rivets between an anvil of the rivet set structure and a die of the rivet set structure. The setting at 640 is illustrated by the transition from the configuration illustrated in FIG. 21 to the configuration illustrated in FIG. 22. In FIG. 22, pins of rivets 120 are being compressed between anvil 334 and die 336 of rivet set structure 330.

Separating the end effector from the nut plate at 645 may include separating the end effector from the nut plate and/or from the plurality of rivets. This may include separating while retaining the nut plate operatively attached to the structure via the plurality of rivets. Stated differently, and subsequent to the setting at 640, the separating at 645 may include establishing a spaced-apart relationship between the structure and the structure-receiving region of the end effector. The separating at 645 is illustrated by the transition from the configuration illustrated in FIG. 22 to the configuration illustrated in FIG. 23. In FIG. 23, structure-receiving region 356 of end effector 300 is spaced-apart from structure 10, and nut plate 140 is operatively attached to structure 10 via rivets 120.

Inspecting at 650 may include inspecting the nut plate, the plurality of rivets, and/or the structure. This may include inspecting to confirm and/or to verify that the plurality of rivets attaches, or correctly attaches, the nut plate to the structure and may be performed subsequent to the setting at 640, subsequent to the separating at 645, and/or at least partially concurrently with the separating at 645. In some examples, the inspecting at 650 may include inspecting with, via, and/or utilizing the vision system of the nut plate installation system. This may include viewing the nut plate, the plurality of rivets, and/or the structure with the vision system.

In some examples, the inspecting at 650 may include confirming that the setting at 640 has been performed, has been performed completely, and/or has been performed satisfactorily. The confirming may include viewing the plurality of rivets, such as with the vision system. Additionally or alternatively, the confirming may include monitoring a linear travel of the rivet set structure during the setting at 640 to confirm that at least a threshold travel magnitude and/or a threshold rivet compression has occurred.

Methods 600, which are disclosed herein, involve a plurality of interrelated steps that may be performed by the nut plate installation system. In some examples of methods 600, a plurality of steps of methods 600 may be performed with, via, and/or utilizing the end effector or a single end effector. As examples, the vibrating at 605, the gripping at 610, the retaining at 615, the applying at 620, the aligning at 625, the inserting at 630, the positioning at 635, the setting at 640, the separating at 645, and/or the inspecting at 650 may be performed and/or facilitated by the single end effector. Stated differently, the end effector utilized with nut plate installation systems and/or methods according to the present disclosure, may be a multi-functional end effector that may be adapted, configured, designed, and/or constructed to perform the plurality of steps of methods. This may provide for more efficient and/or economical operation of the end effectors, nut plate installation systems, and/or methods when compared to prior art processes that manually perform steps performed by a single end effector.

Illustrative, non-exclusive examples of inventive subject matter according to the present disclosure are described in the following enumerated paragraphs:

A1. A nut plate gripper (400) configured to grip a nut plate (140), the nut plate gripper (400) comprising:

an attachment region (410), optionally configured to facilitate attachment of the nut plate gripper (400) to an end effector (300);

a first resilient projecting region (430) that extends from the attachment region (410) and defines a first nut plate-contacting end (448); and a second resilient projecting region (460) that extends from the attachment region (410) and defines a second nut plate-contacting end (478);

optionally wherein at least one of:

(i) the first resilient projecting region (430) and the second resilient projecting region (460) are configured to resiliently deflect toward one another to facilitate insertion of the first nut plate-contacting end (448) and the second nut plate-contacting end (478) between a pair of opposed plate flanges (152) of a base plate (142) of the nut plate (140); and (ii) when the first nut plate-contacting end (448) and the second nut plate-contacting end (478) are positioned between the pair of opposed plate flanges (152) of the base plate (142) of the nut plate (140), the first resilient projecting region (430) and the second resilient projecting region (460) are configured to apply a retaining force (402) to the pair of opposed plate flanges (152).

A2. The nut plate gripper (400) of paragraph A1, wherein the attachment region (410) includes a fastener-receiving region (416) configured to receive a fastener that operatively attaches the nut plate gripper (400) to the end effector (300).

A3. The nut plate gripper (400) of any of paragraphs A1-A2, wherein the attachment region (410) includes a fastener-receiving hole defined within the nut plate gripper (400).

A4. The nut plate gripper (400) of any of paragraphs A1-A3, wherein the attachment region (410) defines a planar, or at least substantially planar, end effector-facing side (412).

A5. The nut plate gripper (400) of any of paragraphs A1-A4, wherein the attachment region (410) is a planar, or at least substantially planar, attachment region (410).

A6. The nut plate gripper (400) of any of paragraphs A1-A5, wherein the first resilient projecting region (430) and the second resilient projecting region (460) extend from an end effector-opposed side (414) of the attachment region (410).

A7. The nut plate gripper (400) of any of paragraphs A1-A6, wherein the first resilient projecting region (430) and the second resilient projecting region (460) symmetrically extend from the attachment region (410).

A8. The nut plate gripper (400) of any of paragraphs A1-A7, wherein the first resilient projecting region (430) and the second resilient projecting region (460) are mirror, or at least substantially mirror, images of one another.

A9. The nut plate gripper (400) of any of paragraphs A1-A8, wherein the first resilient projecting region (430) includes a first divergent region (432), which extends from the attachment region (410) and tapers away from the second resilient projecting region (460), and a first convergent region (440), which extends from the first divergent region (432) to the first nut plate-contacting end (448) and tapers toward the second resilient projecting region (460).

A10. The nut plate gripper (400) of paragraph A9, wherein the first divergent region (432) extends at a first divergent region angle (434) relative to the attachment region (410), optionally wherein the first divergent region angle (434) is at least one of:

(i) an obtuse first divergent region angle (434);

(ii) at least 90°, at least 100°, at least 110°, at least 120°, at least 130°, at least 140°, at least 150°, or at least 160°; and (iii) at most 170°, at most 160°, at most 150°, at most 140°, at most 130°, at most 120°, at most 110°, or at most 100°.

A11. The nut plate gripper (400) of any of paragraphs A9-A10, wherein the first divergent region (432) is a planar, or at least substantially planar, first divergent region (432).

A12. The nut plate gripper (400) of any of paragraphs A9-A11, wherein the first divergent region (432) extends a first divergent region length (436) from the attachment region (410), optionally wherein the first divergent region length (436) is at least one of:

(i) at least 1 millimeter (mm), at least 1.5 mm, at least 2 mm, at least 2.5 mm, at least 3 mm, at least 3.5 mm, at least 4 mm, at least 4.5 mm, or at least 5 mm; and (ii) at most 10 mm, at most 9 mm, at most 8 mm, at most 7 mm, at most 6 mm, at most 5 mm, at most 4 mm, or at most 3 mm.

A13. The nut plate gripper (400) of any of paragraphs A9-A12, wherein the first divergent region (432) has an average first divergent region width (438), as measured perpendicular to a/the first divergent region length (436), optionally wherein the average first divergent region width (438) is at least one of:

(i) at least 2 mm, at least 2.5 mm, at least 3 mm, at least 3.5 mm, at least 4 mm, at least 4.5 mm, at least 5 mm, at least 5.5 mm, or at least 6 mm; and (ii) at most 12 mm, at most 11 mm, at most 10 mm, at most 9 mm, at most 8 mm, at most 7 mm, at most 6 mm, at most 5 mm, or at most 4 mm.

A14. The nut plate gripper (400) of any of paragraphs A9-A13, wherein the first convergent region (440) extends at a first convergent region angle (442) relative to first divergent region (432), optionally wherein the first convergent region angle (442) is at least one of:

(i) an obtuse first convergent region angle (442);

(ii) at least 90°, at least 100°, at least 110°, at least 120°, at least 130°, at least 140°, at least 150°, or at least 160°; and (iii) at most 170°, at most 160°, at most 150°, at most 140°, at most 130°, at most 120°, at most 110°, or at most 100°.

A15. The nut plate gripper (400) of any of paragraphs A9-A14, wherein the first convergent region (440) is a planar, or at least substantially planar, first convergent region (440).

A16. The nut plate gripper (400) of any of paragraphs A9-A15, wherein the first convergent region (440) extends a first convergent region length (444) from the first divergent region (432), optionally wherein the first convergent region length (444) is at least one of:

(i) at least 1 millimeter (mm), at least 1.5 mm, at least 2 mm, at least 2.5 mm, at least 3 mm, at least 3.5 mm, at least 4 mm, at least 4.5 mm, or at least 5 mm; and (ii) at most 10 mm, at most 9 mm, at most 8 mm, at most 7 mm, at most 6 mm, at most 5 mm, at most 4 mm, or at most 3 mm.

A17. The nut plate gripper (400) of any of paragraphs A9-A16, wherein the first convergent region (440) has an average first convergent region width (446), as measured perpendicular to a/the first convergent region length (444), optionally wherein the average first convergent region width (446) is at least one of:

(i) at least 5 mm, at least 5.5 mm, at least 6 mm, at least 6.5 mm, at least 7 mm, at least 7.5 mm, at least 8 mm, at least 8.5 mm, or at least 9 mm; and (ii) at most 15 mm, at most 14 mm, at most 13 mm, at most 12 mm, at most 11 mm, at most 10 mm, at most 9 mm, or at most 8 mm.

A18. The nut plate gripper (400) of any of paragraphs A9-A17, wherein the first convergent region (440) includes a first pair of opposed ramps (452), which are positioned on opposed sides of the first convergent region (440) and project away from the first convergent region (440) such that, when the nut plate gripper (400) grips the nut plate (140), opposed outer edges of a first plate flange of the pair of opposed plate flanges (152) face toward the first pair of opposed ramps (452).

A19. The nut plate gripper (400) of any of paragraphs A1-A18, wherein the first nut plate-contacting end (448) includes a rounded first nut plate-contacting end (448), which is configured to contact the nut plate (140).

A20. The nut plate gripper (400) of any of paragraphs A1-A19, wherein the second resilient projecting region (460) includes a second divergent region (462), which extends from the attachment region (410) and tapers away from the first resilient projecting region (430), and a second convergent region (470), which extends from the second divergent region (462) to the second nut plate-contacting end (478) and tapers toward the first resilient projecting region (430).

A21. The nut plate gripper (400) of paragraph A20, wherein the second divergent region (462) extends at a second divergent region angle (464) relative to the attachment region (410), optionally wherein the second divergent region angle (464) is at least one of:

(i) an obtuse second divergent region angle (464);

(ii) at least 90°, at least 100°, at least 110°, at least 120°, at least 130°, at least 140°, at least 150°, or at least 160°; and (iii) at most 170°, at most 160°, at most 150°, at most 140°, at most 130°, at most 120°, at most 110°, or at most 100°.

A22. The nut plate gripper (400) of any of paragraphs A20-A21, wherein the second divergent region (462) is a planar, or at least substantially planar, second divergent region (462).

A23. The nut plate gripper (400) of any of paragraphs A20-A22, wherein the second divergent region (462) extends a second divergent region length (466) from the attachment region (410), optionally wherein the second divergent region length (466) is at least one of:

(i) at least 1 millimeter (mm), at least 1.5 mm, at least 2 mm, at least 2.5 mm, at least 3 mm, at least 3.5 mm, at least 4 mm, at least 4.5 mm, or at least 5 mm; and (ii) at most 10 mm, at most 9 mm, at most 8 mm, at most 7 mm, at most 6 mm, at most 5 mm, at most 4 mm, or at most 3 mm.

A24. The nut plate gripper (400) of any of paragraphs A20-A23, wherein the second divergent region (462) has an average second divergent region width (468), as measured perpendicular to a/the second divergent region length (466), optionally wherein the average second divergent region width (468) is at least one of:

(i) at least 2 mm, at least 2.5 mm, at least 3 mm, at least 3.5 mm, at least 4 mm, at least 4.5 mm, at least 5 mm, at least 5.5 mm, or at least 6 mm; and (ii) at most 12 mm, at most 11 mm, at most 10 mm, at most 9 mm, at most 8 mm, at most 7 mm, at most 6 mm, at most 5 mm, or at most 4 mm.

A25. The nut plate gripper (400) of any of paragraphs A20-A24, wherein the second convergent region (470) extends at a second convergent region angle (472) relative to the attachment region (410), optionally wherein the second convergent region angle (472) is at least one of:

(i) an obtuse second convergent region angle (472);

(ii) at least 90°, at least 100°, at least 110°, at least 120°, at least 130°, at least 140°, at least 150°, or at least 160°; and (iii) at most 170°, at most 160°, at most 150°, at most 140°, at most 130°, at most 120°, at most 110°, or at most 100°.

A26. The nut plate gripper (400) of any of paragraphs A20-A25, wherein the second convergent region (470) is a planar, or at least substantially planar, second convergent region (470).

A27. The nut plate gripper (400) of any of paragraphs A20-A26, wherein the second convergent region (470) extends a second convergent region length (474) from the second divergent region (462), optionally wherein the second convergent region length (474) is at least one of:

(i) at least 1 millimeter (mm), at least 1.5 mm, at least 2 mm, at least 2.5 mm, at least 3 mm, at least 3.5 mm, at least 4 mm, at least 4.5 mm, or at least 5 mm; and (ii) at most 10 mm, at most 9 mm, at most 8 mm, at most 7 mm, at most 6 mm, at most 5 mm, at most 4 mm, or at most 3 mm.

A28. The nut plate gripper (400) of any of paragraphs A20-A27, wherein the second convergent region (470) has an average second convergent region width (476), as measured perpendicular to a/the second convergent region length (474), optionally wherein the average second convergent region width (476) is at least one of:

(i) at least 5 mm, at least 5.5 mm, at least 6 mm, at least 6.5 mm, at least 7 mm, at least 7.5 mm, at least 8 mm, at least 8.5 mm, or at least 9 mm; and (ii) at most 15 mm, at most 14 mm, at most 13 mm, at most 12 mm, at most 11 mm, at most 10 mm, at most 9 mm, or at most 8 mm.

A29. The nut plate gripper (400) of any of paragraphs A20-A28, wherein the second convergent region (470) includes a second pair of opposed ramps (482), which are positioned on opposed sides of the second convergent region (470) and project away from the second convergent region (470) such that, when the nut plate gripper (400) grips the nut plate (140), opposed outer edges of a second plate flange of the pair of opposed plate flanges (152) face toward the second pair of opposed ramps (482).

A30. The nut plate gripper (400) of any of paragraphs A1-A29, wherein the second nut plate-contacting end (478) includes a rounded second nut plate-contacting end (478), which is configured to contact the nut plate (140).

A31. The nut plate gripper (400) of any of paragraphs A1-A30, wherein, when the nut plate gripper (400) grips the nut plate (140), a first retaining force (404) of the first resilient projecting region (430) and a second retaining force (406) of the second resilient projecting region (460) act against the base plate (142) of the nut plate (140) to retain the nut plate (140) on the nut plate gripper (400).

A32. The nut plate gripper (400) of any of paragraphs A1-A31, wherein, when the nut plate gripper (400) grips the nut plate (140):

(i) the first nut plate-contacting end (448) is configured to define a corresponding two-point contact with the base (i) ... plate (142) of the nut plate (140) to locate the base plate (142) relative to the first nut plate-contacting end (448) in two dimensions; and (ii) the second nut plate-contacting end (478) is configured to define another corresponding two-point contact with the base plate (142) of the nut plate (140) to locate the base plate (142) relative to the second nut plate-contacting end (478) in the two dimensions.

A33. The nut plate gripper (400) of any of paragraphs A1-A32, wherein the nut plate gripper (400) is configured to repeatedly grip and to repeatedly release the nut plate (140) without damage to the nut plate gripper (400).

A34. The nut plate gripper (400) of any of paragraphs A1-A33, wherein the nut plate gripper (400) is at least one of a unitary nut plate gripper (400) and a monolithic nut plate gripper (400).

A35. The nut plate gripper (400) of any of paragraphs A1-A34, wherein the nut plate gripper (400) is a metallic nut plate gripper (400).

A36. The nut plate gripper (400) of any of paragraphs A1-A35, wherein the nut plate gripper (400) is defined by at least one of a strip of steel and a strip of spring steel.

A37. The nut plate gripper (400) of any of paragraphs A1-A36, wherein the nut plate gripper (400) is a formed metallic strip.

A38. The nut plate gripper (400) of any of paragraphs A1-A37, wherein the nut plate gripper (400) is configured to passively grip the nut plate (140) responsive to an insertion force, which urges the first nut plate-contacting end (448) and the second nut plate-contacting end (478) between the pair of opposed plate flanges (152).

A39. The nut plate gripper (400) of any of paragraphs A1-A38, wherein the nut plate gripper (400) is configured to passively release the nut plate (140) responsive to a separation force, which urges the first nut plate-contacting end (448) and the second nut plate-contacting end (478) from between the pair of opposed plate flanges (152).

A40. The nut plate gripper (400) of any of paragraphs A1-A39, wherein the nut plate gripper (400) further includes a vibration structure (490) configured to vibrate the first resilient projecting region (430) and the second resilient projecting region (460) to at least one of:

(i) facilitate insertion of the first nut plate-contacting end (448) and the second nut plate-contacting end (478) between the pair of opposed plate flanges (152); and (ii) facilitate positioning of base plate rivet openings (158) of the nut plate (140) onto corresponding rivets (120).

A41. The nut plate gripper (400) of any of paragraphs A1-A40, wherein the nut plate gripper (400) further includes a gripper actuator (496).

A42. The nut plate gripper (400) of paragraph A41, wherein the gripper actuator (496) is configured to selectively urge the first resilient projecting region (430) and the second resilient projecting region (460) toward one another to at least one of:

(i) facilitate insertion of the first nut plate-contacting end (448) and the second nut plate-contacting end (478) between the pair of opposed plate flanges (152); and (ii) facilitate separation of the nut plate gripper (400) from the nut plate (140).

A43. The nut plate gripper (400) of any of paragraphs A41-A42, wherein the gripper actuator (496) is configured to selectively urge the first resilient projecting region (430) and the second resilient projecting region (460) away from one another to cause the nut plate gripper (400) to grip the nut plate (140).

A44. The nut plate gripper (400) of any of paragraphs A41-A43, wherein the gripper actuator (496) includes at least one of a mechanical actuator, a pneumatic actuator, a hydraulic actuator, a cam, and a double-acting cam.

A45. The nut plate gripper (400) of any of paragraphs A1-A44, wherein, when the nut plate gripper (400) grips the nut plate (140), the nut plate gripper (400) is entirely external a threaded central opening (172) of a nut (170) of the nut plate (140).

A46. The nut plate gripper (400) of any of paragraphs A1-A45, wherein the nut plate gripper (400) is configured to facilitate positioning of the nut plate (140) by the end effector (300) that includes the nut plate gripper (400).

A47. The nut plate gripper (400) of any of paragraphs A1-A46, wherein the nut plate gripper (400) includes the nut plate (140).

A48. The nut plate gripper (400) of any of paragraphs A1-A47, wherein the nut plate (140) includes the base plate (142), optionally wherein the base plate (142) includes at least one of:

(i) a structure-contacting region (144) that defines a structure-facing side (146) and a structure-opposed side (148);

(ii) a fastener opening (150) that extends through the structure-contacting region (144) of the base plate (142);

(iii) a pair of opposed plate flanges (152) that extends at least one of away from the structure-facing side (146) of the base plate (142) and away from the structure-opposed side (148) of the base plate (142); and (iv) a plurality of base plate rivet openings (158) configured to receive a plurality of corresponding rivets (120).

A49. The nut plate gripper (400) of any of paragraphs A1-A48, wherein the nut plate (140) further includes a/the nut (170) that is operatively attached to the base plate (142), optionally wherein at least one of:

(i) the nut (170) defines a/the threaded central opening (172) that is aligned with a/the fastener opening (150) of the base plate (142);

(ii) the nut (170) is operatively attached to a/the structure-opposed side (148) of the base plate (142);

(iii) the nut (170) is positioned between the pair of opposed plate flanges (152); and (iv) the nut plate (140) may be configured to permit limited motion of the nut (170) relative to the base plate (142), optionally wherein a spring clip (174) attaches the nut (170) to the nut plate (140) and permits the limited motion.

B1. A method of gripping a nut plate (140) utilizing a nut plate gripper (400), the method comprising:

aligning a first nut plate-contacting end (448) of a first resilient projecting region (430) of the nut plate gripper (400) and a second nut plate-contacting end (478) of a second resilient projecting region (460) of the nut plate gripper (400) with a pair of opposed plate flanges (152) of a base plate (142) of the nut plate (140); and gripping the nut plate (140) with the nut plate gripper (400) by moving the nut plate gripper (400) and the nut plate (140) toward one another, such that the first nut plate-contacting end (448) and the second nut plate-contacting end (478) are positioned between the pair of opposed plate flanges (152) and apply a retaining force (402) to the pair of opposed plate flanges (152).

B2. The method of paragraph B1, wherein the retaining force (402) includes a first retaining force (404), which is applied in a first force direction by the first nut plate-contacting end (448), and a second retaining force (406), which is applied in a second force direction by the second nut plate-contacting end (478), wherein the first force direction is opposed to the second force direction.

B3. The method of any of paragraphs B1-B2, wherein the retaining force (402) is a tensile retaining force (402).

B4. The method of any of paragraphs B1-B3, wherein the moving includes establishing a corresponding two-point contact between the first nut plate-contacting end (448) and the nut plate (140) and establishing another corresponding two-point contact between the second nut plate-contacting end (478) and the nut plate (140) to locate the nut plate (140) and the nut plate gripper (400) relative to one another in two dimensions.

B5. The method of any of paragraphs B1-B4, wherein the moving includes at least one of:

(i) positioning a first plate flange of the pair of opposed plate flanges (152) between a first pair of opposed ramps (452) of the nut plate gripper (400) to locate the nut plate (140) and the nut plate gripper (400) relative to one another in a third dimension, optionally that is perpendicular to a/the two dimensions; and (ii) positioning a second plate flange of the pair of opposed plate flanges (152) between a second pair of opposed ramps (482) of the nut plate gripper (400) to locate the nut plate (140) and the nut plate gripper (400) relative to one another in the third dimension.

B6. The method of any of paragraphs B1-B5, wherein the moving includes deflecting the first resilient projecting region (430) and the second resilient projecting region (460) toward one another to permit the first nut plate-contacting end (448) and the second nut plate-contacting end (478) to be positioned between the pair of opposed plate flanges (152).

B7. The method of paragraph B6, wherein the retaining force (402) is a restoring force generated by the deflecting.

B8. The method of any of paragraphs B1-B7, wherein, subsequent to the gripping, the method further includes releasing the nut plate (140) from the nut plate gripper (400).

B9. The method of paragraph B8, wherein the releasing includes passively releasing the nut plate (140) from the nut plate gripper (400) responsive to a separation force that urges the first nut plate-contacting end (448) and the second nut plate-contacting end (478) from between the pair of opposed plate flanges (152).

B10. The method of any of paragraphs B8-B10, wherein the releasing includes actively releasing the nut plate (140) from the nut plate gripper (400) by actuating a gripper actuator (496) of the nut plate gripper (400).

B11. The method of any of paragraphs B1-B10, wherein during the gripping, the nut plate gripper (400) is at least one of:

(i) entirely external a threaded central opening (172) of a nut (170) of the nut plate (140); and (ii) free from direct physical contact with the threaded central opening (172).

B12. The method of any of paragraphs B1-B11, wherein during the moving, the method further includes vibrating at least one of the first nut plate-contacting end (448) and the second nut plate-contacting end (478).

B13. The method of any of paragraphs B1-B12, wherein the nut plate gripper (400) includes any suitable structure of any of the nut plate grippers (400) of any of paragraphs A1-A49.

C1. A nut plate gripper (700) configured to grip a nut plate (140) along an engagement axis (798), wherein the nut plate (140) includes a base plate (142) that defines a pair of opposed plate flanges (152) and a nut (170) that is operatively attached to the base plate (142) and defines a threaded central opening (172), the nut plate gripper (700) comprising:

an attachment region (410) configured to facilitate attachment of the nut plate gripper (700) to an end effector (300);

an elongate resilient retention structure (730) that extends from the attachment region (410) along the engagement axis (798) and is sized for an interference fit within the threaded central opening (172) of the nut (170); and a pair of orienting structures (760) positioned on opposed sides of the elongate resilient retention structure (730), wherein the pair of orienting structures (760) is configured to operatively engage the base plate (142) when the nut plate gripper (700) grips the nut plate (140) to precisely orient the base plate (142) relative to the nut plate gripper (700) along an orienting axis.

C2. The nut plate gripper (700) of paragraph C1, wherein the elongate resilient retention structure (730) is an at least partially cylindrical, elongate resilient retention structure (730).

C3. The nut plate gripper (700) of any of paragraphs C1-C2, wherein the elongate resilient retention structure (730) is an at least partially conic, elongate resilient retention structure (730).

C4. The nut plate gripper (700) of any of paragraphs C1-C3, wherein the elongate resilient retention structure (730) is an at least partially tubular, elongate resilient retention structure (730).

C5. The nut plate gripper (700) of any of paragraphs C1-C4, wherein the elongate resilient retention structure (730) is an at least partially hollow, elongate resilient retention structure (730).

C6. The nut plate gripper (700) of any of paragraphs C1-C5, wherein the elongate resilient retention structure includes an alignment region (732), which is sized to fit within the threaded central opening (172), and a retention region (736), which is sized for the interference fit with the threaded central opening (172), wherein the elongate resilient retention structure (730) is oriented such that, when the nut plate gripper (700) is positioned to grip the nut plate (140), the alignment region (732) enters the threaded central opening (172) prior to contact between the retention region (736) and the elongate central opening (172).

C7. The nut plate gripper (700) of paragraph C6, wherein the alignment region (732) is an at least partially cylindrical alignment region (732).

C8. The nut plate gripper (700) of any of paragraphs C6-C7, wherein the alignment region (732) includes an alignment region tip (734) shaped to facilitate insertion of the alignment region (732) into the threaded central opening (172).

C9. The nut plate gripper (700) of paragraph C8, wherein the alignment region tip (734) includes at least one of:

(i) a rounded alignment region tip (734);

(ii) an at least partially spherical alignment region tip (734); and (iii) an at least partially conic alignment region tip (734).

C10. The nut plate gripper (700) of any of paragraphs C6-C9, wherein the retention region (736) is at least one of:

(i) a tapered retention region (736);

(ii) a ribbed retention region (736);

(iii) a fingered retention region (736); and (iv) an at least partially conic retention region (736).

C11. The nut plate gripper (700) of any of paragraphs C1-C10, wherein the elongate resilient retention structure (730) is sized such that a maximum transverse dimension of at least a region of the elongate resilient retention structure (730) is greater than an inside diameter of the threaded central opening (172) of the nut (170).

C12. The nut plate gripper (700) of any of paragraphs C1-C11, wherein a retention structure aspect ratio of the elongate resilient retention structure (730) is at least one of:

(i) at least 2, at least 3, at least 4, at least 5, at least 6, at least 7, or at least 8; and (ii) at most 15, at most 10, at most 9, at most 8, at most 7, or at most 6.

C13. The nut plate gripper (700) of any of paragraphs C1-C12, wherein the elongate resilient retention structure (730) is defined by a retention structure material.

C14. The nut plate gripper (700) of paragraph C13, wherein the retention structure material differs from an orienting structure material of the pair of orienting structures (760).

C15. The nut plate gripper (700) of paragraph C14, wherein a retention structure Young's modulus of the retention structure material is less than an orienting structure Young's modulus of the orienting structure material.

C16. The nut plate gripper (700) of paragraph C15, wherein a ratio of the retention structure Young's modulus to the orienting structure Young's modulus is less than 1.0, less than 0.9, less than 0.8, less than 0.7, less than 0.6, less than 0.5, less than 0.4, less than 0.3, less than 0.2, or less than 0.1.

C17. The nut plate gripper (700) of any of paragraphs C13-C16, wherein the retention structure material includes at least one of a resilient retention structure material, an elastomeric retention structure material, and a polymeric retention structure material.

C18. The nut plate gripper (700) of any of paragraphs C1-C17, wherein the elongate resilient retention structure (730) includes a molded elongate resilient retention structure (730).

C19. The nut plate gripper (700) of any of paragraphs C1-C18, wherein, when the nut plate gripper (700) grips the nut plate (140), at least a region of the elongate resilient retention structure (730) is compressed by the nut (170), optionally wherein the region of the elongate resilient retention structure (730) is compressed by the nut (170) in a direction that is perpendicular to at least one of the engagement axis (798) and a longitudinal axis (738) of the elongate resilient retention structure (730).

C20. The nut plate gripper (700) of any of paragraphs C1-C19, wherein the pair of orienting structures (760) includes a pair of opposed orienting structures (760).

C21. The nut plate gripper (700) of any of paragraphs C1-C20, wherein each orienting structure (760) of the pair of orienting structures (760) includes a corresponding chamfered region (762) shaped to facilitate alignment of the nut plate (140) with the nut plate gripper (700) as the nut plate gripper (700) engages with the nut plate (140).

C22. The nut plate gripper (700) of paragraph C21, wherein the corresponding chamfered region (762) of each orienting structure (760) faces at least partially toward the corresponding chamfered region (762) of another orienting structure (760) of the pair of orienting structures (760).

C23. The nut plate gripper (700) of any of paragraphs C1-C22, wherein each orienting structure (760) of the pair of orienting structures (760) defines a relief region (770) configured to increase a flexibility of each orienting structure (760) along a flex axis that is perpendicular to the engagement axis (798).

C24. The nut plate gripper (700) of any of paragraphs C1-C23, wherein the pair of orienting structures (760) is a first pair of orienting structures (760), wherein the orienting axis is a first orienting axis, and further wherein the nut plate gripper (700) includes a second pair of orienting structures configured to operatively engage the base plate (142) to precisely orient the base plate (142) relative to the nut plate gripper (700) along a second orienting axis that differs from, or is perpendicular to, the first orienting axis.

C25. The nut plate gripper (700) of paragraph C24, wherein the nut plate gripper (700) includes a third pair of orienting structures (760) configured to operatively engage the base plate (142) to precisely orient the base plate (142) relative to the nut plate gripper (700) along a third orienting axis that differs from, or is orthogonal to, the first orienting axis and the second orienting axis.

C26. The nut plate gripper (700) of any of paragraphs C1-C25, wherein the pair of orienting structures (760) includes a pair of structure-opposed side-engaging orienting structures (772) configured to operatively engage a structure-opposed side of the base plate (142).

C27. The nut plate gripper (700) of paragraph C26, wherein the pair of structure-opposed side-engaging orienting structures (772) defines a pair of structure-opposed side-engaging surfaces (774) that extend at least partially perpendicular to the engagement axis (798).

C28. The nut plate gripper (700) of any of paragraphs C1-C27, wherein the pair of orienting structures (760) includes a pair of flange-face-engaging orienting structures (776) configured to operatively engage flange faces (154) of the pair of opposed plate flanges (152).

C29. The nut plate gripper (700) of paragraph C28, wherein the pair of flange-face-engaging orienting structures (776) is configured to at least one of:

(i) compress the base plate (142) in a/the direction that is at least partially perpendicular to the engagement axis (798);

(ii) compress the pair of opposed plate flanges (152) in the direction that is at least partially perpendicular to the engagement axis (798);

(iii) contact a pair of opposed external flange faces (154) of the pair of opposed plate flanges (152); and (iv) grip the pair of opposed plate flanges (152).

C30. The nut plate gripper (700) of any of paragraphs C28-C29, wherein the pair of flange-face-engaging orienting structures (776) extends from the attachment region (710) along the engagement axis (798).

C31. The nut plate gripper (700) of any of paragraphs C1-C30, wherein the pair of orienting structures (760) includes a pair of flange-edge-engaging orienting structures (778) configured to operatively engage opposed edges (156) of the pair of opposed plate flanges (152).

C32. The nut plate gripper (700) of paragraph C31, wherein the pair of flange-edge-engaging orienting structures (778) defines a first flange-edge-engaging projection (780) and a second flange-edge-engaging projection (782), and further wherein when the nut plate gripper (700) grips the nut plate (140), at least one plate flange of the pair of opposed plate flanges (152) extends between the first flange-edge-engaging projection (780) and the second flange-edge-engaging projection (782).

C33. The nut plate gripper (700) of any of paragraphs C1-C32, wherein the pair of orienting structures (760) is defined by a/the orienting structure material.

C34. The nut plate gripper (700) of paragraph C33, wherein the orienting structure material includes at least one of a resilient orienting structure material and a polymeric orienting structure material.

C35. The nut plate gripper (700) of any of paragraphs C33-C34, wherein the orienting structure material includes at least one of acrylonitrile butadiene styrene, polyethylene terephthalate, polylactic acid, poly-ether-ether-ketone, polycarbonate, and nylon.

C36. The nut plate gripper (700) of any of paragraphs C1-C35, wherein the pair of orienting structures (760) includes a pair of 3-D printed orienting structures (760).

C37. The nut plate gripper (700) of any of paragraphs C1-C36, wherein the nut plate gripper (700) further includes a vibration structure mount (790) configured to receive a vibration structure (490), which is configured to vibrate the elongate resilient retention structure (730) and the pair of orienting structures (760) to facilitate alignment with the nut plate gripper (700) when the nut plate gripper (700) grips the nut plate (140).

C38. The nut plate gripper (700) of paragraph C37, wherein the nut plate gripper (700) further includes the vibration structure (490).

C39. The nut plate gripper (700) of any of paragraphs C1-C38, wherein the nut plate gripper (700) further includes an engagement axis compliance member (792) configured to permit constrained relative motion along the engagement axis (798) between the attachment region (710) and at least one of the elongate resilient retention structure (730) and the pair of orienting structures (760).

D1. A method (500) of gripping a nut plate (140) utilizing a nut plate gripper (400), the method (500) comprising:

aligning (510) the nut plate gripper (400) with the nut plate (140) by concurrently aligning:

(i) a longitudinal axis (738) of an elongate resilient retention structure (730) of the nut plate gripper (400) with a threaded central opening (172) of a nut (170) of the nut plate (140); and (ii) a pair of orienting structures (760) of the nut plate gripper (400) with a base plate (142) of the nut plate (140); and gripping (530) the nut plate (140) with the nut plate gripper (400) by moving the nut plate gripper (400) and the nut plate (140) toward one another along an engagement axis (798) such that:

(i) the elongate resilient retention structure (730) extends within, and defines an interference fit with, the threaded central opening (172); and (ii) the pair of orienting structures (760) operatively engages the base plate (142) to precisely orient the base plate (142) relative to the nut plate gripper (400) along an orienting axis.

D2. The method (500) of paragraph D1, wherein the aligning (510) includes aligning such that the longitudinal axis (738) of the elongate resilient retention structure (730) extends through the threaded central opening (172).

D3. The method (500) of any of paragraphs D1-D2, wherein the aligning (510) includes concurrently moving the elongate resilient retention structure (730) and the pair of orienting structures (760) within a plane that is at least substantially perpendicular to the engagement axis (798).

D4. The method (500) of any of paragraphs D1-D3, wherein the aligning (510) includes aligning such that the longitudinal axis (738) of the elongate resilient retention structure (730) extends parallel, or at least substantially parallel, to the engagement axis (798).

D5. The method (500) of any of paragraphs D1-D4, wherein the gripping (530) includes moving the elongate resilient retention structure (730) into the threaded central opening (172).

D6. The method (500) of any of paragraphs D1-D5, wherein the gripping (530) includes moving the pair of orienting structures (760) into operative engagement with the base plate (142).

D7. The method (500) of any of paragraphs D1-D6, wherein the gripping (530) includes moving at least a region of the elongate resilient retention structure (730) into the threaded central opening (172) prior to establishing operative engagement between the pair of orienting structures (760) and the base plate (142).

D8. The method (500) of any of paragraphs D1-D7, wherein the gripping (530) includes physically contacting the base plate (142) with the pair of orienting structures (760).

D9. The method (500) of any of paragraphs D1-D8, wherein the gripping (530) includes positioning the base plate (142) at least partially between the pair of orienting structures (760).

D10. The method (500) of any of paragraphs D1-D9, wherein the gripping (530) includes compressing at least a region of the base plate (142) between the pair of orienting structures (760).

D11. The method (500) of any of paragraphs D1-D10, wherein, subsequent to the gripping (530), the elongate resilient retention structure (730) is resiliently deformed via a deformation force exerted by the nut (170).

D12. The method (500) of paragraph D11, wherein the deformation force is applied at least substantially perpendicular to the longitudinal axis (738) of the elongate resilient retention structure (730).

D13. The method (500) of any of paragraphs D1-D12, wherein the gripping (530) includes moving an alignment region (732) of the elongate resilient retention structure (730) into the threaded central opening (172) and subsequently forming the interference fit between the threaded central opening (172) and a retention region (736) of the elongate resilient retention structure (730).

D14. The method (500) of any of paragraphs D1-D13, wherein the gripping (530) includes deflecting at least a region of the elongate resilient retention structure (730) from the longitudinal axis (738) via a deflection force applied by the pair of orienting structures (760).

D15. The method (500) of any of paragraphs D1-D14, wherein the pair of orienting structures (760) includes a pair of structure-facing-side-engaging orienting structures (772) configured to operatively engage a structure-facing side of the base plate (142), and further wherein the orienting axis is parallel to the engagement axis (798).

D16. The method (500) of any of paragraphs D1-D15, wherein the pair of orienting structures (760) includes a pair of flange-face-engaging orienting structures (776) configured to operatively engage flange faces (154) of a pair of opposed plate flanges (152), and further wherein the orienting axis is at least one of:

(i) perpendicular to the engagement axis (798), (ii) parallel to a flange face normal direction of the flange faces (154) of the pair of opposed plate flanges (152); and (iii) perpendicular to a flange edge normal direction of flange edges (156) of the pair of opposed plate flanges (152).

D17. The method (500) of any of paragraphs D1-D16, wherein the pair of orienting structures (760) includes a pair of flange-edge-engaging orienting structures (778) configured to operatively engage opposed edges of a/the pair of opposed plate flanges (152), and further wherein the orienting axis is at least one of:

(i) perpendicular to the engagement axis (798), (ii) perpendicular to a/the flange face normal direction of a/the flange faces (154) of the pair of opposed plate flanges (152); and (iii) parallel to a/the flange edge normal direction of a/the flange edges (156) of the opposed plate flanges (152).

D18. The method (500) of any of paragraphs D1-D17, wherein during the gripping (530), the method further includes vibrating (520) the pair of orienting structures (760).

D19. The method (500) of any of paragraphs D1-D18, wherein during the gripping (530), the method (500) further includes operatively translating the pair of orienting structures (760) toward an attachment region (710) of the nut plate gripper (400).

D20. The method (500) of any of paragraphs D1-D19, wherein the nut plate gripper (400) includes any suitable structure, function, and/or feature of any of the nut plate grippers (400) of any of paragraphs A1-A49 or C1-C39.

E1. An end effector (300) configured to rivet a nut plate (140) to a structure (10), the end effector (300) comprising:

a nut plate gripper (400);

a rivet holder (310); and a yoke (350) that defines a nut plate gripper side (352) and a rivet holder side (354);

optionally wherein the nut plate gripper (400) is operatively attached to the nut plate gripper side (352) of the yoke (350);

optionally wherein the rivet holder (310) is operatively attached to the rivet holder side (354) of the yoke (350) such that the nut plate gripper (400) and the rivet holder (310) define a structure-receiving region (356) therebetween;

optionally wherein the nut plate gripper (400) is configured to grip the nut plate (140) such that a structure-facing side (146) of a structure-contacting region (144) of a base plate (142) of the nut plate (140) faces toward the structure-receiving region (356); and optionally wherein the rivet holder (310) is configured to selectively retain a plurality of rivet heads (122) of a plurality of corresponding rivets (120), such that a plurality of pins (124) of the plurality of corresponding rivets (120) extends toward the structure-receiving region (356).

E2. The end effector (300) of paragraph E1, wherein the nut plate gripper (400) is configured to grip a structure-opposed side (148) of at least one of the nut plate (140) and the base plate (142) of the nut plate (140).

E3. The end effector (300) of any of paragraphs E1-E2, wherein when the nut plate gripper (400) grips the nut plate (140), the nut plate gripper (400) is entirely external a threaded central opening (172) of a nut (170) of the nut plate (140).

E4. The end effector (300) of any of paragraphs E1-E3, wherein the nut plate gripper (400) is configured to grip a pair of opposed plate flanges (152) of the base plate (142) of the nut plate (140).

E5. The end effector (300) of paragraph E4, wherein the nut plate gripper (400) is configured to apply a tensile retaining force (402) to the pair of opposed plate flanges (152) of the base plate (142) of the nut plate (140).

E6. The end effector (300) of any of paragraphs E1-E5, wherein the nut plate gripper (400) is configured to passively grip the nut plate (140).

E7. The end effector (300) of any of paragraphs E1-E6, wherein the nut plate gripper (400) includes a gripper actuator (496) configured to actively actuate the nut plate gripper (400) to grip the nut plate (140).

E8. The end effector (300) of paragraph E7, wherein the gripper actuator (496) includes at least one of:

(i) a mechanically actuated gripper actuator (496);

(ii) an electrically actuated gripper actuator (496);

(iii) a pneumatically actuated gripper actuator (496); and (iv) a hydraulically actuated gripper actuator (496).

E9. The end effector (300) of any of paragraphs E1-E8, wherein the nut plate gripper (400) is configured to utilize a vacuum force to grip the nut plate (140).

E10. The end effector (300) of any of paragraphs E1-E9, wherein the nut plate gripper (400) further includes a vibration structure (490) configured to vibrate the nut plate gripper (400) to at least one of:

(i) facilitate alignment of the nut plate gripper (400) with the nut plate (140); and (ii) facilitate alignment of the nut plate (140) with the structure (10).

E11. The end effector (300) of any of paragraphs E1-E10, wherein the nut plate gripper (400) includes any suitable structure of any of the nut plate grippers (400) of any of paragraphs A1-A49 or C1-C39.

E12. The end effector (300) of any of paragraphs E1-E11, wherein the nut plate gripper (400) is configured to perform any suitable function of any of the nut plate grippers (400) of any of paragraphs A1-A49 or C1-C39 or any of the methods of any of paragraphs B1-B13 or D1-D20.

E13. The end effector (300) of any of paragraphs E1-E12, wherein the rivet holder (310) defines a plurality of rivet-receiving regions (312) configured to receive the plurality of corresponding rivets (120).

E14. The end effector (300) of any of paragraphs E1-E13, wherein the rivet holder (310) includes a rivet gripper (314) configured to selectively grip the plurality of corresponding rivets (120).

E15. The end effector (300) of paragraph E14, wherein the rivet gripper (314) defines a gripping state, in which the rivet gripper (314) retains the plurality of corresponding rivets (120) within the rivet holder (310), and a free state, in which the plurality of corresponding rivets (120) is free to be separated from the rivet holder (310) via motion along at least one corresponding separation axis.

E16. The end effector (300) of any of paragraphs E1-E15, wherein the rivet holder (310) is configured to selectively retain the plurality of rivet heads (122) such that a relative orientation of the plurality of pins (124) corresponds to at least one of:

(i) a relative orientation of a plurality of base plate rivet openings (158) defined within the base plate (142) of the nut plate (140); and (ii) a relative orientation of a plurality of structure rivet openings (12) defined within the structure (10).

E17. The end effector (300) of any of paragraphs E1-E16, wherein the end effector (300) further includes a rivet set structure (330) configured to set the plurality of corresponding rivets (120) such that the plurality of corresponding rivets (120) operatively attaches the base plate (142) of the nut plate (140) to the structure (10).

E18. The end effector (300) of paragraph E17, wherein the rivet set structure (330) includes an anvil (334) and a die (336), wherein the anvil (334) is configured to act upon the plurality of rivet heads (122) to compress the plurality of corresponding rivets (120) between the anvil (334) and the die (336).

E19. The end effector (300) of paragraph E18, wherein the rivet set structure (330) includes a set structure linear actuator (332) configured to operatively translate the anvil (334) relative to the die (336) to compress the plurality of corresponding rivets (120) between the anvil (334) and the die (336).

E20. The end effector (300) of any of paragraphs E18-E19, wherein the anvil (334) is operatively attached to the rivet holder side (354) of the yoke (350) and faces toward the nut plate gripper side (352) of the yoke (350).

E21. The end effector (300) of any of paragraphs E18-E20, wherein the die (336) is operatively attached to the nut plate gripper side (352) of the yoke (350) and faces toward the rivet holder side (354) of the yoke (350).

E22. The end effector (300) of any of paragraphs E18-E21, wherein the die (336) extends at least partially between a/the first resilient projecting region (430) of the nut plate gripper (400) and a/the second resilient projecting region (460) of the nut plate gripper (400).

E23. The end effector (300) of any of paragraphs E18-E22, wherein the die (336) includes a chamfered die end sized to provide clearance between the die (336) and the nut plate gripper (400).

F1. A nut plate installation robot (200), comprising:

a robot arm (210);

the end effector (300) of any of paragraphs E1-E23, wherein the end effector (300) is operatively attached to the robot arm (210); and a vision system (220) configured to view at least one of the end effector (300), the nut plate gripper (400), the nut plate (140), the plurality of corresponding rivets (120), and the structure (10) to facilitate alignment among the nut plate (140), the plurality of corresponding rivets (120), and the structure (10).

G1. A nut plate installation system (100), comprising:

the nut plate installation robot (200) of paragraph F1; and at least one of:

(i) a rivet kitting structure (110);

(ii) a nut plate kitting structure (130); and (iii) a sealant application structure (180) configured to apply a sealant (186) to the nut plate (140).

G2. The nut plate installation system (100) of paragraph G1, wherein the rivet kitting structure (110) is configured to supply the plurality of corresponding rivets (120) to the nut plate installation robot (200).

G3. The nut plate installation system (100) of any of paragraphs G1-G2, wherein the rivet kitting structure (110) contains a plurality of sets of the plurality of corresponding rivets (120).

G4. The nut plate installation system (100) of any of paragraphs G1-G3, wherein the rivet kitting structure (110) includes a plurality of resilient receptacles (114) configured to resiliently retain the plurality of corresponding rivets (120).

G5. The nut plate installation system (100) of any of paragraphs G1-G4, wherein the rivet kitting structure (110) is configured to retain the plurality of corresponding rivets (120) in a vertical orientation in which the plurality of pins (124) extends vertically upward from the plurality of rivet heads (122).

G6. The nut plate installation system (100) of any of paragraphs G1-G5, wherein the rivet kitting structure (110) is a rotary rivet kitting structure (112) configured to rotate to make the plurality of corresponding rivets (120) accessible to the end effector (300).

G7. The nut plate installation system (100) of any of paragraphs G1-G6, wherein the nut plate kitting structure (130) is configured to supply the nut plate (140) to the nut plate installation robot (200).

G8. The nut plate installation system (100) of any of paragraphs G1-G7, wherein the nut plate kitting structure (130) contains a plurality of nut plates (140).

G9. The nut plate installation system (100) of any of paragraphs G1-G8, wherein the nut plate kitting structure (130) is configured to support the nut plate (140) on a horizontal nut plate kitting structure surface (134).

G10. The nut plate installation system (100) of any of paragraphs G1-G9, wherein the nut plate kitting structure (130) is a rotary nut plate kitting structure (132) configured to rotate to make the nut plate (140) accessible to the end effector (300).

G11. The nut plate installation system (100) of any of paragraphs G1-G10, wherein the sealant application structure (180) is configured to apply the sealant (186) to the structure-facing side (146) of the structure-contacting region (144) of the base plate (142) of the nut plate (140).

G12. The nut plate installation system (100) of paragraph G11, wherein the sealant application structure (180) includes at least one of:

(i) a roller (182) configured to apply the sealant (186) to the structure-facing side (146); and (ii) a volume (184) of sealant (186) within which the nut plate installation robot (200) is configured to dip the structure-facing side (146).

G13. The nut plate installation system (100) of any of paragraphs G11-G12, wherein the sealant application structure (180) is configured to apply the sealant (186) at least one of:

(i) while the nut plate (140) is gripped by the nut plate gripper (400); and (ii) while the structure (10) is spaced-apart from the structure-receiving region (356).

H1. A method (600) of utilizing a nut plate installation system (100), the method (600) comprising:

gripping (610), with a nut plate gripper (400) of an end effector (300) of a nut plate installation robot (200) of the nut plate installation system (100), a nut plate (140);

retaining (615), with a rivet holder (310) of the end effector (300), a plurality of corresponding rivets (120);

aligning (625), with the nut plate installation robot (200), a plurality of base plate rivet openings (158) of a base plate (142) of the nut plate (140) and a plurality of pins (124) of the plurality of corresponding rivets (120) with a plurality of structure rivet openings (12) of a structure (10);

inserting (630) the plurality of pins (124) of the plurality of corresponding rivets (120) into the plurality of structure rivet openings (12) such that the plurality of pins (124) protrudes from a nut plate gripper-facing side (14) of the structure (10);

positioning (635) the plurality of pins (124) within the plurality of base plate rivet openings (158); and setting (640) the plurality of corresponding rivets (120) to operatively attach the nut plate (140) to the structure (10).

H2. The method (600) of paragraph H1, wherein the method (600) includes utilizing a single end effector (300) to perform the gripping (610), the retaining (615), and the setting (640).

H3. The method (600) of any of paragraphs H1-H2, wherein the end effector (300) defines a structure-receiving region (356), which extends between the nut plate gripper (400) and the rivet holder (310), and further wherein the aligning (625) includes positioning the structure (10) within the structure-receiving region (356).

H4. The method (600) of any of paragraphs H1-H3, wherein the method (600) further includes vibrating (605) at least one of the nut plate gripper (400) and the nut plate (140) at least one of:

(i) during the gripping (610); and (ii) during the positioning (635).

H5. The method (600) of any of paragraphs H1-H4, wherein the aligning (625) includes utilizing a vision system (220) of the nut plate installation robot (200).

H6. The method (600) of paragraph H5, wherein the aligning (625) includes viewing the plurality of structure rivet openings (12) with the vision system (220) and prior to the inserting (630).

H7. The method (600) of any of paragraphs H5-H6, wherein the utilizing further includes verifying a position for the nut plate (140) with the vision system (220).

H8. The method (600) of paragraph H7, wherein the verifying includes at least one of:

(i) verifying that the plurality of structure rivet openings (12) are free of corresponding rivets (120) prior to the inserting (630); and (ii) verifying that a spacing among the plurality of structure rivet openings (12) corresponds to a spacing among the plurality of base plate rivet openings (158).

H9. The method (600) of any of paragraphs H1-H8, wherein the aligning (625) includes positioning the structure (10) directly between the nut plate gripper (400) and the rivet holder (310).

H10. The method (600) of any of paragraphs H1-H9, wherein the retaining (615) includes gripping the plurality of corresponding rivets (120) with a rivet gripper (314) of the end effector (300), and further wherein the inserting (630) includes releasing the plurality of corresponding rivets (120) from the rivet gripper (314).

H11. The method (600) of any of paragraphs H1-H10, wherein the inserting (630) includes translating the plurality of corresponding rivets (120) along a longitudinal axis of at least one pin (124) of the plurality of pins (124).

H12. The method (600) of any of paragraphs H1-H11, wherein the positioning (635) includes translating the nut plate (140) along a/the longitudinal axis of at least one pin (124) of the plurality of pins (124).

H13. The method (600) of any of paragraphs H1-H12, wherein the setting (640) includes compressing the plurality of corresponding rivets (120) with a rivet set structure (330) of the end effector (300).

H14. The method (600) of paragraph H13, wherein the compressing includes compressing the plurality of corresponding rivets (120) between an anvil (334) and a die (336) of the rivet set structure (330).

H15. The method (600) of any of paragraphs H1-H14, wherein, subsequent to the setting (640), the method (600) further includes separating (645) the end effector (300) from the nut plate (140) and from the plurality of corresponding rivets (120).

H16. The method (600) of any of paragraphs H1-H15, wherein, subsequent to the setting (640), the method (600) further includes establishing a spaced-apart relationship between the structure (10) and a/the structure-receiving region (356) of the end effector (300).

H17. The method (600) of any of paragraphs H1-H16, wherein the gripping (610) includes obtaining the nut plate (140) from a nut plate kitting structure (130).

H18. The method (600) of any of paragraphs H1-H17, wherein the retaining (615) includes obtaining the plurality of corresponding rivets (120) from a rivet kitting structure (110).

H19. The method (600) of any of paragraphs H1-H18, wherein, subsequent to the gripping (610) and prior to the aligning (625), the method (600) further includes applying (620) a sealant (186) to a structure-facing side (146) of a structure-contacting region (144) of the base plate (142) of the nut plate (140).

H20. The method (600) of any of paragraphs H1-H19, wherein, subsequent to the setting (640), the method (600) further includes inspecting (650) at least one of the nut plate (140), the plurality of corresponding rivets (120), and the structure (10).

H21. The method (600) of paragraph H20, wherein the inspecting (650) includes verifying attachment of the nut plate (140) to the structure (10) via the plurality of corresponding rivets (120).

H22. The method (600) of any of paragraphs H20-H21, wherein the inspecting (650) includes viewing at least one of the nut plate (140), the plurality of corresponding rivets (120), and the structure (10) by utilizing a/the vision system (220) of the nut plate installation robot (200).

H23. The method (600) of any of paragraphs H1-H22, wherein the nut plate gripper (400) includes any suitable structure of any suitable nut plate gripper (400) of any of paragraphs A1-A49 or C1-C39.

H24. The method (600) of any of paragraphs H1-H23, wherein the method (600) further includes performing any suitable function of any of the nut plate grippers (400) of any of paragraphs A1-A49 or C1-C39.

H25. The method (600) of any of paragraphs H1-H24, wherein the method (600) further includes gripping the nut plate (140) according to any suitable step of any of the methods of any of paragraphs B1-B13 or D1-D20.

H26. The method (600) of any of paragraphs H1-H25, wherein the end effector (300) includes any suitable structure of any of the end effectors (300) of any of paragraphs E1-E23.

H27. The method (600) of any of paragraphs H1-H26, wherein the method (600) further includes performing any suitable function of any of the end effectors (300) of any of paragraphs E1-E23.

H28. The method (600) of any of paragraphs H1-H27, wherein the nut plate installation robot (200) further includes any suitable structure of the nut plate installation robot (200) of paragraph F1.

H29. The method (600) of any of paragraphs H1-H28, wherein the nut plate installation system (100) includes any suitable structure of any of the nut plate installation systems (100) of any of paragraphs G1-G13.

H30. The method (600) of any of paragraphs H1-H29, wherein the method (600) further includes performing any suitable function of any of the nut plate installation systems (100) of any of paragraphs G1-G13.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A nut plate gripper configured to grip a nut plate along an engagement axis, wherein the nut plate includes a base plate that defines a pair of opposed plate flanges and a nut that is operatively attached to the base plate and defines a threaded central opening, the nut plate gripper comprising:

an attachment region configured to facilitate attachment of the nut plate gripper to an end effector;

an elongate resilient retention structure that extends from the attachment region along the engagement axis and is sized for an interference fit within the threaded central opening of the nut; and a pair of orienting structures positioned on opposed sides of the elongate resilient retention structure, wherein the pair of orienting structures is configured to operatively engage the base plate when the nut plate gripper grips the nut plate to precisely orient the base plate relative to the nut plate gripper along an orienting axis.

2. The nut plate gripper of claim 1, wherein the elongate resilient retention structure includes an alignment region which is sized to fit within the threaded central opening, and a retention region which is sized for the interference fit with the threaded central opening, wherein the elongate resilient retention structure is oriented such that, when the nut plate gripper is positioned to grip the nut plate, the alignment region enters the threaded central opening prior to contact between the retention region and the threaded central opening.

3. The nut plate gripper of claim 1, wherein the elongate resilient retention structure is defined by a retention structure material that differs from an orienting structure material of the pair of orienting structures.

4. The nut plate gripper of claim 3, wherein a retention structure Young's modulus of the retention structure material is less than an orienting structure Young's modulus of the orienting structure material.

5. The nut plate gripper of claim 1, wherein, when the nut plate gripper grips the nut plate, at least a region of the elongate resilient retention structure is compressed by the nut in a direction that is perpendicular to at least one of the engagement axis and a longitudinal axis of the elongate resilient retention structure.

6. The nut plate gripper of claim 1, wherein each orienting structure of the pair of orienting structures includes a corresponding chamfered region shaped to facilitate alignment of the nut plate with the nut plate gripper as the nut plate gripper engages with the nut plate.

7. The nut plate gripper of claim 6, wherein the corresponding chamfered region of each orienting structure faces at least partially toward the corresponding chamfered region of another orienting structure of the pair of orienting structures.

8. The nut plate gripper of claim 1, wherein each orienting structure of the pair of orienting structures defines a relief region configured to increase a flexibility of each orienting structure along a flex axis that is perpendicular to the engagement axis.

9. The nut plate gripper of claim 1, wherein the pair of orienting structures is a first pair of orienting structures, wherein the orienting axis is a first orienting axis, and further wherein the nut plate gripper includes a second pair of orienting structures configured to operatively engage the base plate to precisely orient the base plate relative to the nut plate gripper along a second orienting axis that is perpendicular to the first orienting axis.

10. The nut plate gripper of claim 9, wherein the nut plate gripper includes a third pair of orienting structures configured to operatively engage the base plate to precisely orient the base plate relative to the nut plate gripper along a third orienting axis that is orthogonal to the first orienting axis and the second orienting axis.

11. The nut plate gripper of claim 1, wherein the pair of orienting structures includes a pair of structure-opposed side-engaging orienting structures configured to operatively engage a structure-opposed side of the base plate, wherein the pair of structure-opposed side-engaging orienting structures defines a pair of structure-opposed side-engaging surfaces that extend at least partially perpendicular to the engagement axis.

12. The nut plate gripper of claim 1, wherein the pair of orienting structures includes a pair of flange-face-engaging orienting structures configured to operatively engage flange faces of the pair of opposed plate flanges, wherein the pair of flange-face-engaging orienting structures extends from the attachment region along the engagement axis.

13. The nut plate gripper of claim 1, wherein the pair of orienting structures includes a pair of flange-edge-engaging orienting structures configured to operatively engage opposed edges of the pair of opposed plate flanges, wherein the pair of flange-edge-engaging orienting structures defines a first flange-edge-engaging projection and a second flange-edge-engaging projection, and further wherein, when the nut plate gripper grips the nut plate, at least one plate flange of the pair of opposed plate flanges extends between the first flange-edge-engaging projection and the second flange-edge-engaging projection.

14. The nut plate gripper of claim 1, wherein the nut plate gripper further includes an engagement axis compliance member configured to permit constrained relative motion along the engagement axis, between the attachment region and at least one of the elongate resilient retention structure and the pair of orienting structures.

15. A method of gripping a nut plate utilizing a nut plate gripper, the method comprising:

aligning the nut plate gripper with the nut plate by concurrently aligning:

(i) a longitudinal axis of an elongate resilient retention structure of the nut plate gripper with a threaded central opening of a nut of the nut plate; and (ii) a pair of orienting structures of the nut plate gripper with a base plate of the nut plate; and gripping the nut plate with the nut plate gripper by moving the nut plate gripper and the nut plate toward one another along an engagement axis such that:

(i) the elongate resilient retention structure extends within, and defines an interference fit with, the threaded central opening; and (ii) the pair of orienting structures operatively engages the base plate to precisely orient the base plate relative to the nut plate gripper along an orienting axis.

16. The method of claim 15, wherein the gripping includes moving the elongate resilient retention structure into the threaded central opening and moving the pair of orienting structures into operative engagement with the base plate.

17. The method of claim 15, wherein the gripping includes moving at least a region of the elongate resilient retention structure into the threaded central opening prior to establishing operative engagement between the pair of orienting structures and the base plate.

18. The method of claim 15, wherein the gripping includes moving an alignment region of the elongate resilient retention structure into the threaded central opening, and subsequently forming the interference fit between the threaded central opening and a retention region of the elongate resilient retention structure.

19. The method of claim 15, wherein the gripping includes deflecting at least a region of the elongate resilient retention structure from the longitudinal axis via a deflection force applied by the pair of orienting structures.

20. The method of claim 15, wherein during the gripping, the method further includes operatively translating the pair of orienting structures toward an attachment region of the nut plate gripper.

* * * * *